United States Patent
Okada et al.

(10) Patent No.: US 10,644,864 B2
(45) Date of Patent: May 5, 2020

(54) SIGNAL PROCESSING DEVICE AND METHOD TO ENABLE TRANSMISSION OF TYPE LENGTH VALUE (TLV) PACKETS

(71) Applicant: SONY CORPORATION, Tokyo (JP)

(72) Inventors: Satoshi Okada, Tokyo (JP); Yuichi Hirayama, Chiba (JP); Takashi Horiguti, Saitama (JP); Lachlan Bruce Michael, Saitama (JP)

(73) Assignee: SONY CORPORATION, Tokyo (JP)

( * ) Notice: Subject to any disclaimer, the term of this patent is extended or adjusted under 35 U.S.C. 154(b) by 142 days.

(21) Appl. No.: 15/575,275

(22) PCT Filed: May 30, 2016

(86) PCT No.: PCT/JP2016/065861
§ 371 (c)(1),
(2) Date: Nov. 17, 2017

(87) PCT Pub. No.: WO2016/199603
PCT Pub. Date: Dec. 15, 2016

(65) Prior Publication Data
US 2018/0139033 A1    May 17, 2018

(30) Foreign Application Priority Data

Jun. 11, 2015 (JP) ................................ 2015-118755
Jan. 8, 2016 (JP) ................................ 2016-002797

(51) Int. Cl.
*H04L 7/00* (2006.01)
*H04N 21/438* (2011.01)
(Continued)

(52) U.S. Cl.
CPC ............ *H04L 7/0008* (2013.01); *G06F 13/38* (2013.01); *G09G 5/008* (2013.01); *H04J 3/0635* (2013.01);
(Continued)

(58) Field of Classification Search
CPC ............ H04L 7/0008; H04N 21/4305; H04N 21/438; G06F 13/38; H04J 3/0635; G09G 5/008
See application file for complete search history.

(56) References Cited

U.S. PATENT DOCUMENTS

| | | | |
|---|---|---|---|
| 2002/0006171 A1* | 1/2002 | Nielsen | H03D 7/163 375/316 |
| 2002/0140868 A1* | 10/2002 | Yamagata | H04N 5/4401 348/725 |

(Continued)

FOREIGN PATENT DOCUMENTS

| | | |
|---|---|---|
| CN | 101669365 A | 3/2010 |
| CN | 105612754 A | 5/2016 |

(Continued)

OTHER PUBLICATIONS

International Search Report and Written Opinion of PCT Application No. PCT/JP2016/065861, dated Aug. 16, 2016, 10 pages of ISRWO.

*Primary Examiner* — Jael M Ulysse
(74) *Attorney, Agent, or Firm* — Chip Law Group

(57) ABSTRACT

The present technology relates to a signal processing device that enables TLV transmission, a signal processing method, and a program. The signal processing device includes: a demodulation processing unit that performs a demodulation process; a processing unit that performs a demux process; and a data signal line, a clock signal line, a sync signal line, and a valid signal line that are provided between the demodulation processing unit and the processing unit. A variable-length packet is transmitted between the demodulation processing unit and the processing unit through the data signal line, the clock signal line, the sync signal line, and the valid signal line. The variable-length packet is an (Continued)

Internet Protocol (IP) packet. The present technology can be applied to receivers that receive and process TLV streams.

24 Claims, 47 Drawing Sheets

(51) Int. Cl.
    *H04N 21/43* (2011.01)
    *G06F 13/38* (2006.01)
    *G09G 5/00* (2006.01)
    *H04J 3/06* (2006.01)
    *H04B 1/16* (2006.01)

(52) U.S. Cl.
    CPC ....... *H04N 21/4305* (2013.01); *H04N 21/438* (2013.01); *G09G 2340/02* (2013.01); *G09G 2370/10* (2013.01); *H04B 1/16* (2013.01); *H04J 3/0697* (2013.01)

(56) References Cited

U.S. PATENT DOCUMENTS

| | | | | |
|---|---|---|---|---|
| 2004/0260823 A1* | 12/2004 | Tiwari | H04L 29/06027 | 709/230 |
| 2005/0189971 A1* | 9/2005 | Kizer | G06F 1/10 | 327/147 |
| 2006/0034273 A1* | 2/2006 | Tamura | H04N 7/1675 | 370/389 |
| 2006/0133429 A1* | 6/2006 | Seo | H04N 21/434 | 370/535 |
| 2007/0153888 A1* | 7/2007 | Kim | H04H 20/30 | 375/229 |
| 2008/0005767 A1* | 1/2008 | Seo | H04N 7/163 | 725/62 |
| 2008/0181258 A1* | 7/2008 | Tomizawa | H04L 41/147 | 370/516 |
| 2008/0288663 A1* | 11/2008 | Kovacevic | H04N 21/434 | 710/5 |
| 2009/0034442 A1* | 2/2009 | Song | H04H 20/30 | 370/310 |
| 2009/0034556 A1* | 2/2009 | Song | H04L 69/22 | 370/471 |
| 2009/0034652 A1* | 2/2009 | Song | H04W 4/06 | 375/296 |
| 2009/0085535 A1* | 4/2009 | Wei | H02M 3/156 | 323/272 |
| 2009/0201796 A1* | 8/2009 | Roberts | H04B 10/60 | 370/210 |
| 2010/0162339 A1* | 6/2010 | Suh | H04N 21/4345 | 725/118 |
| 2010/0238951 A1* | 9/2010 | Ozawa | G06F 3/14 | 370/465 |
| 2010/0290459 A1* | 11/2010 | Lee | H04N 21/2383 | 370/389 |
| 2010/0329364 A1* | 12/2010 | Giombanco | H04B 1/16 | 375/258 |
| 2013/0039278 A1* | 2/2013 | Bouazizi | H04L 69/04 | 370/328 |
| 2013/0107118 A1* | 5/2013 | Panje | H04L 7/042 | 348/525 |
| 2014/0285715 A1* | 9/2014 | Ozawa | H04N 7/06 | 348/486 |
| 2015/0229443 A1* | 8/2015 | Hwang | H04L 1/0083 | 370/474 |
| 2015/0264300 A1* | 9/2015 | Stewart | H04L 69/22 | 348/441 |
| 2016/0205441 A1* | 7/2016 | Iguchi | H04L 69/22 | 725/67 |

FOREIGN PATENT DOCUMENTS

| | | |
|---|---|---|
| EP | 2154889 A1 | 2/2010 |
| EP | 2421262 A2 | 2/2012 |
| EP | 2908536 A | 8/2015 |
| JP | 08-079328 A | 3/1996 |
| JP | 08-79328 A | 3/1996 |
| JP | 2004-056169 A | 2/2004 |
| JP | 2004-56169 A | 2/2004 |
| JP | 2009-135801 A | 6/2009 |
| JP | 2013-175949 A | 9/2013 |
| JP | 2015-104122 A | 6/2015 |
| KR | 10-2010-0086928 A | 8/2010 |
| TW | 200931981 A | 7/2009 |
| WO | 2009/069430 A1 | 6/2009 |
| WO | 2015/075880 A1 | 5/2015 |
| WO | 2015/198545 A1 | 12/2015 |

* cited by examiner

FIG. 40

| TLV_Type Field | GSE_Protocol_Type Field |
|---|---|
| 0x01 (IPv4 PACKET) | 0x0800 |
| 0x02 (IPv6 PACKET) | 0x86DD |
| 0x03 (IP PACKET WITH COMPRESSED HEADER) | 0x22F2 |
| 0xFE (TRANSMISSION CONTROL SIGNAL PACKET) | 0x0087 |
| 0xFF (NULL PACKET) | RETRANSMISSION NOT REQUIRED |
| OTHERS | UNDEFINED |

*FIG. 42*

| packet_type Value | Meaning |
|---|---|
| 000 | IPv4 packet |
| 001 | Reserved |
| 010 | Compressed IP packet |
| 011 | Reserved |
| 100 | Link layer signaling packet |
| 101 | Reserved |
| 110 | Packet Type Extension |
| 111 | MPEG-2 Transport Stream |

| packet_type Value | Meaning |
|---|---|
| 00 | IPv4 packet |
| 01 | Compressed IP packet |
| 10 | Packet Type Extension |
| 11 | MPEG-2 Transport Stream |

FIG. 43A

| packet_type Value | Meaning |
|---|---|
| 00 | IPv4 packet |
| 01 | Compressed IP packet |
| 10 | Link layer signaling packet |
| 11 | Packet Type Extension |

FIG. 43B

SIGNAL PROCESSING DEVICE AND METHOD TO ENABLE TRANSMISSION OF TYPE LENGTH VALUE (TLV) PACKETS

CROSS REFERENCE TO RELATED APPLICATIONS

This application is a U.S. National Phase of International Patent Application No. PCT/JP2016/065861 filed on May 30, 2016, which claims priority benefit of Japanese Patent Application No. JP 2016-002797 filed in the Japan Patent Office on Jan. 8, 2016 and also claims priority benefit of Japanese Patent Application No. JP 2015-118755 filed in the Japan Patent Office on Jun. 11, 2015. Each of the above-referenced applications is hereby incorporated herein by reference in its entirety.

TECHNICAL FIELD

The present technology relates to a signal processing device, a signal processing method, and a program. More particularly, the present technology relates to a signal processing device that processes TLV packets, a signal processing method, and a program.

BACKGROUND ART

In digital broadcasting, for example, images (moving images) and the like are encoded by a predetermined encoding method such as Moving Picture Experts Group (MPEG), and the resultant encoded data is placed as the payloads in transport stream (TS) packets. Broadcast waves including TSs formed with such TS packets are transmitted in digital broadcasting. Receivers that receive and process such broadcast waves are also widely used.

Meanwhile, a transition from broadcasting using TS to broadcasting using the Internet Protocol (IP) has also been suggested (see Non-Patent Document 1, for example).

CITATION LIST

Non-Patent Document

Non-Patent Document 1: MMT-Based Media Transport Scheme in Digital Broadcasting Systems, ARIB STD-B60, Version 1.0, enacted on Jul. 31, 2014

SUMMARY OF THE INVENTION

Problems to be Solved by the Invention

There is a demand for receivers that are compatible with TS packets and are capable of processing new kinds of broadcasts, such as broadcast waves using IP.

The present technology has been developed in view of those circumstances, and is to enable processing of broadcast waves using IP.

Solutions to Problems

A signal processing device of one aspect of the present technology includes: a demodulation processing unit that performs a demodulation process; a processing unit that performs a demux process; and a data signal line, a clock signal line, a sync signal line, and a valid signal line that are provided between the demodulation processing unit and the processing unit. In the signal processing device, a variable-length packet is transmitted between the demodulation processing unit and the processing unit through the data signal line, the clock signal line, the sync signal line, and the valid signal line.

The variable-length packet may be an Internet Protocol (IP) packet.

The variable-length packet may be a Type Length Value (TLV) packet.

The variable-length packet to be transmitted from the demodulation processing unit to the processing unit via the data signal line may be at least part of a TLV packet.

The variable-length packet may be a TLV packet, a GSE packet, a GSE-Lite packet, or an IP packet.

The data signal line may be formed with one to eight data signal lines, and serial transmission or parallel transmission may be performed in accordance with the number of provided data signal lines.

Transmission of the variable-length packet may be performed with an optional bit width of one to eight bits.

The clock signal line may transmit a clock signal, the sync signal line may transmit a sync signal indicating the position of the top of a packet, and the valid signal line may transmit a valid signal indicating a data valid section.

The processing unit may latch data from the demodulation processing unit at a rising edge or a falling edge of the clock signal.

The valid signal may be a signal constantly indicating that data is valid, and the clock signal may be set at a frequency corresponding to the bit width of the data signal line.

The valid signal may be a signal constantly indicating that data is valid, and oscillation of the clock signal may be suspended during a byte gap.

The clock signal may constantly oscillate at a predetermined frequency, and the valid signal may be lowered during a byte gap.

During an in-packet gap or an inter-packet gap, oscillation of the clock signal may be suspended.

The variable-length packet may be a TLV packet, and error information indicating whether there is an error in a packet may be included in a packet header area of the TLV packet.

The variable-length packet may be a TLV packet, and error information indicating whether there is an error in a packet may be included in an area in which information about the type of a packet included in the TLV packet is written.

The signal processing device may further include an error signal line that transmits the error information.

The error information may be transmitted for each error correction code, or be transmitted for each variable-length packet.

The demodulation processing unit may convert a partial TLV packet compliant to the ISDB-C standards into a TLV packet, and transmit the TLV packet to the processing unit.

The demodulation processing unit may transmit a J.382-compliant GSE packet to the processing unit.

The demodulation processing unit may convert a J.382-compliant GSE packet into a TLV packet, and transmit the TLV packet to the processing unit.

The demodulation processing unit may transmit an ATSC-compliant ALP packet to the processing unit.

The header of the ALP packet may include at least 2-bit type information as information indicating the type of data placed in a payload, and 1-bit error information indicating whether there is an error in a packet.

The type information may be information for identifying four packet types among the following five packet types: an IP packet of IPv4, a compressed IP packet, an LLS packet, an extension packet, and a TS packet compliant with MPEG2-TS.

In a case where there is an error in a packet, a sync signal to be transmitted by the sync signal line and a valid signal to be transmitted by the valid signal line may not simultaneously rise.

A signal processing method of one aspect of the present technology is a signal processing method implemented in a signal processing device that includes: a demodulation processing unit that performs a demodulation process; a processing unit that performs a demux process; and a data signal line, a clock signal line, a sync signal line, and a valid signal line that are provided between the demodulation processing unit and the processing unit. The signal processing method includes the step of transmitting a variable-length packet between the demodulation processing unit and the processing unit, using the data signal line, the clock signal line, the sync signal line, and the valid signal line.

A program of one aspect of the present technology causes a computer to perform a process. The computer includes: a demodulation processing unit that performs a demodulation process; a processing unit that performs a demux process; and a data signal line, a clock signal line, a sync signal line, and a valid signal line that are provided between the demodulation processing unit and the processing unit. The process includes the step of transmitting a variable-length packet between the demodulation processing unit and the processing unit, using the data signal line, the clock signal line, the sync signal line, and the valid signal line.

In a signal processing device, a signal processing method, and a program of one aspect of the present technology, a demodulation processing unit that performs a demodulation process, and a processing unit that performs a demux process are provided, and a data signal line, a clock signal line, a sync signal line, and a valid signal line are provided between the demodulation processing unit and the processing unit. The data signal line, the clock signal line, the sync signal line, and the valid signal line are used in transmitting a variable-length packet between the demodulation processing unit and the processing unit.

Effects of the Invention

According to one aspect of the present technology, broadcast waves using IP can also be processed.

It should be noted that the effect of the present technology is not necessarily limited to that described herein, and may be any effect described in the present disclosure.

BRIEF DESCRIPTION OF DRAWINGS

FIG. 40 is a diagram for explaining a conversion table.

FIG. 42 is a diagram for explaining type information.

FIGS. 43A and 43B are diagrams for explaining type information to which the present technology is applied.

MODES FOR CARRYING OUT THE INVENTION

Figure 1:
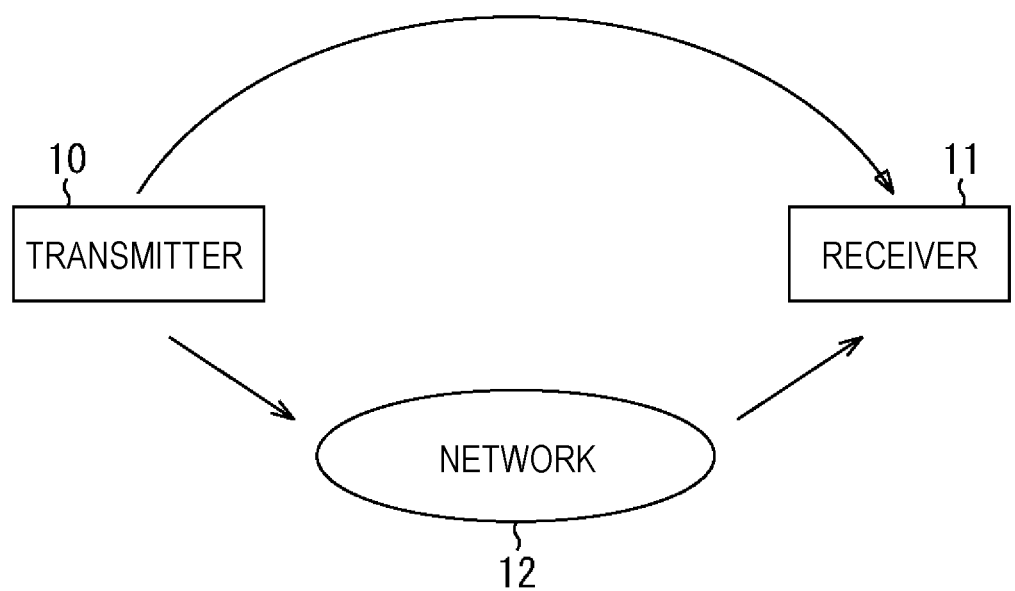
FIG. 1 is a diagram for explaining the configuration of a broadcasting system.

The following is a description of modes (hereinafter referred to as embodiments) for carrying out the present technology. It should be noted that the description will be made in the following order.

1. Configuration of a receiver
2. TLV packet
3. Signal lines
4. Where the clock signal changes, but the valid signal does not change
5. Where the clock signal is suspended, and the valid signal does not change
6. Where the clock signal constantly oscillates, and the valid signal is lowered as appropriate
7. Signals during a gap in a packet or between packets in the case of 8-bit parallel transmission
8. Signals during a gap in a packet or between packets in the case of 1-bit serial transmission
9. Transmission of an error signal
10. Processing of an NTP
11. First output pattern of data
12. Second output pattern of data
13. Third output pattern of data
14. Fourth output pattern of data
15. Fifth output pattern of data
16. Outputting an NTP at regular intervals
17. Application to Cable Retransmission
18. Application to ALP
19. Description of a computer to which the present technology is applied The present technology described below can be applied to a receiver in a broadcasting system, and therefore, explanation of an example of a receiver in a broadcasting system is continued below.

FIG. 1 is a diagram showing the configuration of a broadcasting system. The broadcasting system shown in FIG. 1 includes a transmitter 10, a receiver 11, and a network 12. The transmitter 10 is a device on the side that transmits content created by a broadcast station. Broadcast waves transmitted from the transmitter 10 are received by the receiver 11.

The system is also designed so that broadcast waves can be transmitted from the transmitter 10 to the receiver 11 via the network 12. Also, transmission via the network 12 may be transmission of information related to content being broadcast.

An example case where broadcast waves from the transmitter 10 are transmitted by a method called MPEG Media Transport (MMT)+Type Length Value (TLV), and are received by the receiver 11 is now described. The MMT+TLV method is a method of transmitting a video signal, an audio signal, and a control signal stored in an Internet Protocol (IP) packet. With this method, the distinction between broadcasting and communication as transmission channels is eliminated.

By this method, broadcast waves and a communication channel can be simultaneously used, and it becomes possible to adopt such a type of broadcasting that a video image captured by a main camera for unspecified viewers is transmitted by broadcast waves, and a video image captured by a sub camera selected by an individual viewer is transmitted via a communication channel (the network 12).

<Configuration of the Receiver>

Figure 2:
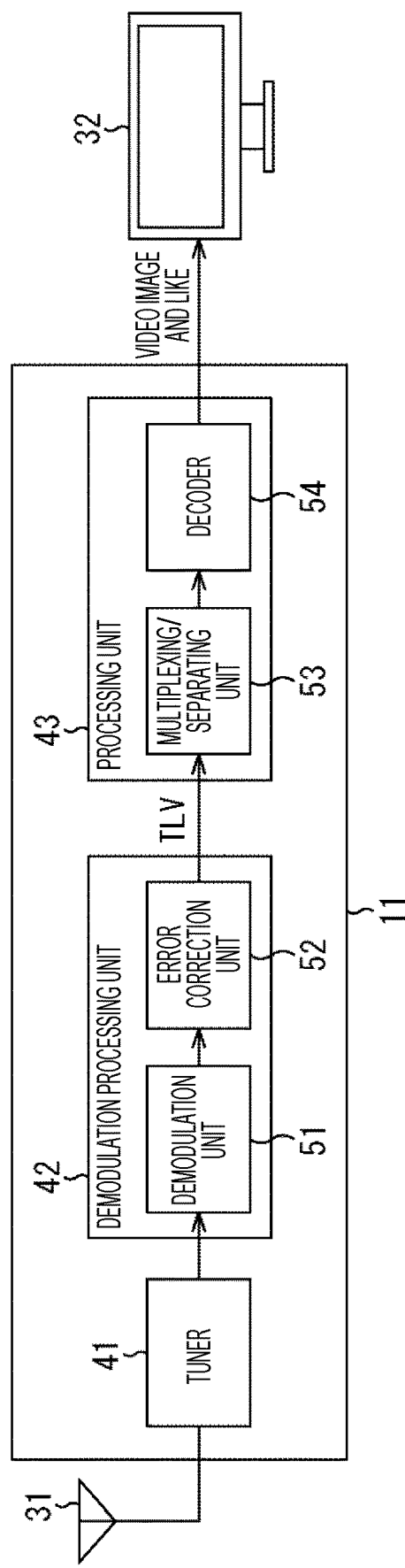
FIG. 2 is a diagram showing the configuration of an embodiment of a receiver to which the present technology is applied.

As the present technology can be applied to the receiver 11 that receives and processes broadcast waves transmitted by the above described MMT+TLV method, the configuration of the receiver 11 is now described in greater detail. FIG. 2 is a diagram showing the configuration of an embodiment of the receiver 11 to which the present technology is applied.

A receiving system that includes the receiver 11 includes an antenna 31, the receiver 11, and a display 32. The receiver 11 includes a tuner 41, a demodulation processing unit 42, and a processing unit 43. The demodulation processing unit 42 includes a demodulation unit 51 and an error correction unit 52. The processing unit 43 includes a multiplexing/separating unit 53 and a decoder 54.

The antenna 31 receives TLV digital broadcast waves transmitted from the transmitter 10, for example, and supplies the resultant reception signal to the receiver 11. The receiver 11 restores and processes the TLV from the reception signal received from the antenna 31, extracts a video image and sound, and outputs the video image and the sound to the display 32.

The error correction unit 52 performs error correction on a demodulation signal from the demodulation unit 51, and supplies the resultant TLV signal or the like to the processing unit 43. The processing unit 43 may be formed with a system-on-a-chip (SOC), for example. The processing unit 43 performs a demux process, such as a process of separating video content into a video portion, an audio portion, a subtitles portion, and the like.

The processing unit 43 is supplied with a sync signal, a valid signal, a data signal, and a clock signal as signals output from the demodulation unit 51.

The multiplexing/separating unit 53 of the processing unit 43 separates the video data and the audio data contained in the data signal from each other, for example. The decoder 54 decodes the video data into a video signal, and decodes the audio data into an audio signal, to generate video and audio signals. The decoder 54 then outputs the video and audio signals to the display 32.

<TLV Packet>

Figure 3:
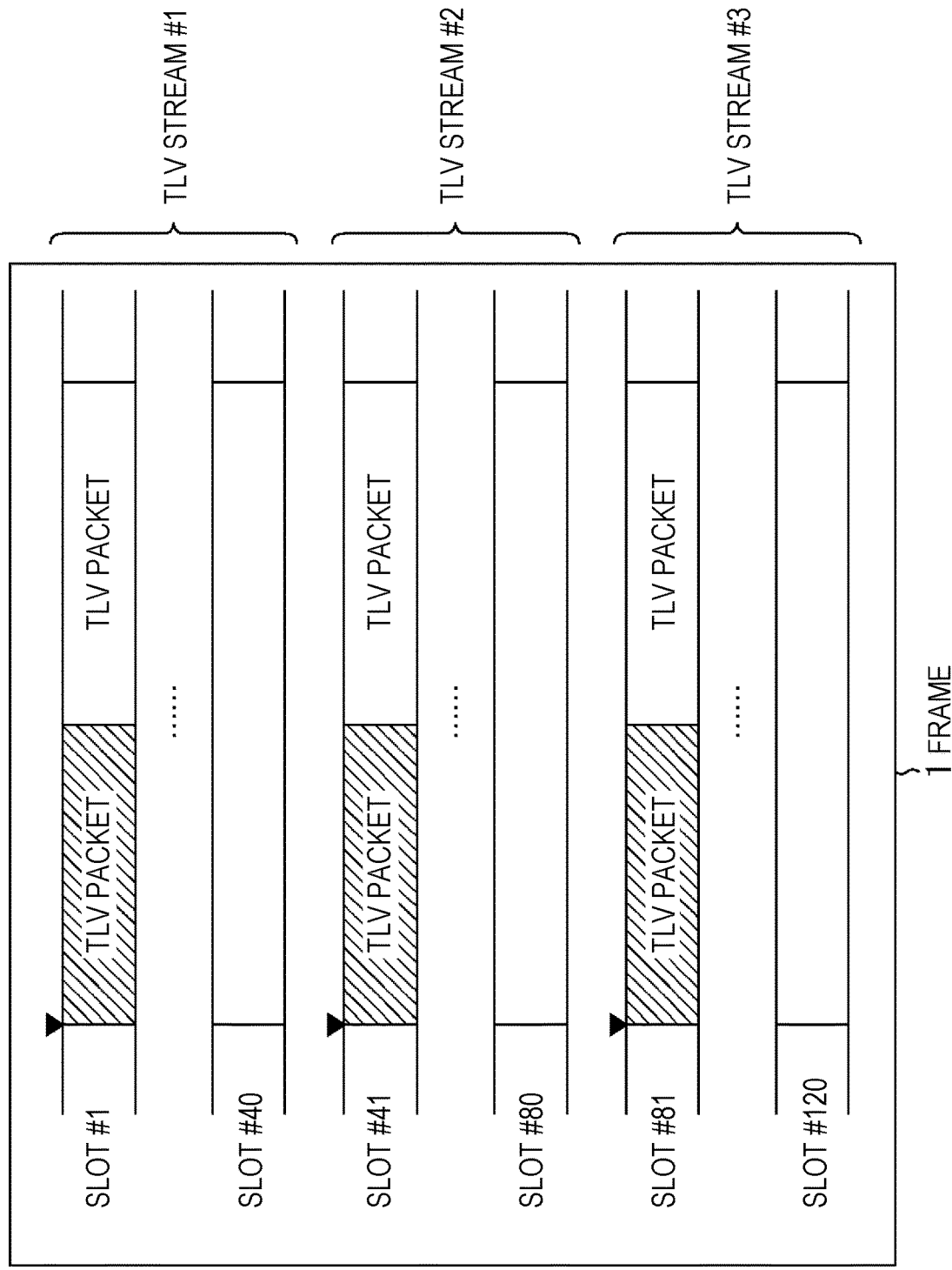
FIG. 3 is a diagram for explaining the structure of one frame.

Referring now to FIG. 3, broadcast waves that are transmitted from the transmitter 10, are received by the receiver 11, and are processed are now described in greater detail.

Broadcast waves are transmitted from the transmitter 10 frame by frame, as shown in FIG. 3. One frame includes more than one TLV stream. In the example shown in FIG. 3, one frame includes a TLV stream #1, a TLV stream #2, and a TLV stream #3. The TLV stream #1, the TLV stream #2, and the TLV stream #3 are streams of content of a broadcast station A, content of a broadcast station B, and content of a broadcast station C, for example.

One frame may be formed with streams of the same broadcast station, or one frame may include streams of different broadcast stations. Further, the number of streams included in one frame is not necessarily three, though FIG. 3 shows an example where three streams are included in one frame. It should be noted that the upper limit for the number of streams included in one frame is set at 16 by ARIB STD-B44, for example, and should fall within 16 in a case where this rule is complied with.

Meanwhile, one frame is formed with 120 slots. In the example shown in FIG. 3, slots #1 through #40 are included in the TLV stream #1, slots #41 through #80 are included in the TLV stream #2, and slots #81 through #120 are included in the TLV stream #3.

Although an example case where 120 slots are included in one frame is described herein, the number of slots is not necessarily 120. It should be noted that the upper limit for the number of slots included in one frame is fixed at 120 by ARIB STD-B44, for example, and therefore, is fixed at 120 in a case where this rule is complied with.

One slot includes one or more TLV packets. Since a TLV packet has a variable length as described later, the number of packets included in one slot may vary by slot.

Some of the slots (some of the TLV packets) include packets containing a network time protocol (NTP). An NTP is time information, and is allotted to each TLV stream ID. An NTP is used so that a clock based on received time information in the NTP format can be reproduced and stored on the side of the receiver 11.

An NTP is placed at one point in one frame among the streams with the same TLV stream ID. In FIG. 3, NTPs are placed at the points marked with triangles. That is, in the example shown in FIG. 3, the TLV packet at the top of each TLV stream includes an NTP.

Even in a case where slots of one broadcast station are scattered in one frame, an NTP is disposed at a predetermined point among the TLV streams in one frame.

Figure 4:
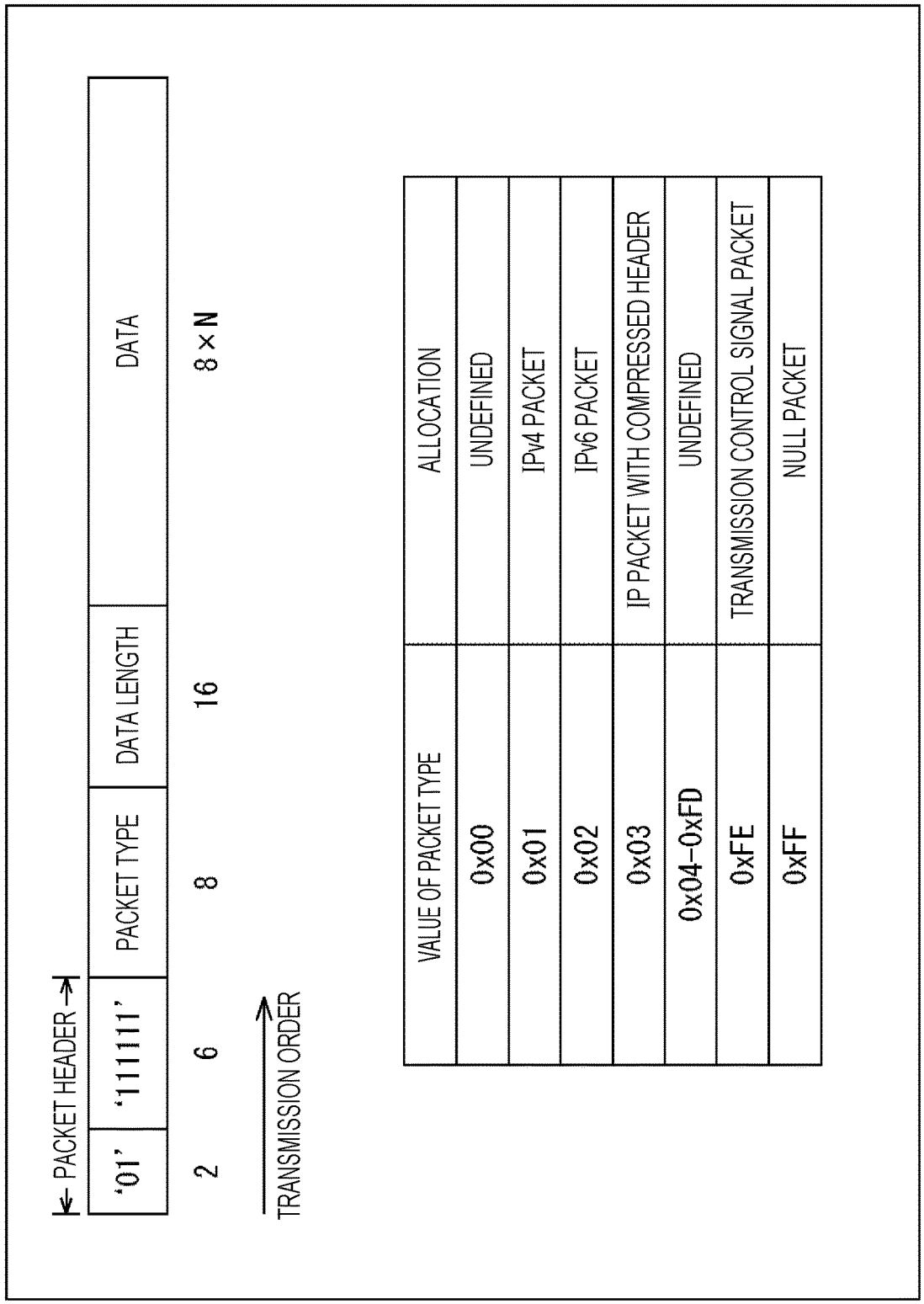
FIG. 4 is a diagram showing the structure of a TLV packet.

FIG. 4 is a diagram showing the structure of a TLV packet forming a TLV stream.

As shown in the upper portion of FIG. 4, a TLV packet is formed with a packet header area formed with two bits and six bits, an 8-bit packet type area, a 16-bit data length area, and a variable-length data area.

The packet type area is allocated as the area to be used for identifying the type of the packet to be stored in the TLV, and the allocation is shown in the lower portion of FIG. 4.

The data length area is the area in which the number of data bits that follow is written. The area of data (data area) is formed with (8×N) bits, and is a variable-length area. Data is to be written into the data area.

In a case where a value "0x01" is written in the packet type area, for example, the data format in the data area is an IPv4 packet. In a case where the data format in the data area is an IPv4 packet, the IP packet in the data area has the structure shown in the second row in FIG. 5.

Figure 5:
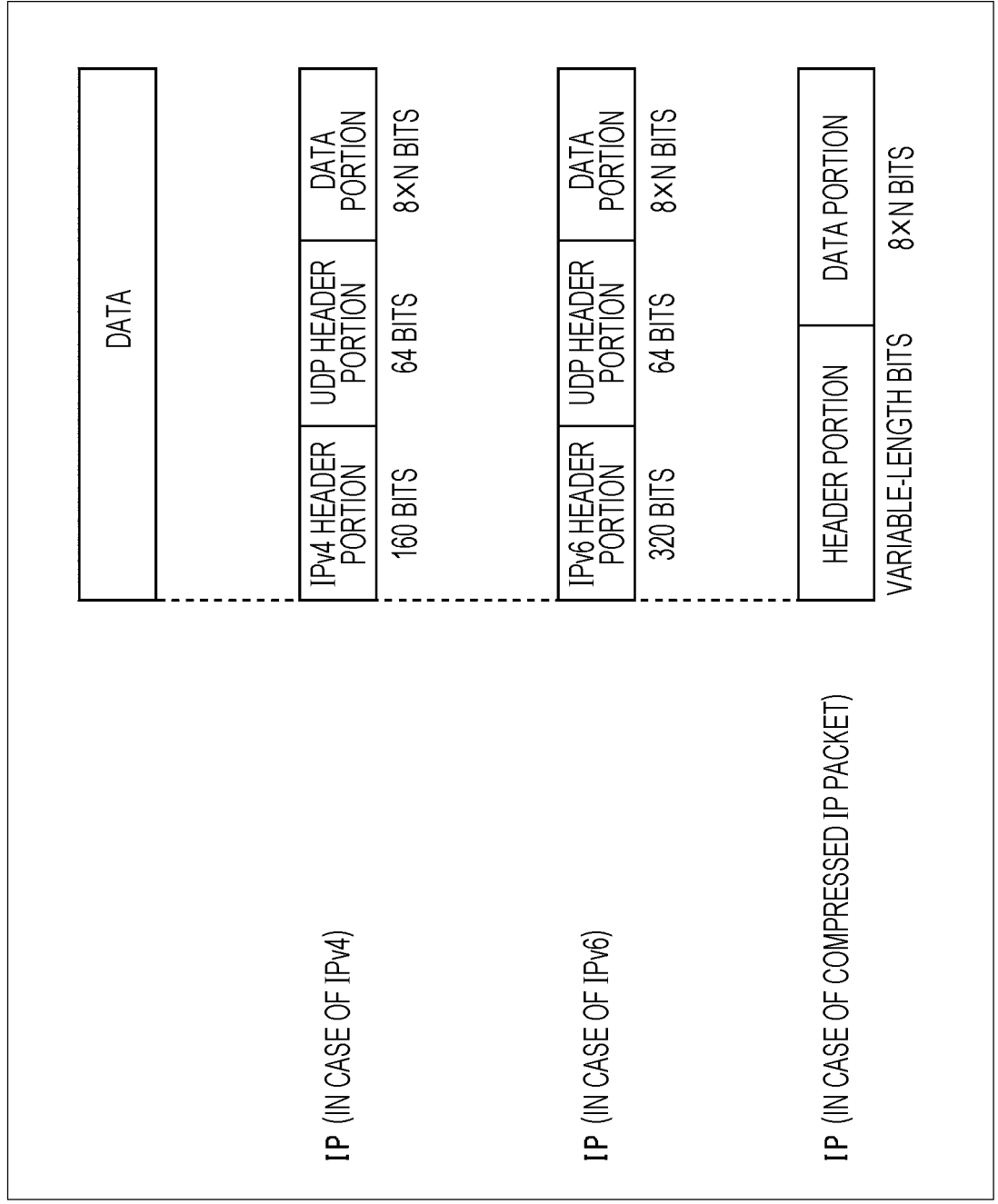
FIG. 5 is a diagram showing the structure of an IP packet.

As shown in the second row in FIG. 5, the IP packet in the data area is formed with an IPv4 header portion, a UDP header portion, and a data portion.

In a case where a value "0x02" is written in the packet type area, for example, the data format in the data area is an IPv6 packet. In a case where the data format in the data area is an IPv6 packet, the IP packet in the data area has the structure shown in the third row in FIG. 5.

As shown in the third row in FIG. 5, the IP packet in the data area is formed with an IPv6 header portion, a UDP header portion, and a data portion.

In a case where a value "0x03" is written in the packet type area, for example, the data format in the data area is an IP packet with a compressed header. In a case where the data format in the data area is an IP packet with a compressed header, the IP packet in the data area has the structure shown in the fourth row in FIG. 5.

As shown in the fourth row in FIG. 5, the IP packet in the data area is formed with a header portion and a data portion.

As described above, a TLV packet includes an IP packet.

<Signal Lines>

Meanwhile, there is a device that processes transport stream (TS) packets and is used as a conventional receiver 11, for example. To be able to process TLV packets in such a device, and to process TLV packets as a new device, the process described below is performed.

Figure 6:
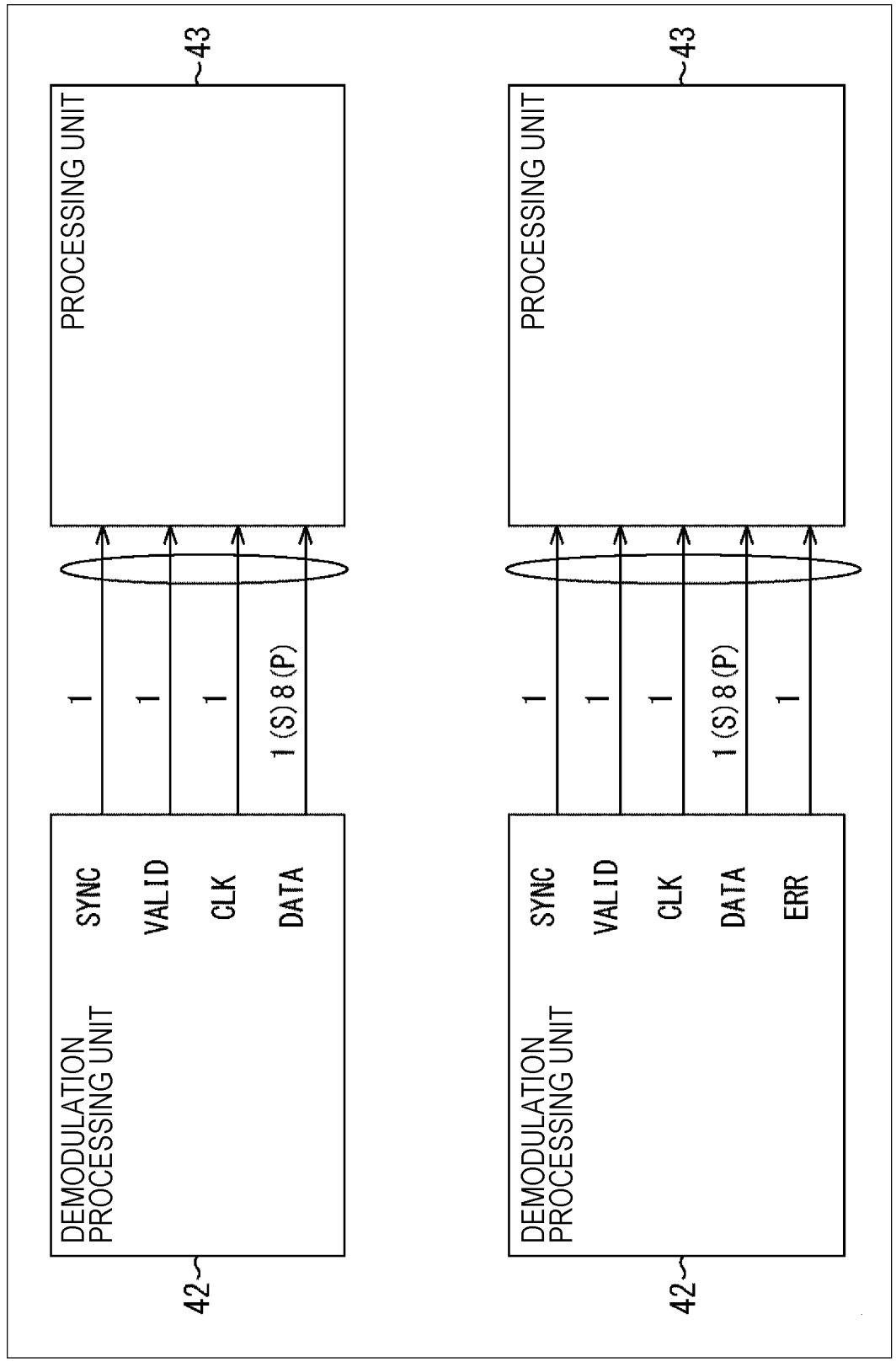
FIG. 6 is a diagram for explaining signal lines.

FIG. 6 is a diagram for explaining the signal lines provided between the demodulation processing unit 42 and the processing unit 43.

The demodulation processing unit 42 may be an LSI that performs a demodulation process. In addition, the processing unit 43 may be an LSI that performs a demux process. The demodulation processing unit 42 and the processing unit 43 may be formed with one LSI, or may be formed with different LSIs. In a case where the demodulation processing unit 42 and the processing unit 43 are formed with different LSIs, the demodulation processing unit 42 needs to output data so that the processing unit 43 in the next stage can process the data (or the conditions required by the processing unit 43 are satisfied).

According to the present technology, the demodulation processing unit 42 can supply data demodulated in such a format that satisfies the conditions required by the processing unit 43.

In the example case described below, the demodulation processing unit 42 and the processing unit 43 are formed as different LSIs. As shown in the upper diagram in FIG. 6, four signal lines (in the case of serial transmission) are provided between the demodulation processing unit 42 and the processing unit 43.

Of the four signal lines, one is a 1-bit signal line for transmitting a sync (SYNC) signal, one is a 1-bit signal line for transmitting a valid (VALID) signal, one is a 1-bit signal line for transmitting a clock (CLK) signal, and one is a 1-bit signal line for transmitting a data (DATA) signal. The data signal line might be formed with one to eight signal lines corresponding to one to eight bits.

For example, the data signal line is formed with one signal line in the case of serial transmission, and the data signal line is formed with eight signal lines in the case of 8-bit parallel transmission. Parallel transmission is not limited to eight bits, but may involve any appropriate number of bits. In accordance with the number of bits, signal lines are arranged. As described below, according to the present technology, the sync signal, the valid signal, and the clock signal can be controlled in accordance with the number of data signal lines (or the number of bits to be transmitted in one cycle of the clock signal).

Alternatively, as shown in the lower diagram in FIG. 6, a 1-bit signal line for transmitting error information indicating an occurrence of an error (ERR) may be further provided. The signal lines shown in this drawing are an example, and some other signal line(s) may be provided between the demodulation processing unit 42 and the processing unit 43.

Figure 7:
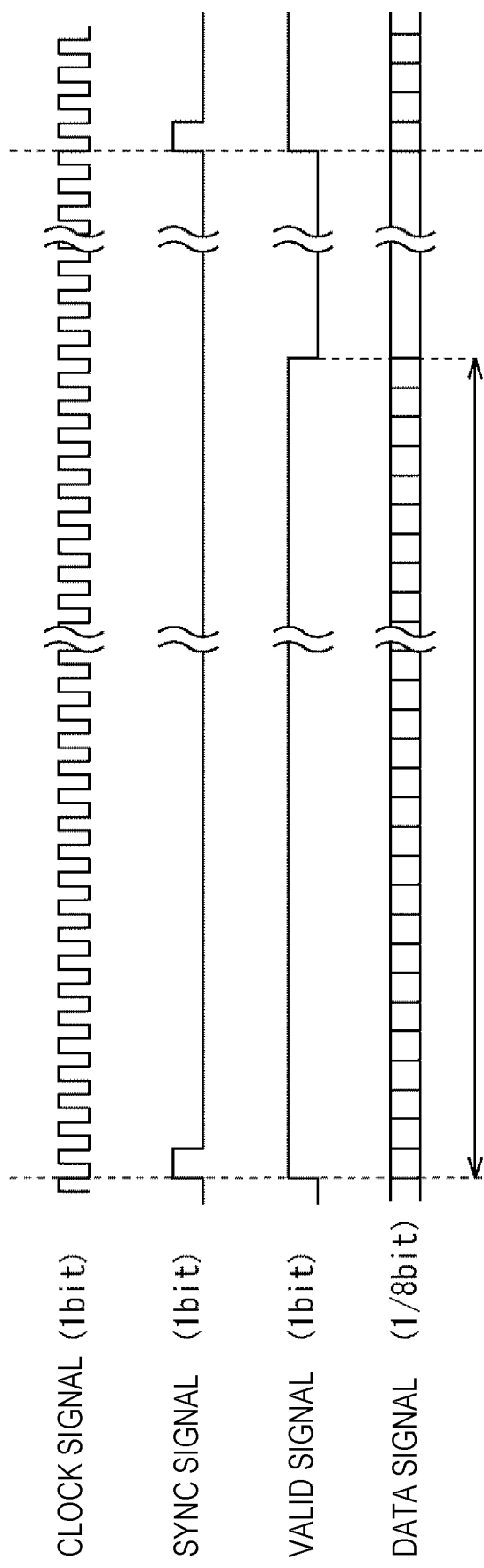
FIG. 7 is a diagram for explaining signals to be transmitted and received through signal lines.

FIG. 7 shows the basic output waveforms of the clock signal, the sync signal, the valid signal, and the data signal. It should be noted that the basic output waveforms are shown herein to explain the roles of the respective signals, and the waveforms of these signals are changed as appropriate to satisfy the conditions required by the processing unit 43 or reduce power consumption or the like as described later.

The clock signal is a signal indicating the output timing of the data forming the TLV. The clock signal is a pulse-like signal that repeatedly switches between the L-level and the H-level.

The sync signal indicates the timing of the top of each packet included in the TLV. Only at the timing of the top of each packet, for example, the sync signal temporarily switches from the low (L) level to the high (H) level.

The valid signal indicates the sections (valid sections) in which a packet exists in the TLV. For example, the valid signal is at the H-level in the valid sections, and is at the L-level in the sections (invalid sections) other than the valid sections.

The data signal is a TLV signal, and includes all or part of each TLV packet. A packet has a data length (packet length) of four to 65535 bytes, for example.

Although not shown in the drawing, if an error signal line is provided, an error signal is also transmitted. The error signal is at the H-level when there is an error, and is at the L-level when there is not an error.

Figure 8:
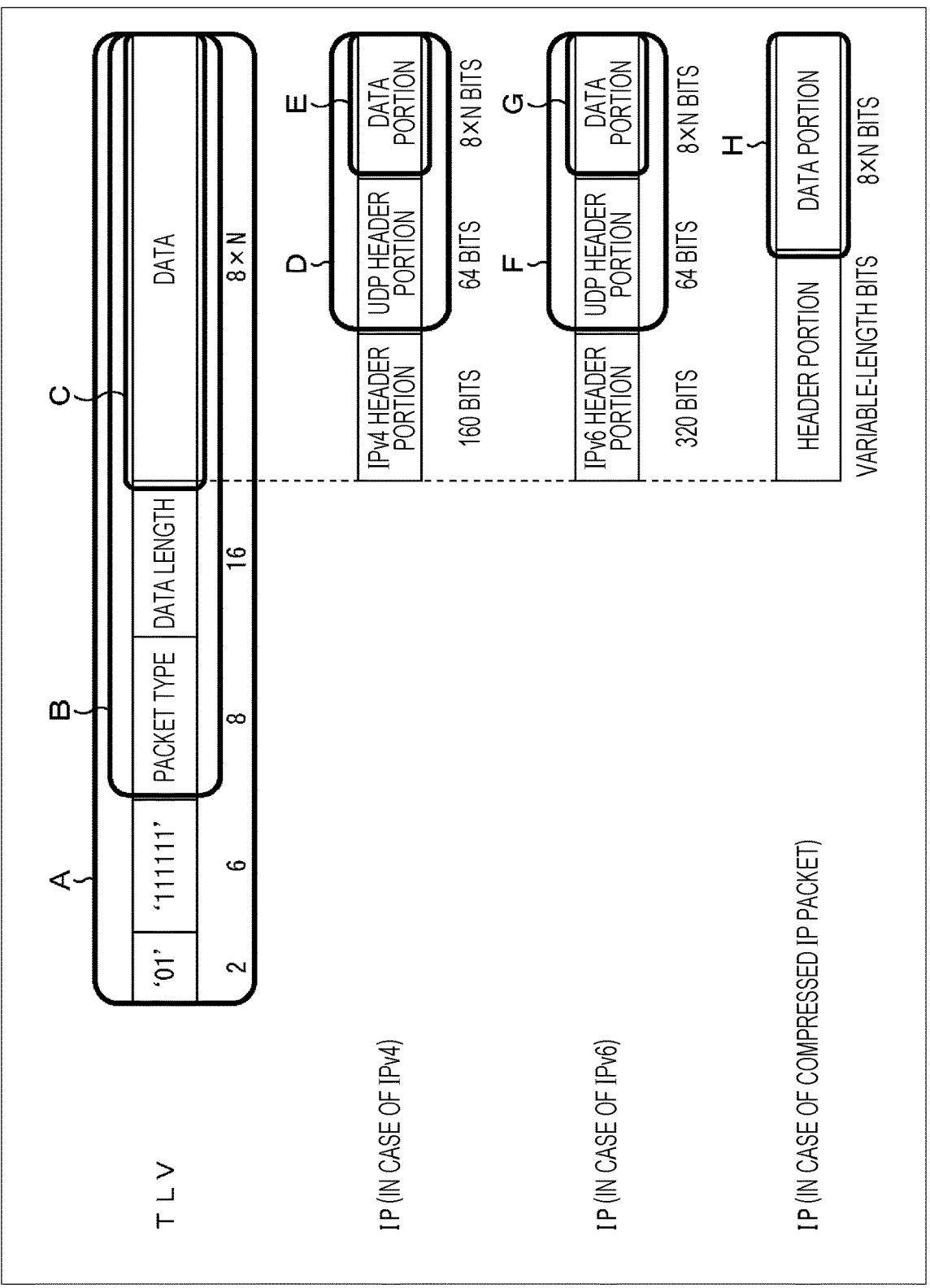
FIG. 8 is a diagram for explaining data to be transmitted.

The data signal supplied from the demodulation processing unit 42 to the processing unit 43 is all or part of a TLV packet. Referring now to FIG. 8, the data to be supplied from the demodulation processing unit 42 to the processing unit 43 is described.

FIG. 8 is a diagram showing a structure similar to the TLV packet structure shown in FIGS. 4 and 5, but differs in that the portions of the data to be supplied from the demodulation processing unit 42 to the processing unit 43 are enclosed by heavy lines. The data portions enclosed by the heavy lines are described as transmission data.

Transmission data A is the data of the entire TLV packet. In this case, all the data in the TLV packet, from the packet header of the TLV packet to the data area, is supplied from the demodulation processing unit 42 to the processing unit 43.

Transmission data B is the data of the entire TLV packet, except for the packet header. In this case, the data in the packet type area, the data in the data length area, and the data in the data area in the TLV packet are supplied from the demodulation processing unit 42 to the processing unit 43.

Transmission data C is the data in the data area in the TLV packet. In this case, the data in the data area in the TLV packet is supplied from the demodulation processing unit 42 to the processing unit 43.

Transmission data D is the data other than the IPv4 header of an IPv4 packet in a case where the data in the data area in the TLV packet is an IPv4 packet. In this case, the data in the UDP header portion and the data in the data portion in the IPv4 packet are supplied from the demodulation processing unit 42 to the processing unit 43.

Transmission data E is the data portion in an IPv4 packet (or the payload of a UDP packet) in a case where the data in the data area in the TLV packet is an IPv4 packet. In this case, the payload of the UDP packet in the IPv4 packet is supplied from the demodulation processing unit 42 to the processing unit 43.

Transmission data F is the data other than the IPv6 header of an IPv6 packet in a case where the data in the data area in the TLV packet is an IPv6 packet. In this case, the data in the UDP header portion and the data in the data portion in the IPv6 packet are supplied from the demodulation processing unit 42 to the processing unit 43.

Transmission data G is the data portion in an IPv6 packet (or the payload of a UDP packet) in a case where the data in the data area in the TLV packet is an IPv6 packet. In this case, the payload of the UDP packet in the IPv6 packet is supplied from the demodulation processing unit 42 to the processing unit 43.

Transmission data H is the data portion (or the payload) in a compressed IP packet in a case where the data in the data area in the TLV packet is a compressed IP packet. In this case, the payload of the compressed IP packet is supplied from the demodulation processing unit 42 to the processing unit 43.

For example, in the case of the processing unit 43 requesting a supply of the entire TLV packet, the transmission data A is transmitted from the demodulation processing unit 42. Also, in the case of the processing unit 43 requesting a supply of part of the TLV packet, for example, one set of the transmission data B through H is transmitted from the demodulation processing unit 42 in accordance with the requested data.

In this manner, all or part of the TLV packet is supplied from the demodulation processing unit 42 to the processing unit 43. The TLV packet is a variable-length packet, and is a packet including an IP packet as described above. Such a TLV packet is transmitted from the demodulation processing unit 42, and is received by the processing unit 43.

In addition, the supply of the TLV packet is conducted at the timing based on the clock signal, the sync signal, and the valid signal, which have been described above with reference to FIG. 7. These signals and the timing of the data supply are now described in greater detail.

As described above, the data signal line might be formed with one to eight signal lines (one to eight bits). In the description below, the following example cases will be explained: an example case where one data signal line is provided, and 1-bit serial transmission is performed; an example case where the number of data signal lines is two, and 2-bit parallel transmission is performed; an example case where the number of data signal lines is four, and 4-bit parallel transmission is performed; and an example case where the number of data signal lines is eight, and 8-bit parallel transmission is performed.

It should be noted that the present technology can be applied to transmission other than the above described transmission, such as 3-bit parallel transmission, and is not limited to the example cases described below.

<Where the Clock Signal Changes, But the Valid Signal Does Not Change>

Referring first to FIGS. 9 through 12, data transmission in which the clock signal changes but the valid signal does not is described. It should be noted that, although the sync signal is not shown in FIGS. 9 through 12, the sync signal is supplied as the signal indicating the timing of the top of the packet included in the TLV, from the demodulation processing unit 42 to the processing unit 43, as in the case described above with reference to FIG. 7.

Figure 9:
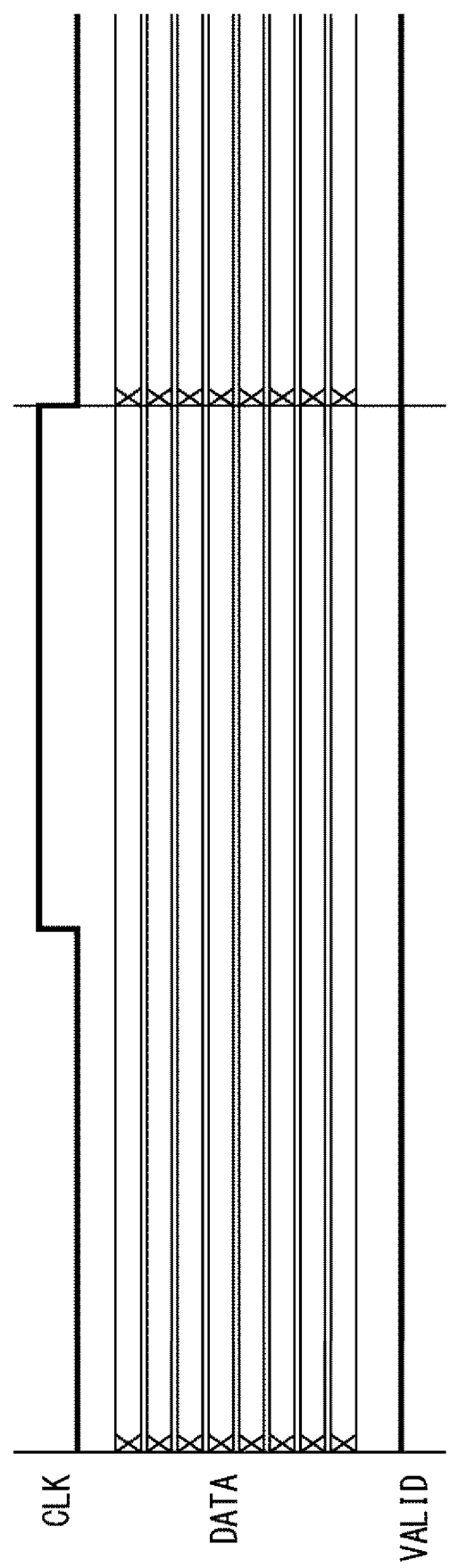
FIG. 9 is a diagram for explaining a clock signal in 8-bit parallel transmission.

FIG. 9 is a diagram showing the waveforms of the clock signal, the data signal, and the valid signal in the case of 8-bit parallel transmission. As 8-bit parallel transmission is performed, eight data signal lines are provided between the demodulation processing unit 42 and the processing unit 43, and 8-bit data is transmitted in one cycle of the clock signal, as shown in FIG. 9. The valid signal is always at the H-level, which means that the valid signal indicates a valid section in which a packet exists in this case.

The processing unit 43 can receive (latch) the data of a data signal at each rising edge of the clock signal. It should be noted that, although data is to be latched at each rising edge of the clock signal in the description continued below, data may be latched at each falling edge of the clock signal.

The clock signal shown in FIG. 9 is in a rising edge mode, but the clock signal may be in a falling edge mode. In the description below, the other signals are similar to the clock signal, and example cases of rising edge modes will be described unless otherwise specifically mentioned. However, the present technology may also be applied in cases of falling edge modes as in cases of rising edge modes.

Figure 10:
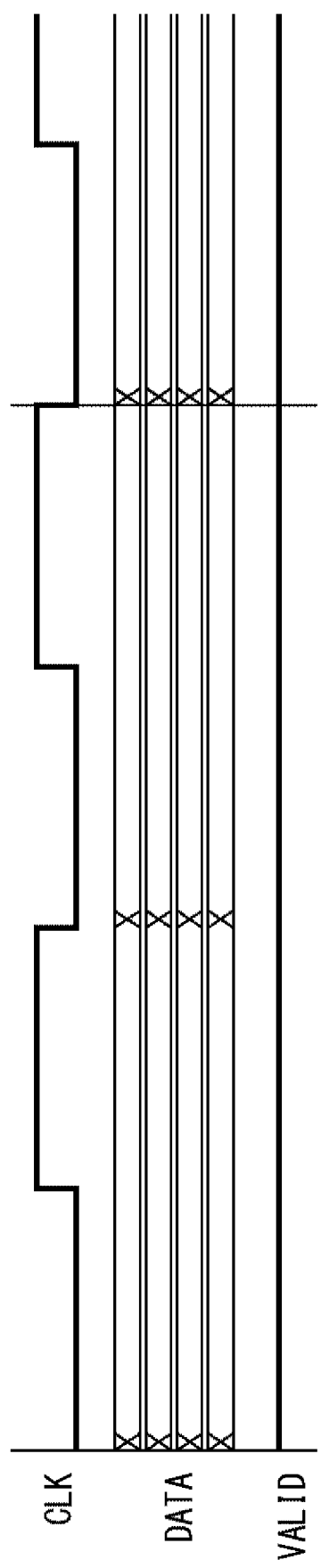
FIG. 10 is a diagram for explaining a clock signal in 4-bit parallel transmission.

FIG. 10 is a diagram showing the waveforms of the clock signal, the data signal, and the valid signal in the case of 4-bit parallel transmission. As 4-bit parallel transmission is performed, four data signal lines are provided between the demodulation processing unit 42 and the processing unit 43. As shown in FIG. 10, 4-bit data is transmitted in one cycle of the clock signal, and 8-bit data is transmitted in two cycles of the clock signal. The valid signal is always at the H-level.

Figure 11:
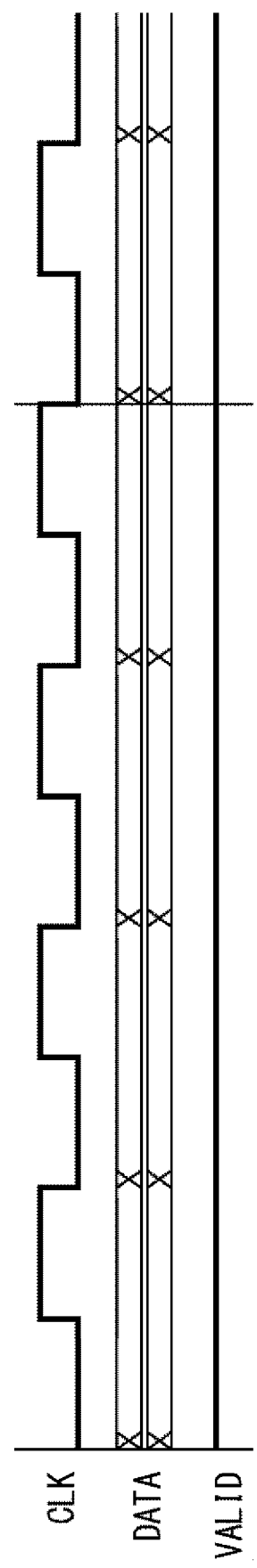
FIG. 11 is a diagram for explaining a clock signal in 2-bit parallel transmission.

FIG. 11 is a diagram showing the waveforms of the clock signal, the data signal, and the valid signal in the case of 2-bit parallel transmission. As 2-bit parallel transmission is performed, two data signal lines are provided between the demodulation processing unit 42 and the processing unit 43. As shown in FIG. 11, 2-bit data is transmitted in one cycle of the clock signal, and 8-bit data is transmitted in four cycles of the clock signal. The valid signal is always at the H-level.

Figure 12:
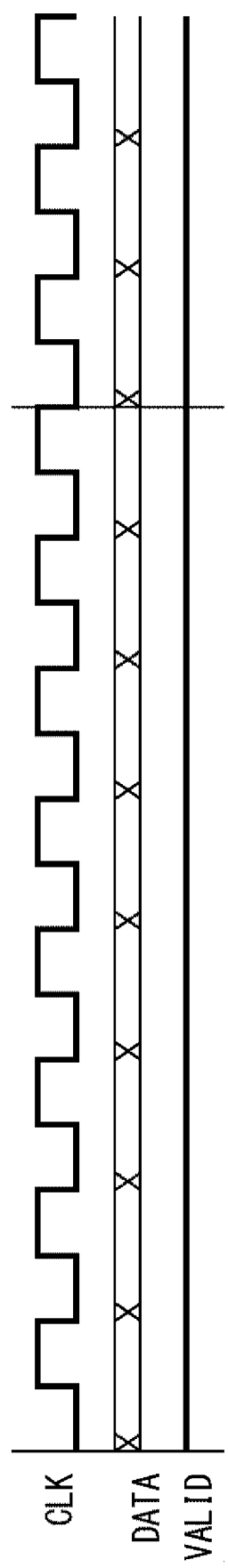
FIG. 12 is a diagram for explaining a clock signal in 1-bit serial transmission.

FIG. 12 is a diagram showing the waveforms of the clock signal, the data signal, and the valid signal in the case of 1-bit serial transmission. As 1-bit serial transmission is performed, one data signal line is provided between the demodulation processing unit 42 and the processing unit 43. As shown in FIG. 12, 1-bit data is transmitted in one cycle of the clock signal, and 8-bit data is transmitted in eight cycles of the clock signal. The valid signal is always at the H-level.

As described above, the valid signal is maintained at the H-level, which indicates a valid section, and the frequency of the clock signal varies with the number of bits to be transmitted at once. In this manner, data is transmitted.

For example, in a case where eight data signal lines are provided between the demodulation processing unit 42 and the processing unit 43, data is transmitted in accordance with the clock signal and the valid signal shown in FIG. 9. Also, in a case where one data signal line is provided between the demodulation processing unit 42 and the processing unit 43, for example, data is transmitted in accordance with the clock signal and the valid signal shown in FIG. 12.

In each of the cases of the clock signals described above with reference to FIGS. 9 through 12, the frequency of the clock signal can vary with the number of bits to be transmitted in one cycle. For example, in accordance with the frequency of the clock signal at which the processing unit 43 can perform processing, the demodulation processing unit 42 performs the control described above with reference to one of FIGS. 9 through 12, so that a TLV can be transmitted and received.

As is apparent from a comparison between the frequency of the clock signal in the 8-bit parallel transmission shown in FIG. 9 and the frequency of the clock signal in the 1-bit serial transmission shown in FIG. 12, the frequency of the clock signal in the 1-bit serial transmission shown in FIG. 12 is higher than the frequency of the clock signal in the 8-bit parallel transmission shown in FIG. 9.

If the number of bits to be transmitted in one cycle of the clock signal is small, or, in other words, if the number of signal lines is small, or, further in other words, if the number of pins to be used for data transmission among the pins of the LSI forming the processing unit 43 is small, the frequency of the clock signal is high. Meanwhile, broadcasting is becoming even higher in resolution. As the resolution becomes higher, the amount of data to be transmitted from the demodulation processing unit 42 to the processing unit 43 becomes larger.

To transmit a larger amount of data, the frequency of the clock signal needs to be made higher. However, there is an upper limit to the frequency of the clock signal. Furthermore, power consumption cannot be effectively reduced simply by increasing the frequency of the clock signal.

For example, to transmit a large amount of data without an increase in the frequency of the clock signal, the number of pins in the LSI is increased, and for example, 8-bit parallel transmission is performed. However, not increasing the number of pins in the LSI is also desirable.

In view of the above facts, when the 4-bit parallel transmission shown in FIG. 10 is performed, for example, the number of pins to be used in the data transmission at the processing unit 43 is set at four so that the frequency can be relatively low. According to the present technology, it is possible to perform data transmission using a clock signal suitable for the number of pins, such as the above described four pins, and the transmission can be performed as TLV transmission.

<Where the Clock Signal Is Suspended, And the Valid Signal Does Not Change>

Referring now to FIGS. 13 through 16, data transmission in which the clock signal has the same frequency regardless of the number of bits to be transmitted (the number of signal lines) but is suspended in each invalid data section, and the valid signal does not change is described.

Figure 13:
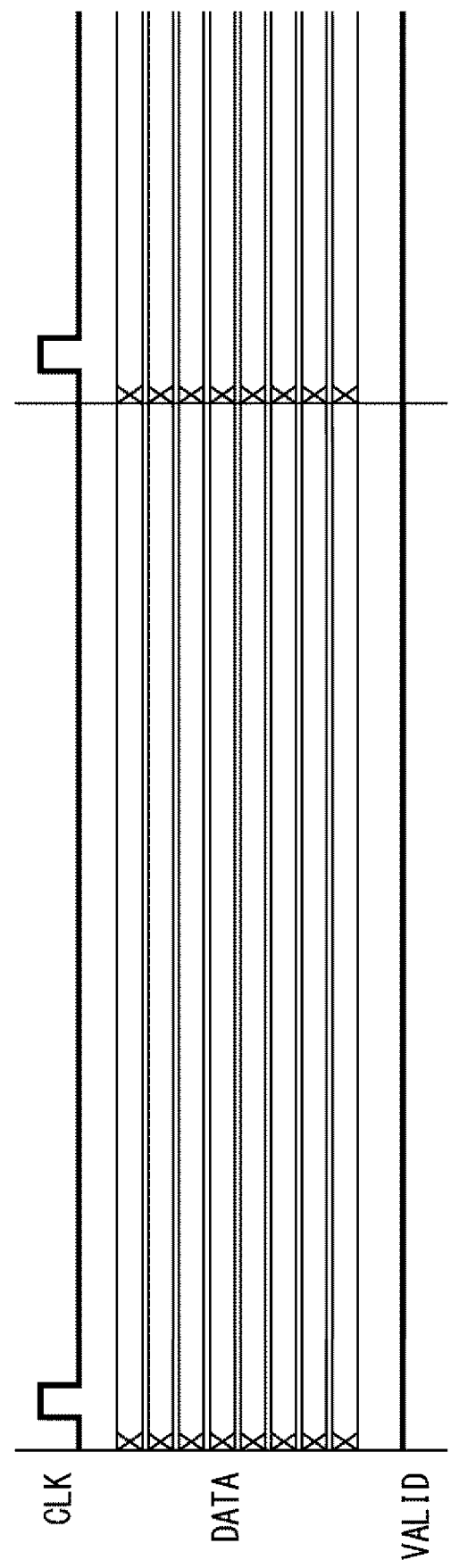
FIG. 13 is a diagram for explaining another clock signal in 8-bit parallel transmission.

FIG. 13 is a diagram showing the waveforms of the clock signal, the data signal, and the valid signal in the case of 8-bit parallel transmission. As 8-bit parallel transmission is performed, 8-bit data is transmitted in one cycle of the clock signal, as shown in FIG. 13.

As the processing unit 43 latches the data of the data signal at a rising edge of the clock signal, the clock signal is suspended (lowered) after the passage of time equivalent to one cycle until the next data transmission timing (during a byte gap). The valid signal is always at the H-level, which means that the valid signal indicates a valid section in which a packet exists in this case.

Figure 14:
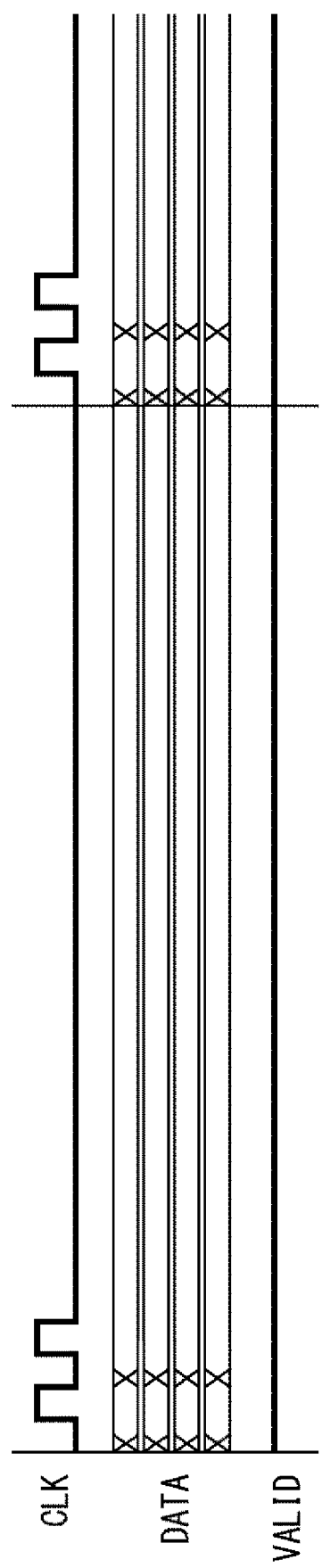
FIG. 14 is a diagram for explaining another clock signal in 4-bit parallel transmission.

FIG. 14 is a diagram showing the waveforms of the clock signal, the data signal, and the valid signal in the case of 4-bit parallel transmission. As 4-bit parallel transmission is performed, 4-bit data is transmitted in one cycle of the clock signal, and 8-bit data is transmitted in two cycles of the clock signal, as shown in FIG. 14. The valid signal is always at the H-level.

As 8-bit data is transmitted in two cycles, and the processing unit 43 can also latch the 8-bit data in the two cycles, the clock signal is suspended (lowered) after the passage of time equivalent to two cycles until the next data transmission timing (during a byte gap).

Figure 15:
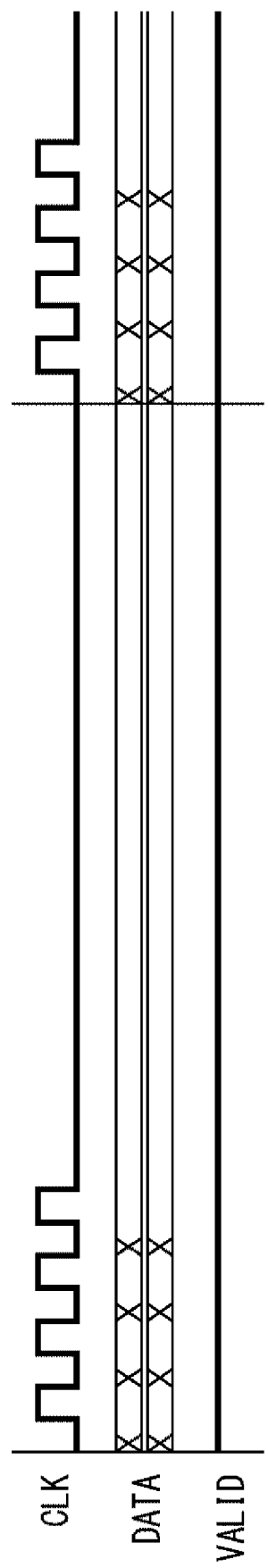
FIG. 15 is a diagram for explaining another clock signal in 2-bit parallel transmission.

FIG. 15 is a diagram showing the waveforms of the clock signal, the data signal, and the valid signal in the case of 2-bit parallel transmission. As 2-bit parallel transmission is performed, 2-bit data is transmitted in one cycle of the clock signal, and 8-bit data is transmitted in four cycles of the clock signal, as shown in FIG. 15. The valid signal is always at the H-level.

As 8-bit data is transmitted in four cycles, and the processing unit 43 can also latch the 8-bit data in the four cycles, the clock signal is suspended (lowered) after the passage of time equivalent to four cycles until the next data transmission timing (during a byte gap).

Figure 16:
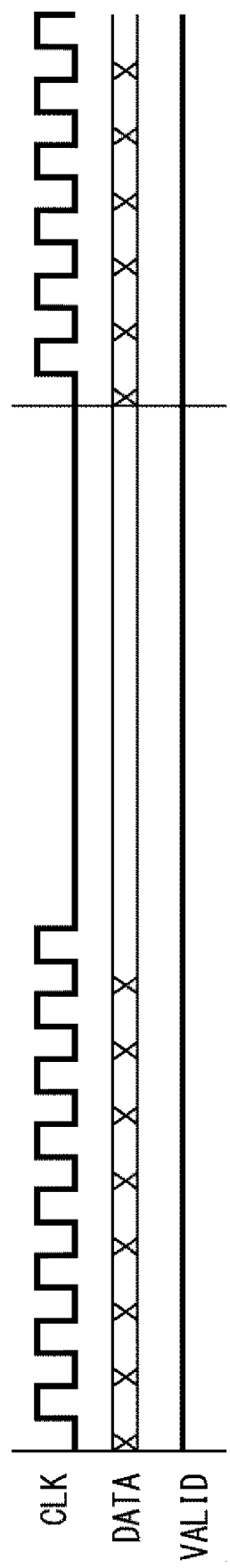
FIG. 16 is a diagram for explaining another clock signal in 1-bit serial transmission.

FIG. 16 is a diagram showing the waveforms of the clock signal, the data signal, and the valid signal in the case of 1-bit serial transmission. As 1-bit serial transmission is performed, 1-bit data is transmitted in one cycle of the clock signal, and 8-bit data is transmitted in eight cycles of the clock signal, as shown in FIG. 16. The valid signal is always at the H-level.

As 8-bit data is transmitted in eight cycles, and the processing unit 43 can also latch the 8-bit data in the eight cycles, the clock signal is suspended (lowered) after the passage of time equivalent to eight cycles until the next data transmission timing (during a byte gap).

As described above, the valid signal is maintained at the H-level, which indicates a valid section, and the frequency of the clock signal remains the same regardless of the number of bits to be transmitted at once. The clock signal is in a suspended state after the transmission until the next transmission timing.

For example, in a case where eight data signal lines are provided between the demodulation processing unit 42 and the processing unit 43, data is transmitted in accordance with the clock signal and the valid signal shown in FIG. 13. Also, in a case where one data signal line is provided between the demodulation processing unit 42 and the processing unit 43, for example, data is transmitted in accordance with the clock signal and the valid signal shown in FIG. 16.

In each of the cases of the clock signals described above with reference to FIGS. 13 through 16, the frequency of the clock signal is constant regardless of the number of bits to be transmitted in one cycle. For example, the clock signal is set at a frequency at which the processing unit 43 can perform processing, and, at the set frequency, the demodulation processing unit 42 performs the control described above with reference to one of FIGS. 13 through 16, so that a TLV can be transmitted and received.

Furthermore, the clock signal is suspended during each byte gap. Thus, the power to be consumed on the clock frequency can be reduced, and the receiver 11 can be made to consume less power.

<Where the Clock Signal Constantly Oscillates, and the Valid Signal is Lowered as Appropriate>

Referring now to FIGS. 17 through 20, data transmission in which the clock signal has the same frequency regardless of the number of bits to be transmitted (the number of signal lines) and constantly oscillates, and the valid signal is lowered in each invalid data section is described.

Figure 17:
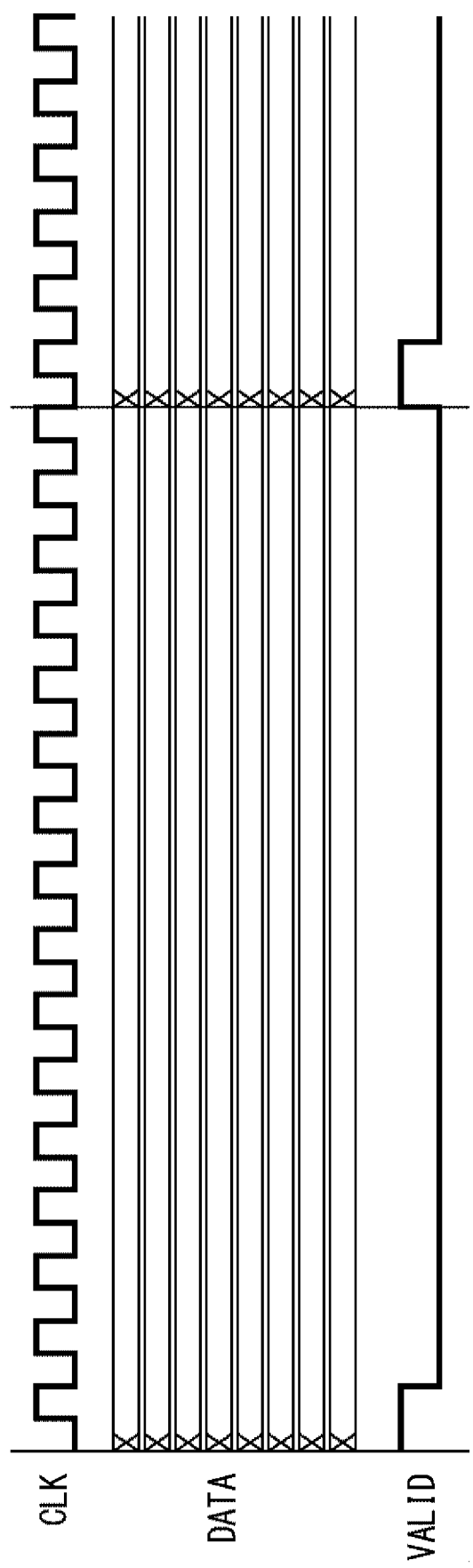
FIG. 17 is a diagram for explaining another clock signal in 8-bit parallel transmission.

FIG. 17 is a diagram showing the waveforms of the clock signal, the data signal, and the valid signal in the case of 8-bit parallel transmission. As 8-bit parallel transmission is performed, 8-bit data is transmitted in one cycle of the clock signal, and, only during the one cycle, the valid signal is at the H-level, which indicates a valid section, as shown in FIG. 17.

As transmission of 8-bit data is completed in one cycle of the clock signal, the valid signal is suspended (lowered) after the passage of time equivalent to one cycle until the next data transmission timing (during a byte gap).

Figure 18:
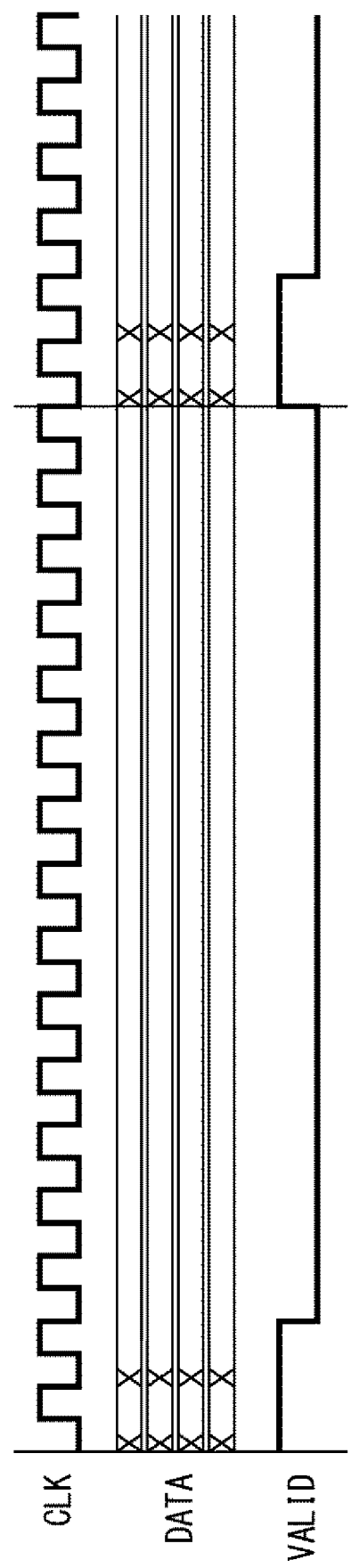
FIG. 18 is a diagram for explaining another clock signal in 4-bit parallel transmission.

FIG. 18 is a diagram showing the waveforms of the clock signal, the data signal, and the valid signal in the case of 4-bit parallel transmission. As 4-bit parallel transmission is performed, 8-bit data is transmitted in two cycles of the clock signal, and, during that time, the valid signal is at the H-level, as shown in FIG. 18. During each byte gap, the valid signal is suspended (lowered).

Figure 19:
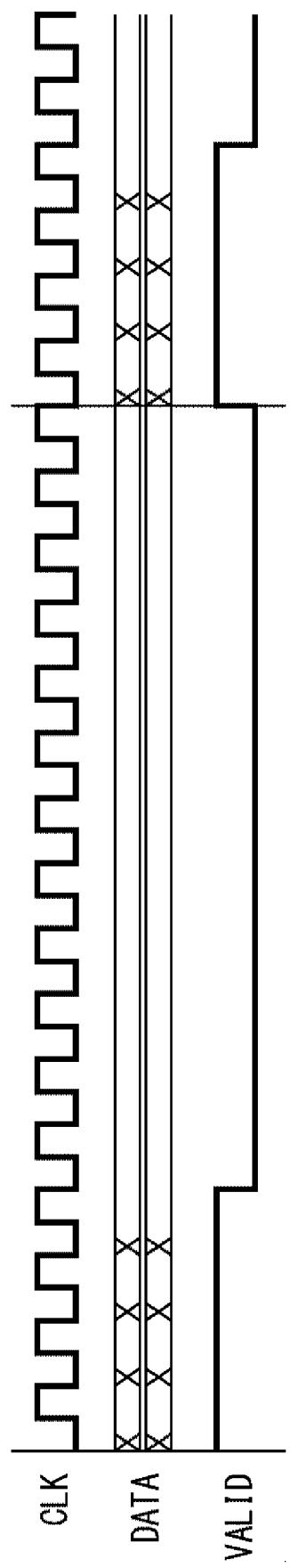
FIG. 19 is a diagram for explaining another clock signal in 2-bit parallel transmission.

FIG. 19 is a diagram showing the waveforms of the clock signal, the data signal, and the valid signal in the case of 2-bit parallel transmission. As 2-bit parallel transmission is performed, 8-bit data is transmitted in four cycles of the clock signal, and, during that time, the valid signal is at the H-level, as shown in FIG. 19. During each byte gap, the valid signal is suspended (lowered).

Figure 20:
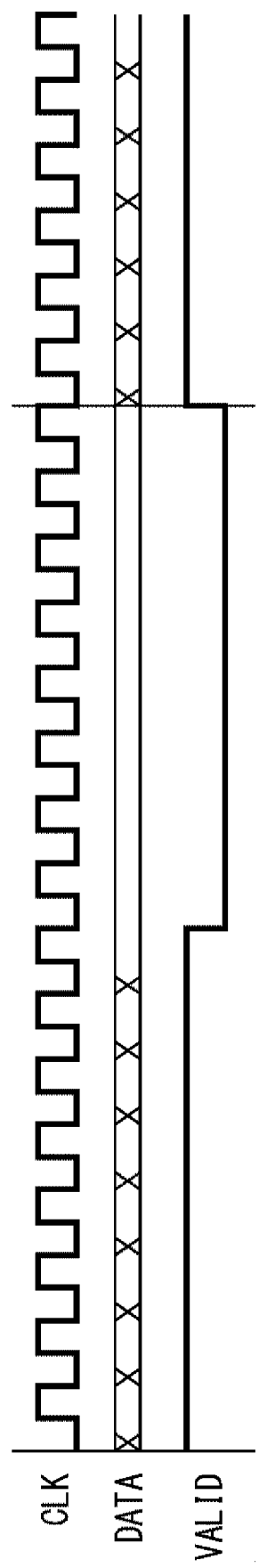
FIG. 20 is a diagram for explaining another clock signal in 1-bit serial transmission.

FIG. 20 is a diagram showing the waveforms of the clock signal, the data signal, and the valid signal in the case of 1-bit serial transmission. As 1-bit serial transmission is performed, 8-bit data is transmitted in eight cycles of the clock signal, and, during that time, the valid signal is at the H-level, as shown in FIG. 20. During each byte gap, the valid signal is suspended (lowered).

As described above, the valid signal is at the H-level only during the valid section, and the clock signal constantly oscillates regardless of the number of bits to be transmitted at once.

For example, in a case where eight data signal lines are provided between the demodulation processing unit 42 and the processing unit 43, data is transmitted in accordance with the clock signal and the valid signal shown in FIG. 17. Also, in a case where one data signal line is provided between the demodulation processing unit 42 and the processing unit 43, for example, data is transmitted in accordance with the clock signal and the valid signal shown in FIG. 20.

In each of the cases of the clock signals described above with reference to FIGS. 17 through 20, the frequency of the clock signal is constant regardless of the number of bits to be transmitted in one cycle. For example, the clock signal is set at a frequency at which the processing unit 43 can perform processing, and, at the set frequency, the demodulation processing unit 42 performs the control described above with reference to one of FIGS. 17 through 20, so that a TLV can be transmitted and received.

This is also effective for the processing unit 43 that cannot keep operating properly if the supply of the clock signal is stopped.

<Signals During a Gap in a Packet or Between Packets in the Case of 8-Bit Parallel Transmission>

The clock signal and the valid signal at a time of 8-bit data transmission have been described with reference to FIGS. 9 through 20. In addition to that, the clock signal and the valid signal at a time of transmission of variable-length packet data are now described. When variable-length packet data is transmitted, an in-packet gap or an inter-packet gap might appear.

An in-packet gap does not constantly appear, but appears in a parity portion or a portion existing in two slots or the like, for example. An inter-packet gap appears when there is no transmission data between packets, and appears in a portion in which a null packet exists.

Suspending the clock signal in portions in which an in-packet gap or an inter-packet gap appears is now described.

Figure 21:
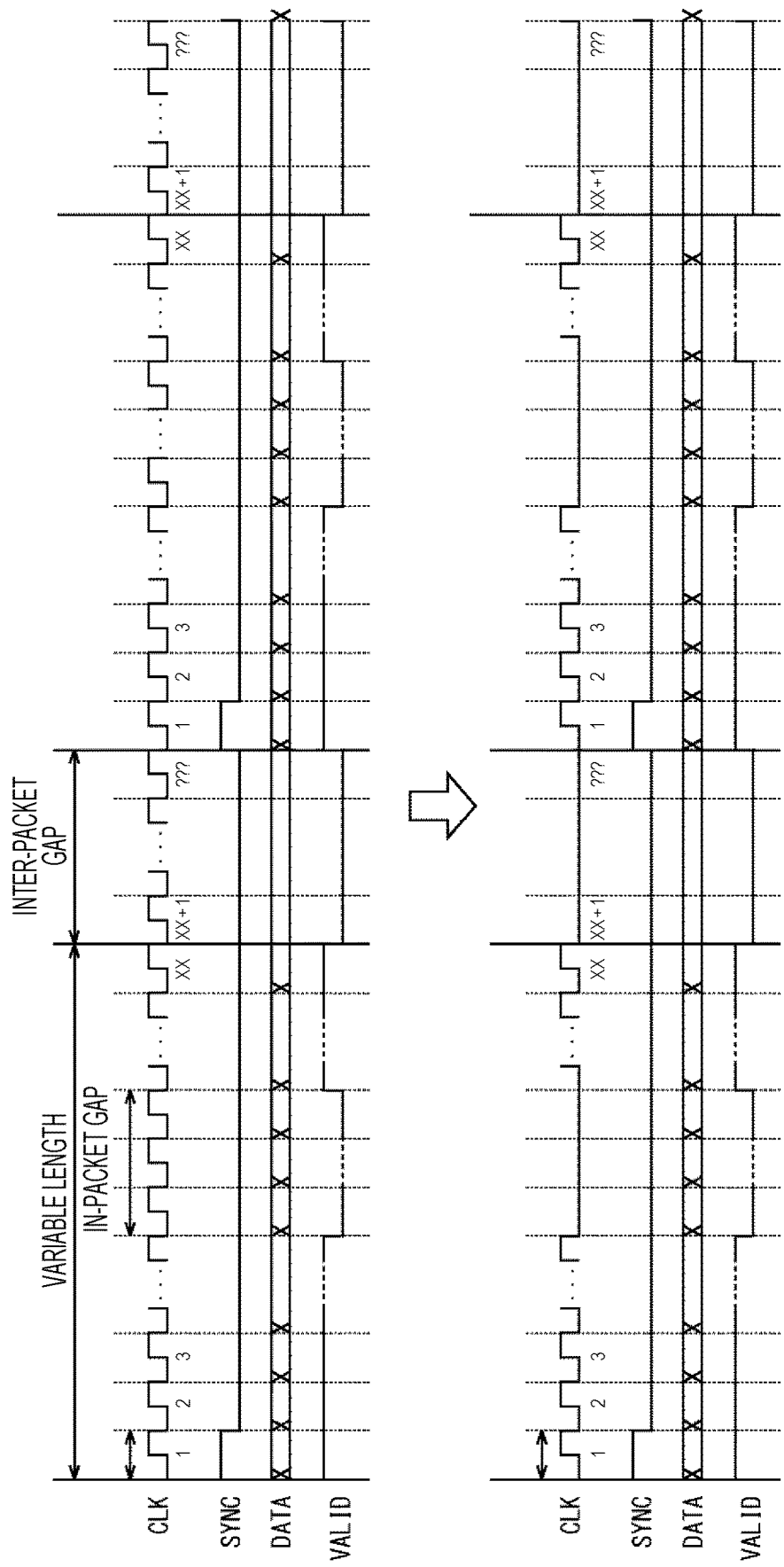
FIG. 21 is a diagram for explaining suspension of a clock signal in 8-bit parallel transmission.
Figure 22:
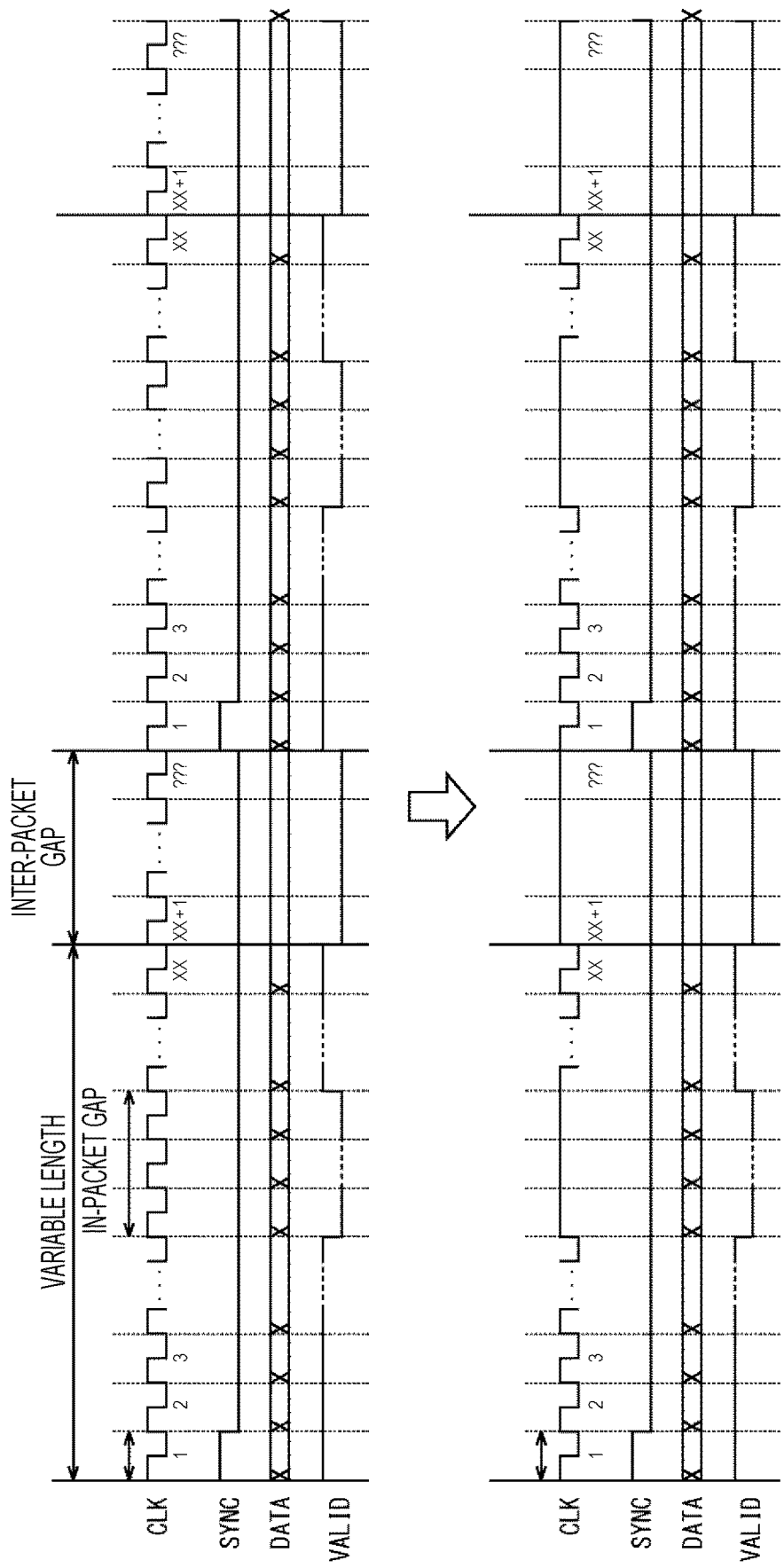
FIG. 22 is a diagram for explaining suspension of a clock signal in 8-bit parallel transmission.

Referring to FIGS. 21 and 22, cases where the clock signal is suspended in sections having gaps therein in 8-bit parallel transmission are described. FIG. 21 shows a case where the clock signal is in the rising edge mode. FIG. 22 shows a case where the clock signal is in the falling edge mode.

FIG. 21 is a diagram showing the waveforms of the clock signal, the data signal, and the valid signal in the case of 8-bit parallel transmission. The upper diagram in FIG. 21 shows a case where the clock signal constantly oscillates. The lower diagram in FIG. 21 shows a case where the clock signal is suspended when a gap appears.

The sync signal indicates the timing of the top of each packet included in the TLV, and only at the timing of the top of each packet, the sync signal temporarily switches from the low (L) level to the high (H) level. The clock signal constantly oscillates in the example shown in the upper diagram in FIG. 21.

The valid signal is at the H-level in the sections (valid sections) in which there is a packet, and is at the L-level in the sections (invalid sections) other than the valid sections. As 8-bit parallel transmission is performed, 8-bit data in one packet is transmitted in one cycle of the clock signal when the valid signal is at the H-level. It should be noted that, in FIG. 21, the data signal is not shown as an 8-bit data signal but as a 1-bit data signal. This also applies in FIG. 22, which will be described later.

As shown in the upper diagram in FIG. 21, when an in-packet gap appears, the valid signal is switched from the H-level to the L-level, to indicate an invalid section. Likewise, when an inter-packet gap appears, the valid signal is switched from the H-level to the L-level, to indicate an invalid section.

In the example shown in the upper diagram in FIG. 21, the clock signal continues to oscillate, regardless of whether an in-packet gap or an inter-packet gap appears, or, in other words, whether the valid signal indicates a valid section (or an invalid section).

In a case where the processing unit 43 does not allow suspension of the clock signal, for example, control is performed to maintain a state in which the clock signal constantly oscillates, as shown in the upper diagram in FIG. 21.

In a case where the processing unit 43 allows suspension of the clock signal, the oscillation of the clock signal is suspended when a gap appears, as shown in the lower diagram in FIG. 21.

As shown in the lower diagram in FIG. 21, when an in-packet gap appears, or, in other words, when the valid signal indicates an invalid section, the oscillation of the clock signal is suspended (the clock signal is lowered). In addition, when an inter-packet gap appears, or, in other words, when the valid signal indicates an invalid section, the oscillation of the clock signal is also suspended (the clock signal is lowered).

In this manner, the clock signal is suspended in each section in which a gap appears. Thus, power consumption can be reduced.

It should be noted that, in the example shown in the lower diagram in FIG. 21, the valid signal is set at the L-level indicating an invalid section in each section in which the clock signal is suspended. This is merely an example, and, in each section in which the clock signal is suspended, the valid signal may be set at the L-level indicating an invalid section, or may be set at the H-level indicating a valid section.

Even if the valid signal indicates a valid section, the clock signal is suspended, and therefore, the processing unit 43 does not latch data. Because of this, in a case where the clock signal is suspended when a gap appears and data is invalid, the valid signal may be maintained at the H-level indicating a valid section, or may be lowered to the L-level indicating an invalid section.

FIGS. 22 through 26, which will be described later, also show examples where the valid signal is set at the L-level indicating an invalid section while the clock signal is suspended. However, the level of the valid signal in the sections in which the clock signal is suspended may be either the H-level or the L-level.

When a byte gap appears, the clock signal may also be suspended. In a case where the clock signal is suspended when a byte gap appears, the control described above with reference to FIG. 13 can be performed.

FIG. 22 is a diagram showing the waveforms of the clock signal, the data signal, and the valid signal in the case of 8-bit parallel transmission. The upper diagram in FIG. 22 shows a case where the clock signal constantly oscillates. The lower diagram in FIG. 22 shows a case where the clock signal is suspended when a gap appears.

The clock signal shown in FIG. 22 is in the falling edge mode. Except for this aspect, the example case shown in FIG. 22 is similar to the case shown in FIG. 21 where the clock signal is in the rising edge mode, and therefore, explanation of the case shown in FIG. 22 is not made herein.

The present technology can be applied in any case where the clock signal is either in the rising edge mode or in the falling edge mode. Also, the embodiment described with reference to FIGS. 21 and 21, and the embodiment described with reference to FIGS. 9 through 20 can be combined as appropriate.

Although examples of 8-bit parallel transmission have been described with reference to FIGS. 21 and 22, the oscillation of the clock signal can be controlled in other parallel transmission, such as 4- and 2-bit parallel transmission, in a manner similar to that in the above described 8-bit parallel transmission. That is, the present technology can be applied to parallel transmission other than 8-bit parallel transmission.

<Signals During a Gap in a Packet or Between Packets in the Case of 1-Bit Serial Transmission>

Figure 23:
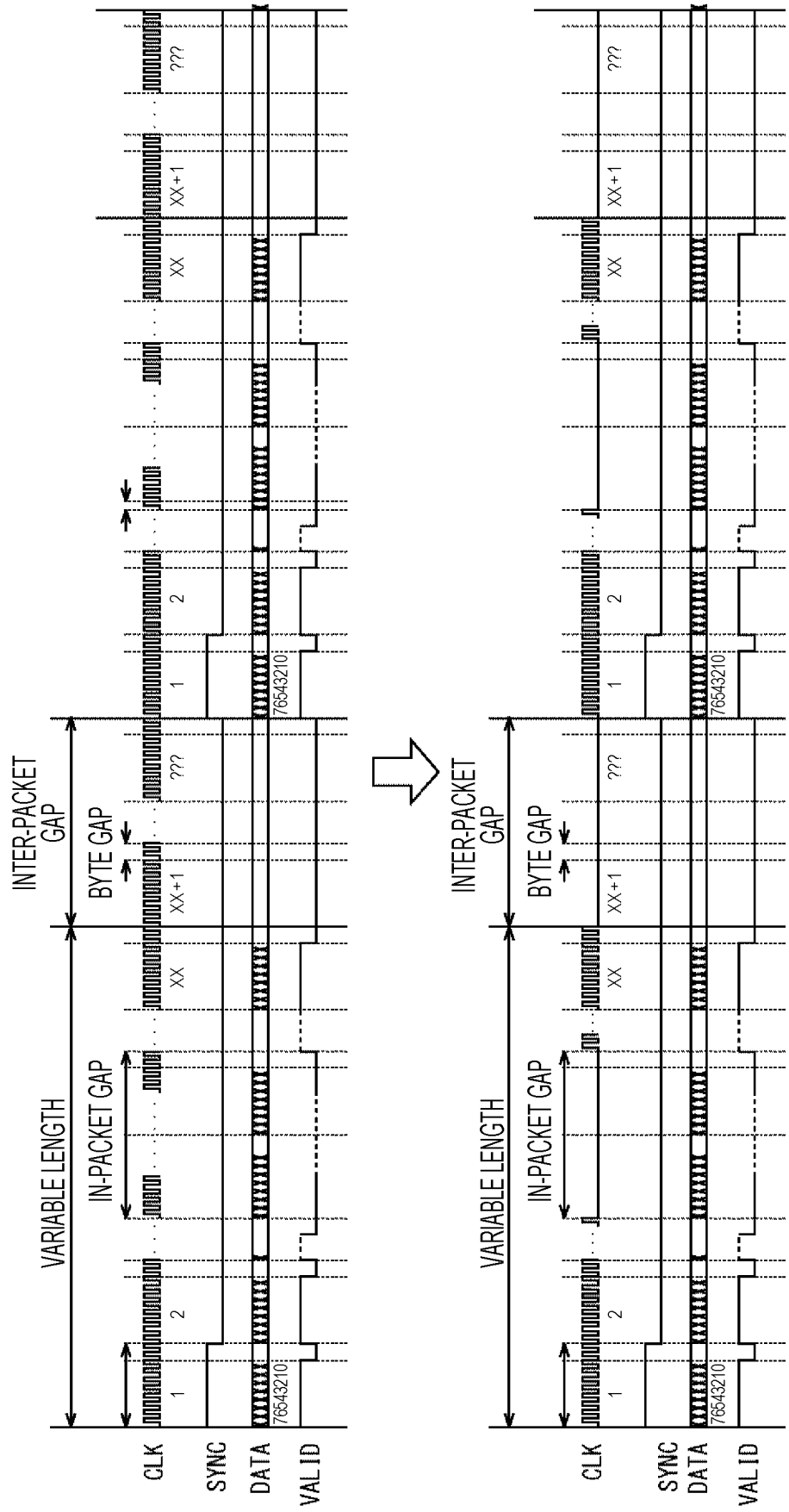
FIG. 23 is a diagram for explaining suspension of a clock signal in 1-bit serial transmission.
Figure 24:
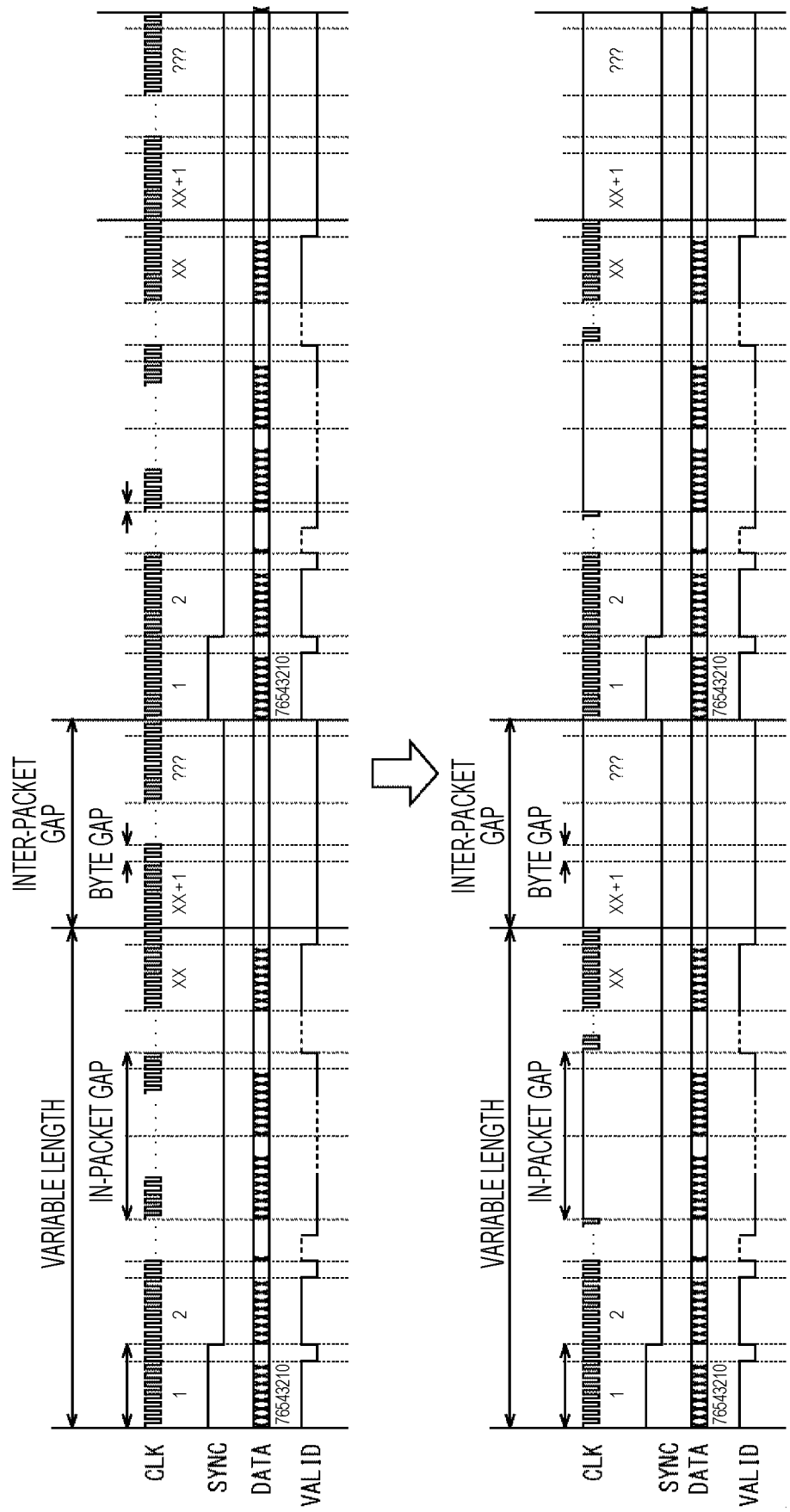
FIG. 24 is a diagram for explaining suspension of a clock signal in 1-bit serial transmission.

Referring now to FIGS. 23 and 24, cases where the clock signal is suspended in sections having gaps therein in 1-bit serial transmission are described. FIG. 23 shows a case where the clock signal is in the rising edge mode. FIG. 24 shows a case where the clock signal is in the falling edge mode.

FIG. 23 is a diagram showing the waveforms of the clock signal, the data signal, and the valid signal in the case of 1-bit serial transmission. The upper diagram in FIG. 23 shows a case where the clock signal constantly oscillates. The lower diagram in FIG. 23 shows a case where the clock signal is suspended when a gap appears.

As 1-bit serial transmission is performed, when the valid signal is at the H-level, 1-bit data in one packet is transmitted in one cycle of the clock signal, and 8-bit data is transmitted in eight cycles. The valid signal is at the H-level in the sections (valid sections) in which there is a packet, and is at the L-level in the sections (invalid sections) other than the valid sections. Accordingly, in each section with an in-packet gap or an inter-packet gap, the valid signal is at the L-level indicating an invalid section. Also, in a case where a byte gap appears, the valid signal in the gap section is also at the L-level indicating an invalid section.

In the example shown in the upper diagram in FIG. 23, the clock signal continues to oscillate, regardless of whether an in-packet gap or an inter-packet gap appears, or, in other words, whether the valid signal indicates a valid section (or an invalid section), as in the case described with reference to the upper diagram in FIG. 21.

In a case where the processing unit 43 does not allow suspension of the clock signal, for example, control is performed to maintain a state in which the clock signal constantly oscillates, as shown in the upper diagram in FIG. 23.

In a case where the processing unit 43 allows suspension of the clock signal, the oscillation of the clock signal is suspended when a gap appears, as shown in the lower diagram in FIG. 23.

As shown in the lower diagram in FIG. 23, when an in-packet gap appears or when an inter-packet gap appears, or, in other words, when the valid signal indicates an invalid section (not the invalid section during a byte gap), the oscillation of the clock signal is suspended (the clock signal is lowered).

In this manner, the clock signal is suspended in each section in which an in-packet gap or an inter-packet gap appears. Thus, power consumption can be reduced.

FIG. 24 is a diagram showing the waveforms of the clock signal, the data signal, and the valid signal in the case of 1-bit serial transmission. The upper diagram in FIG. 24 shows a case where the clock signal constantly oscillates. The lower diagram in FIG. 24 shows a case where the clock signal is suspended when a gap appears.

The clock signal shown in FIG. 24 is in the falling edge mode. Except for this aspect, the example case shown in FIG. 24 is similar to the case shown in FIG. 23 where the clock signal is in the rising edge mode, and therefore, explanation of the case shown in FIG. 24 is not made herein.

The present technology can be applied in any case where the clock signal is either in the rising edge mode or in the falling edge mode.

In the cases described with reference to FIGS. 23 and 24, the oscillation of the clock signal is not suspended when a byte gap appears. However, the oscillation of the clock signal may also be suspended when a byte gap appears.

Figure 25:
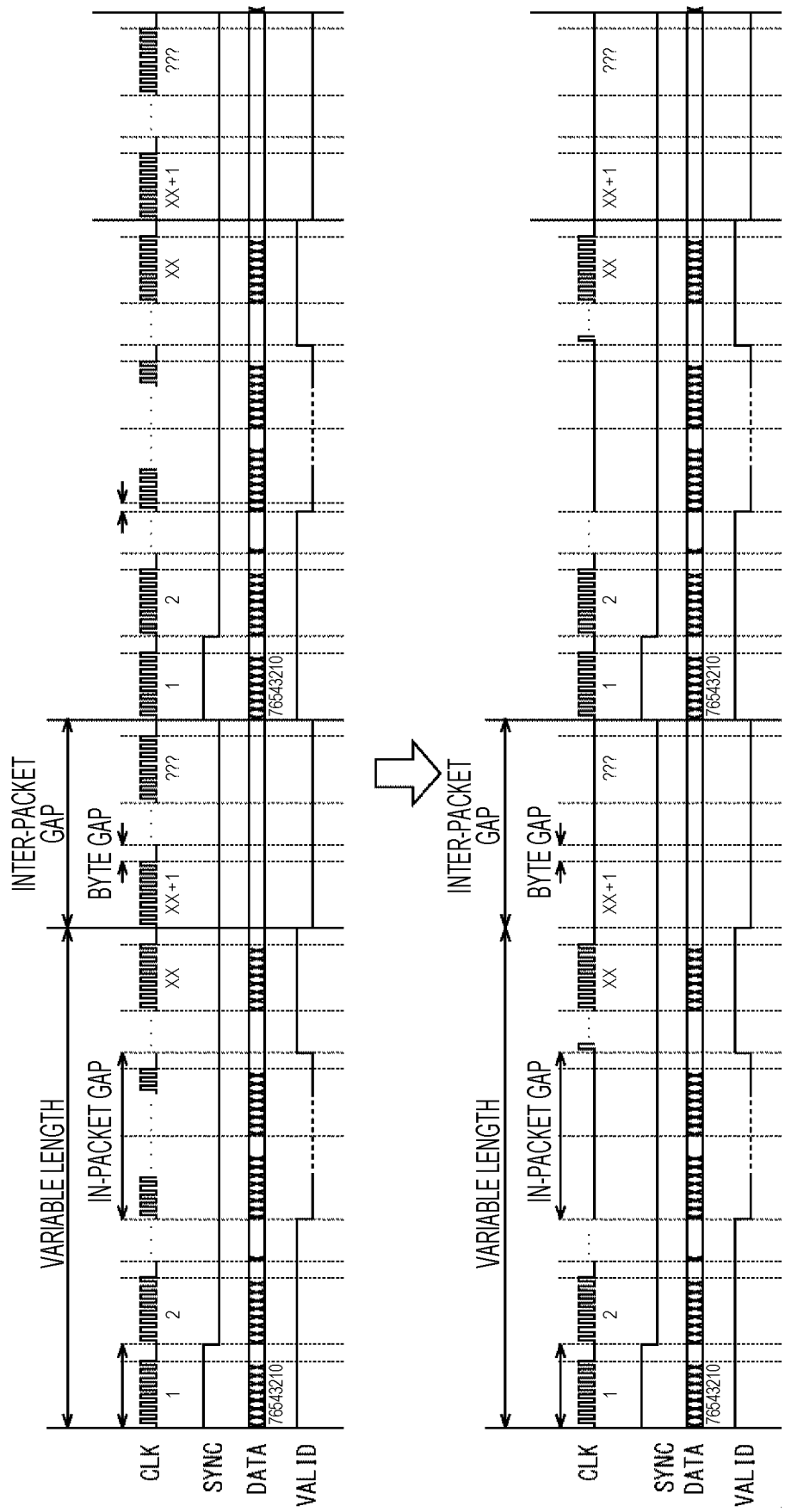
FIG. 25 is a diagram for explaining suspension of a clock signal in 1-bit serial transmission.
Figure 26:
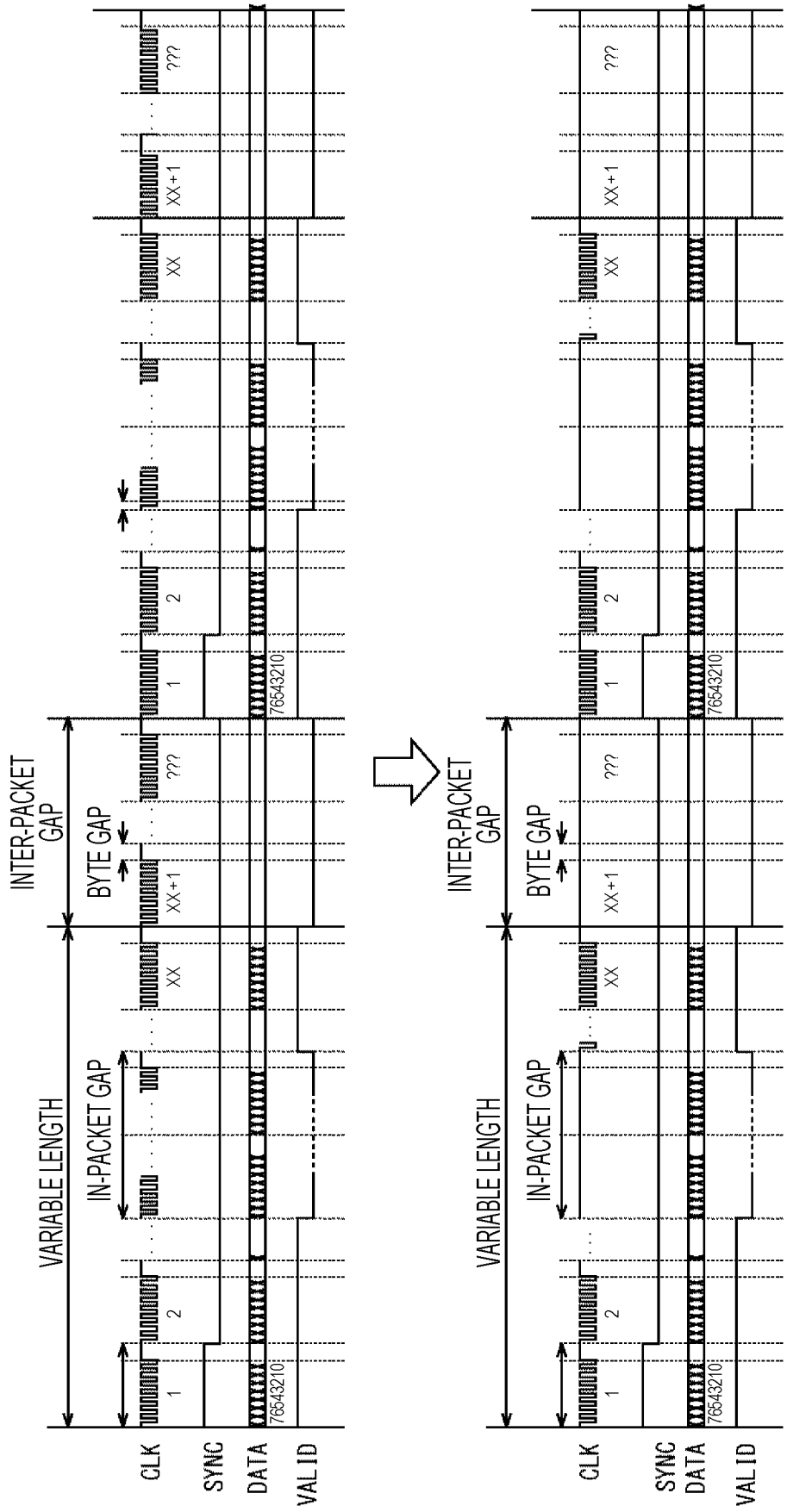
FIG. 26 is a diagram for explaining suspension of a clock signal in 1-bit serial transmission.

Referring now to FIGS. 25 and 26, other cases where the clock signal is suspended in 1-bit serial transmission are described. FIG. 25 shows a case where the clock signal is in the rising edge mode. FIG. 26 shows a case where the clock signal is in the falling edge mode.

FIG. 25 is a diagram showing the waveforms of the clock signal, the data signal, and the valid signal in the case of 1-bit serial transmission. The upper diagram in FIG. 25 shows a case where the clock signal constantly oscillates, except for the sections having a byte gap. The lower diagram in FIG. 25 shows a case where the clock signal is suspended when a gap appears.

The valid signal is at the H-level in sections (valid sections) in which there is a packet, and is at the L-level in the sections (invalid sections) other than the valid sections. However, in the examples shown in the upper and lower diagrams in FIG. 25, the valid signal remains at the H-level when a byte gap appears, and is set at the L-level when an in-packet gap or an inter-packet gap appears.

The case described with reference to FIG. 16 is applied in the examples shown in FIG. 25, which shows cases where the valid signal is maintained at the H-level in the sections in which neither an in-packet gap nor an inter-packet gap appears, and the clock signal is suspended when a byte gap appears.

In the example shown in the upper diagram in FIG. 25, the clock signal continues to oscillate, regardless of whether an in-packet gap or an inter-packet gap appears, or, in other words, whether the valid signal indicates a valid section (or an invalid section). However, the clock signal is suspended only when a byte gap appears.

As shown in the lower diagram in FIG. 25, when an in-packet gap appears or when an inter-packet gap appears, or, in other words, when the valid signal indicates an invalid section, the oscillation of the clock signal is suspended (the clock signal is lowered).

When a byte gap appears but the valid signal indicates a valid section, the oscillation of the clock signal is also suspended (the clock signal is lowered).

In this manner, the clock signal is suspended in each section in which an in-packet gap, an inter-packet gap, or a byte gap appears. Thus, power consumption can be reduced.

FIG. 26 is a diagram showing the waveforms of the clock signal, the data signal, and the valid signal in the case of 1-bit serial transmission. The upper diagram in FIG. 26 shows a case where the clock signal constantly oscillates. The lower diagram in FIG. 26 shows a case where the clock signal is suspended when a gap appears.

The clock signal shown in FIG. 26 is in the falling edge mode. Except for this aspect, the example case shown in FIG. 26 is similar to the case shown in FIG. 25 where the clock signal is in the rising edge mode, and therefore, explanation of the case shown in FIG. 26 is not made herein.

The present technology can be applied in any case where the clock signal is either in the rising edge mode or in the falling edge mode. Also, the embodiment described with reference to FIGS. 23 through 26, and the embodiment described with reference to FIGS. 9 through 20 can be combined as appropriate.

<Transmission or an Error Signal>

Next, transmission of an error signal is described.

Figure 27:
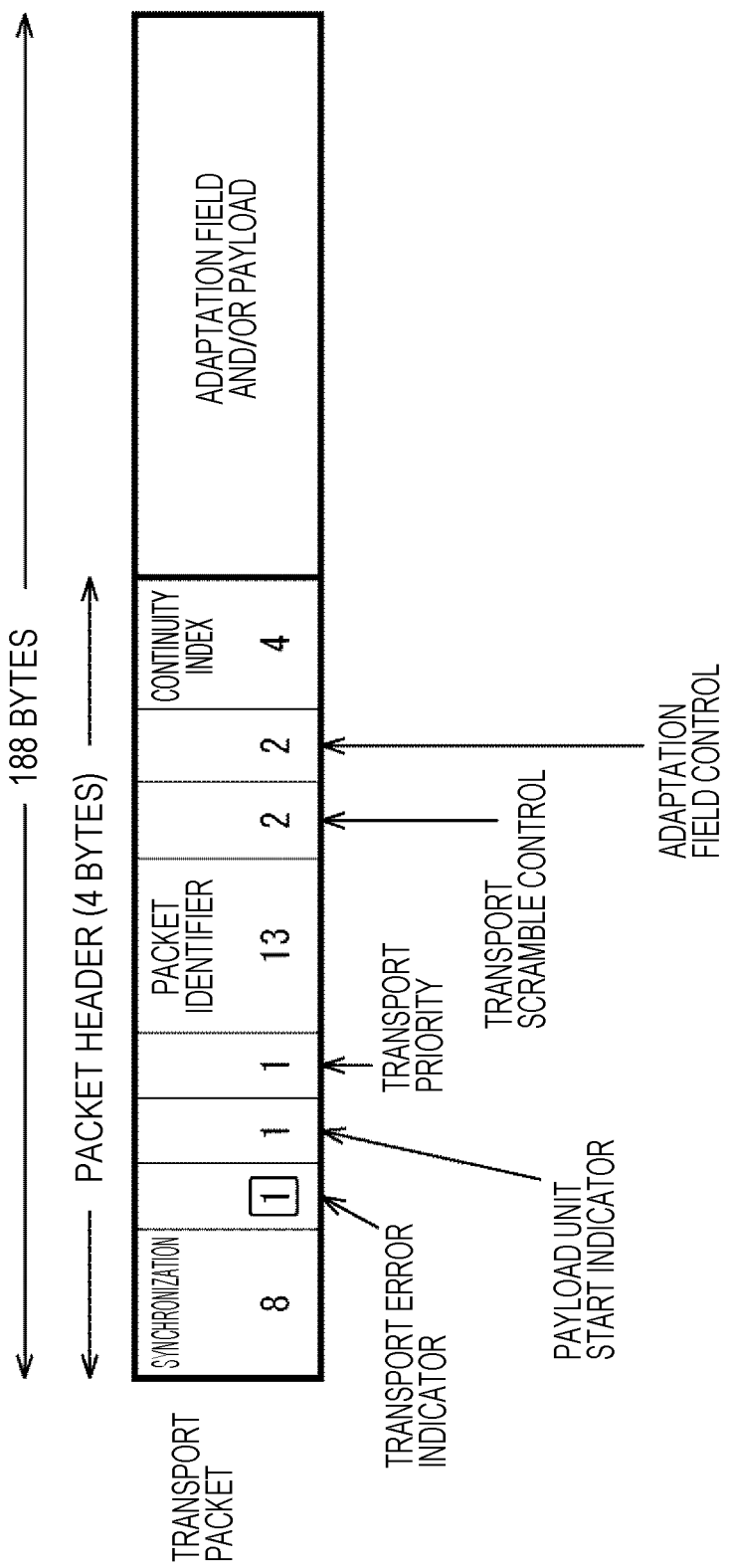
FIG. 27 is a diagram for explaining the structure of a TS packet.

A conventional demodulation processing unit 42 handles TS packets, and each TS packet includes information called a transport error indicator that indicates whether there is an error in the data. FIG. 27 shows the structure of a TS packet (MPEG2-TS packet). In the packet header in the packet shown in FIG. 27, the area that comes after the area in which synchronization information is written includes 1-bit information called a transport error indicator.

The error information indicated by such a transport error indicator is transferred between the demodulation processing unit 42 and the processing unit 43 via a special-purpose signal line, for example. Referring again to the lower diagram in FIG. 6, explanation is continued. Five signal lines are provided between the demodulation processing unit 42 and the processing unit 43 shown in the lower diagram in FIG. 6, and one of the signal lines is an error signal line for transmitting an error signal.

In the case of such a configuration, data indicating that an error has occurred is transmitted from the demodulation processing unit 42 to the processing unit 43 via the error signal line.

In a case where TLV packets can be transmitted between the demodulation processing unit 42 and the processing unit 43, information equivalent to the transport error indicator is included in each TLV packet, so that error information can be transmitted from the demodulation processing unit 42 to the processing unit 43.

Referring now again to FIG. 4, explanation is continued. As mentioned above, FIG. 4 is a diagram showing the structure of a TLV packet. The packet header of the TLV packet is divided into a 2-bit area and a 6-bit area, and forms an 8-bit area in total. One bit in this 8-bit area can be used as an error indicator equivalent to the transport error indicator.

Also, as shown in the lower diagram in FIG. 4, in the packet type area, "0x00" and "0x04-0xFD" as packet type values are undefined. As such an undefined area is allocated to the error indicator, the undefined area can be used as the error indicator equivalent to the transport error indicator.

In a case where an error indicator is included in each TLV packet as above, the demodulation processing unit 42 can transmit error information indicated by the error indicator (or information indicating that an error has occurred or has not occurred) to the processing unit 43. That is, in a case where TLV packets are handled, error information can also be transmitted.

In a case where an error signal line is provided, the error information can be transmitted from the demodulation processing unit 42 to the processing unit 43 through the error signal line, as in the above described case.

Further, in a case where any error signal line is not provided, or in the case of the configuration shown in the upper diagram in FIG. 6, for example, the error information can be transmitted as data through a data signal line.

Figure 28:
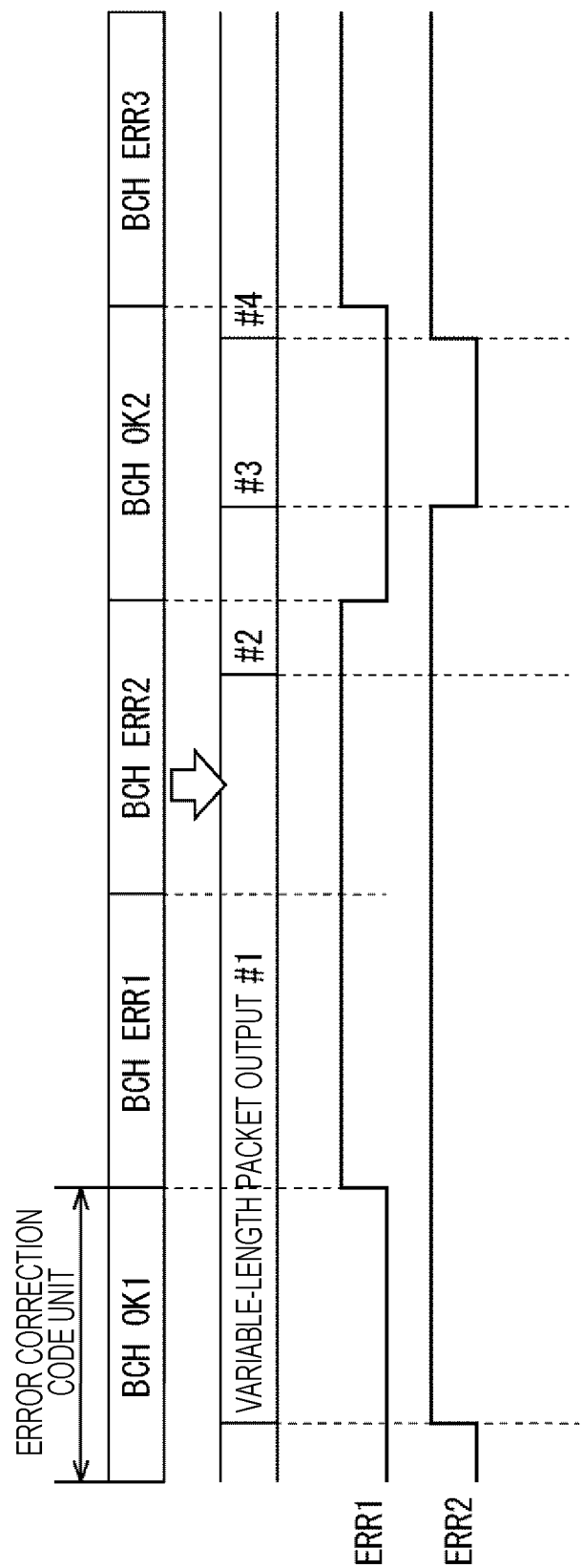
FIG. 28 is a diagram for explaining transmission of error information.

As shown in FIG. 28, the error information may be transmitted for each error correction code or for each variable-length packet. Referring now to FIG. 28, explanation is continued. As shown in an upper portion of FIG. 28, error correction is performed in the following order: a section in which an error correction code is properly conducted (BCH OK1); a section in which an error occurs in an error correction code (BCH ERR1); a section in which an error occurs in an error correction code (BCH ERR2); a section in which an error correction code is properly conducted (BCH OK2); and a section in which an error occurs in an error correction code (BCH ERR3).

Further, the (BCH ERR1) section and the (BCH ERR2) section are located in a section of a variable-length packet output #1, the (BCH ERR2) section is also located in a section of a variable-length packet output #2, and the (BCH ERR3) section is located in a section of a variable-length packet output #4.

In a case where the error information is output for each error correction code in such circumstances, the error information is output as indicated by the waveform denoted by ERR1 in FIG. 28. That is, the error information is output (the error signal is at the H-level) only during the (BCH ERR1) section, the (BCH ERR2) section, and the (BCH ERR3) section, and the error information is not output (the error signal is at the L-level) in the other sections or the sections in which no errors occur.

In a case where the error information is output for each variable-length packet, the error signal continues to be output (the error signal is maintained at the H-level) first during the section of the variable-length packet output #1, since the (BCH ERR1) section is located in the section of the variable-length packet output #1.

Since the (BCH ERR2) section is located in the section of the variable-length packet output #1 and the section of the variable-length packet output #2, the error signal continues to be output (the error signal is maintained at the H-level) during the section of the variable-length packet output #1 and the section of the variable-length packet output #2.

Since the (BCH ERR3) section is located in the section of the variable-length packet output #4, the error signal continues to be output (the error signal is maintained at the H-level) during the section of the variable-length packet output #4.

As described above, the error information may be output so as to vary with error correction codes, or may be output so as to vary with variable-length packets.

<Processing of NTPs>

Next, processing of NTPs is described. As described above with reference to FIG. 3, an NTP as time information is placed for each TLV stream ID, at a predetermined point in a TLV packet. This NTP can be used as information that has roles similar to those of a program clock reference (PCR) in MPEG2-TS. The PCR is now briefly described.

The PCR transmitting side transmits PCR data included in an independent packet or a video or audio PES to the receiver side at regular intervals. The PCR contains a 42-bit system time clock (STC) value counted with a 27-MHz clock on the transmitting side.

The receiver side recognizes the location of the PCR data from the description in a PMT, and loads the STC value included in the PCR data into a clock reproduction unit. The clock reproduction unit compares the STC value loaded from the PCR of the TS with a count value counted with a 27-MHz oscillator, and performs control so that the difference becomes 0. As a result, the clock on the transmitting side can be locked with a certain degree of accuracy.

The PCR used in such control is equivalent to NTPs in TLV packets. As described above, NTPs are included in TLV packets at predetermined intervals on the transmitting side (by the transmitter 10), and are transmitted to the receiver 11. Using the NTPs, the receiver 11 needs to reproduce the predetermined intervals, and synchronize with the clock on the transmitting side.

Referring now to FIGS. 29 through 33, outputting data from the demodulation processing unit 42 to the processing unit 43 is further described. The data to be output from the demodulation processing unit 42 to the processing unit 43 is one data set among the transmission data A through H, as described above with reference to FIG. 8.

In a case where data is output in the manner described below with reference to FIGS. 29 through 33, an NTP is output at predetermined intervals as will be described later with reference to FIG. 34.

In each of FIGS. 29 through 33, the charts in the top four rows are common, and are charts for explaining the process up to data extraction. In the example cases shown in FIGS. 29 through 33, one frame contains TLV streams from the broadcast station A, the broadcast station B, the broadcast station C, and other broadcast stations up to a broadcast station X. An example case where TLV streams from the broadcast station B are processed is described herein.

A TLV stream formed with slots #6 through #10, which forms one of the TLV streams from the broadcast station B, is demodulated by 16APSK, a TLV stream formed with slots #11 through #15 is demodulated by 16APSK, and a TLV stream formed with slots #16 to #20 is demodulated by QPSK. In this manner, TLV streams in one frame may include streams demodulated by different methods in some cases.

Such TLV streams are transmitted from the transmitter 10 to the receiver 11, for example. The receiver 11 decodes the received TLV streams by a decoding method compatible with the demodulation method. Of the decoded TLV streams, TLV streams from the desired broadcast station, which is the broadcast station B in this case, are extracted.

Figure 29:
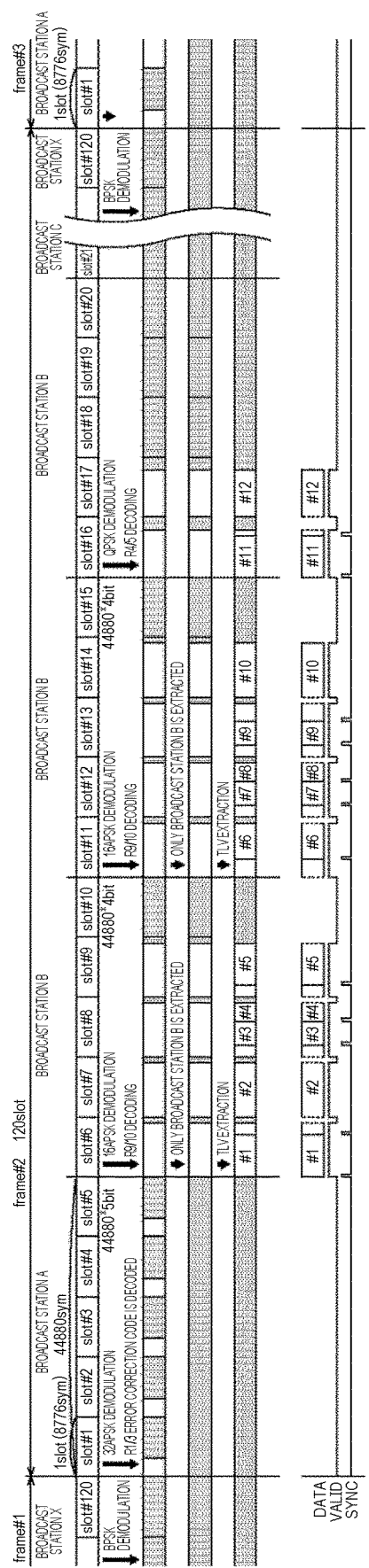
FIG. 29 is a diagram for explaining a first output pattern.

TLV packets are further extracted from the TLV streams. In FIG. 29, TLV packets #1 through #12 are extracted as the TLV packets.

Shaded (filled) areas in FIG. 29 are areas equivalent to in-packet gaps or inter-packet gaps in the above explanation. Shaded (filled) areas also indicate non-signaling sections of the broadcast station A and the like, instead of the TLV streams from the broadcast station B.

Since an in-packet gap is a parity portion or the like, an in-packet gap exists in each slot in the example shown in FIG. 29. An inter-packet gap appears in a case where a slot 10 is a null packet, for example.

The TLV packet #1 is a packet extracted from the slot #6. The TLV packet #2 is a packet extracted from the slot #6, the slot #7, and the slot #8. Since the TLV packet #2 exists over the three slots, two in-packet gaps (between the slot #6 and the slot #7, and between the slot #7 and the slot #8) are formed.

The TLV packet #3 is a packet extracted from the slot #8. The TLV packet #4 is a packet extracted from the slot #8 and the slot #9. Since the TLV packet #4 exists over the two slots, one in-packet gap (between the slot #8 and the slot #9) is formed.

The TLV packet #5 is a packet extracted from the slot #9 and the slot #11. Since the TLV packet #5 exists over the three slots #9 through #11 but the slot #10 is a null packet, an in-packet gap and an inter-packet gap are formed.

The TLV packet #6 is a packet extracted from the slot #11 and the slot #12. Since the TLV packet #6 exists over the two slots, one in-packet gap (between the slot #11 and the slot #12) is formed. The TLV packet #7 is a packet extracted from the slot #12.

The TLV packet #8 is a packet extracted from the slot #12 and the slot #13. Since the TLV packet #8 exists over the two slots, one in-packet gap (between the slot #12 and the slot #13) is formed. The TLV packet #9 is a packet extracted from the slot #13.

The TLV packet #10 is a packet extracted from the slot #13 and the slot #14. Since the TLV packet #10 exists over the two slots, one in-packet gap (between the slot #13 and the slot #14) is formed.

The TLV packet #11 is a packet extracted from the slot #16. The TLV packet #12 is a packet extracted from the slot #16 and the slot #17. Since the TLV packet #12 exists over the two slots, one in-packet gap (between the slot #16 and the slot #17) is formed.

<First Output Pattern of Data>

The lowermost row in FIG. 29 shows a pattern in which packets are output at the timings of packet extraction (this pattern will be hereinafter referred to as the first output pattern) in a case where TLV packets are transmitted from the demodulation processing unit 42 to the processing unit 43 through data signal lines (FIG. 6).

As the sync signal is switched to the H-level at the top of each TLV packet, the sync signal is switched to the H-level at the timings of the respective tops of the TLV packets #1 through #12, as shown in the lowermost row in FIG. 29.

The valid signal is switched to the L-level at each point where a gap appears. In accordance with the sync signal and the valid signal, the TLV packets #1 through #12 are sequentially transmitted. The timings of the transmission (transmission sections) are substantially the same as the timings of extraction of the TLV packets (extraction sections).

As data is output when demodulated by the demodulation processing unit 42 in this manner, the demodulation processing unit 42 does not need to perform a process of temporarily storing data, and may not be equipped with a buffer or the like for output operations.

<Second Output Pattern of Data>

Figure 30:
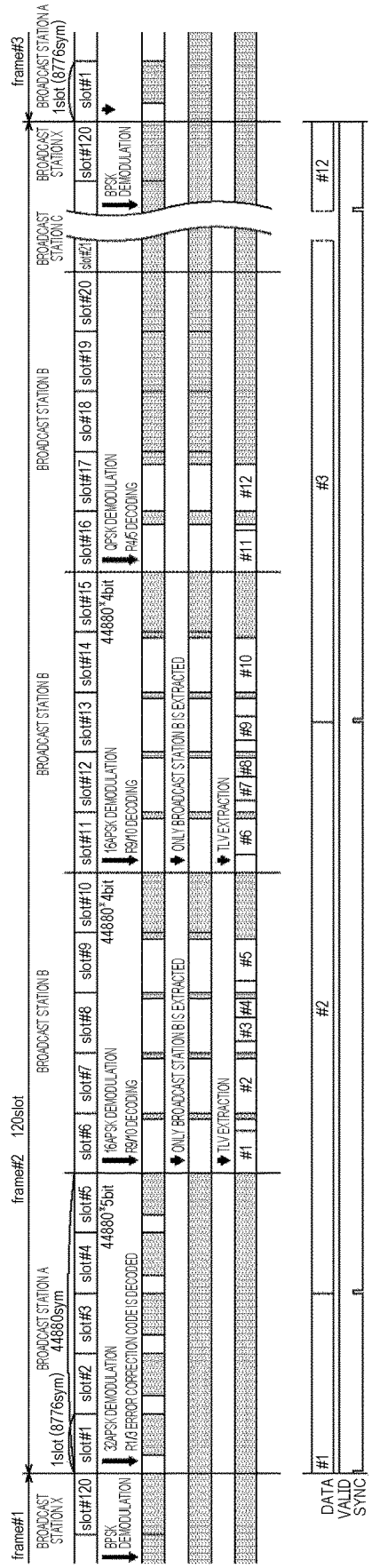
FIG. 30 is a diagram for explaining a second output pattern.

Referring now to FIG. 30, a pattern in which TLV packets are output throughout the entire frame is described (this pattern will be referred to as the second output pattern).

In the example case shown in FIG. 30, the circumstances are also the same as those described above with reference to FIG. 29, and the TLV packets #1 through #12 are extracted.

In the example shown in FIG. 30, the TLV packets #1 through #12 are output throughout a 1-frame section. As the sync signal is also switched to the H-level at the top of each TLV packet in such a case, the sync signal is switched to the H-level at the timings of the respective tops of the TLV packets #1 through #12, as shown in the lowermost row in FIG. 30.

It should be noted that, in FIG. 30, the TLV packets #1 through #12 are shown in the frame #2 (frame#2) from which the TLV packets #1 through #12 have been extracted, for ease of explanation. In the actual process, the TLV packets #1 through #12 are extracted from the frame #2, and the TLV packets #1 through #12 are transmitted throughout a 1-frame section while a frame #3 is being processed.

As the TLV packets continue to be output during one frame, the valid signal is maintained at the H-level indicating a valid section. Accordingly, the valid signal is basically always at the H-level.

In this manner, the TLV packets extracted from one frame may be transmitted throughout a 1-frame section. In such a case, the demodulation processing unit 42 includes a buffer or the like that temporarily stores the data of one frame. After storing the data of one frame, the demodulation processing unit 42 divides the time equivalent to one frame in accordance with the stored data amount, controls the clock signal, and then transmits the data to the processing unit 43.

Accordingly, the clock signal can be set at a relatively low frequency. As a result, serial transmission or parallel transmission with a small number of bits can be performed, for example, and the number of pins in the processing unit 43 can be reduced.

<Third Output Pattern of Data>

Figure 31:
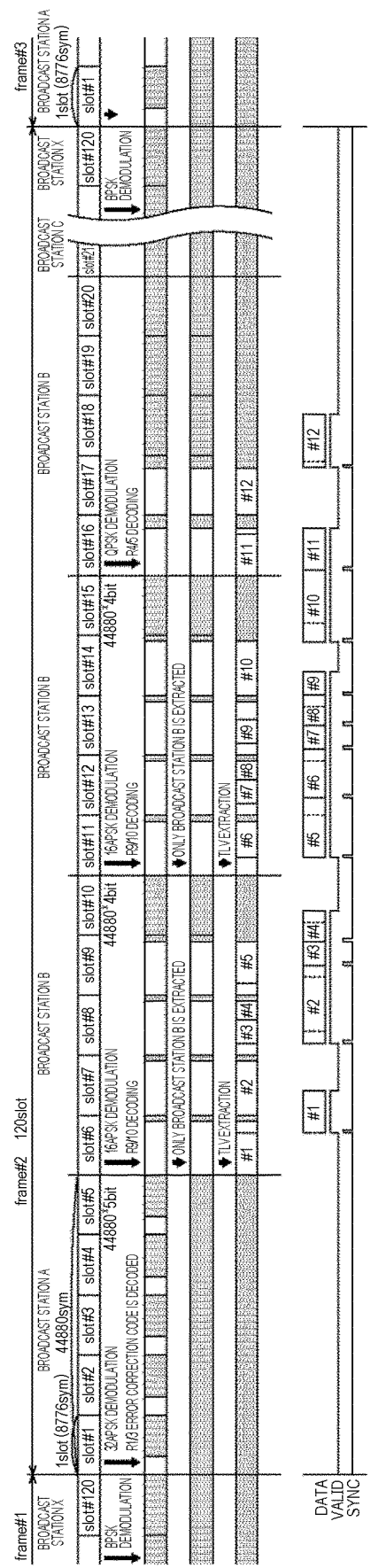
FIG. 31 is a diagram for explaining a third output pattern.

Referring now to FIG. 31, a pattern in which TLV packets are output without any in-packet gap is described (this pattern will be referred to as the third output pattern).

In the example case shown in FIG. 31, the circumstances are also the same as those described above with reference to FIG. 29, and the TLV packets #1 through #12 are extracted.

In the example shown in FIG. 31, outputting of data is appropriately adjusted so that any in-packet gap is formed, and the TLV packets #1 through #12 are sequentially output. As the sync signal is also switched to the H-level at the top of each TLV packet in such a case, the sync signal is switched to the H-level at the timings of the respective tops of the TLV packets #1 through #12, as shown in the lowermost row in FIG. 31.

In the sections other than inter-packet gaps, the valid signal is maintained at the H-level indicating a valid section. For example, in the first output pattern described above with reference to FIG. 29, the TLV packet #2 has two in-packet gaps, and therefore, the valid signal is lowered to the L-level indicating an invalid section in the sections of the in-packet gaps.

In the third output pattern, in the section in which the TLV packet #2 is output, the valid signal is maintained at the H-level indicating a valid section, as shown in the lowermost row in FIG. 31. The dotted lines in the TLV packet #2 shown in the lowermost row in FIG. 31 indicate the points where in-packet gaps were formed, but control is performed so that these in-packet gaps are eliminated, and the valid signal is not lowered in the TLV packets.

In the third output pattern, outputting of data is controlled so that the valid signal is not lowered in the TLV packets.

In the case of the third output pattern, the demodulation processing unit 42 needs to have a buffer or the like that temporarily stores the TLV packets. However, the amount of data to be stored is small, and accordingly, the buffer capacity may be small. Furthermore, as the demodulation processing unit 42 outputs data after temporarily storing the data, control can be performed so that data transmission to the processing unit 43 is performed with a low-frequency clock signal.

As a result, serial transmission or parallel transmission with a small number of bits can be performed, for example, and the number of pins in the processing unit 43 can be reduced.

<Fourth Output Pattern of Data>

Figure 32:
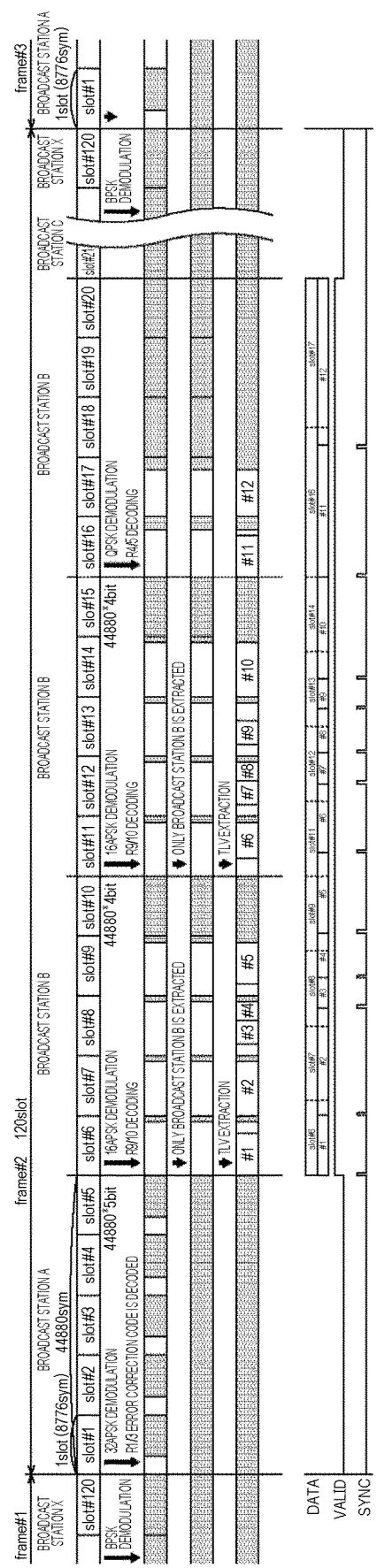
FIG. 32 is a diagram for explaining a fourth output pattern.

Referring now to FIG. 32, a pattern in which data stored in a buffer in the section equivalent to the slots from which TLV packets have been extracted is smoothed at a constant rate and is then output during the section is described (this pattern will be referred to as the fourth output pattern).

In the example case shown in FIG. 32, the circumstances are also the same as those described above with reference to FIG. 29, and the TLV packets #1 through #12 are extracted.

In the example shown in FIG. 32, the TLV packet #1 is extracted from the slot #6, the TLV packet #2 is extracted from the slot #7, the TLV packet #2, the TLV packet #3, and the TLV packet #4 are extracted from the slot #8, and the TLV packet #4 and the TLV packet #5 are extracted from the slot #9. In this case, during the section equivalent to the five slots of the slots #6 through #10, the TLV packets #1 through #5 are stored into a buffer.

Accordingly, in this case, the TLV packets #1 through #5 are smoothed at a constant rate and are then output during the section equivalent to the five slots of the slots #6 through #10.

As for the other sections in the example shown in FIG. 32, TLV packets extracted in a section equivalent to five slots are also smoothed at a constant rate and are then output.

It should be noted that five slots are used as a unit in this example, because the modulation method may be changed for each five slots in highly-sophisticated BS, for example. Therefore, an example where five slots form a unit and TLV packets are smoothed at a constant rate is described herein.

In the example shown in FIG. 32, the slots #6 through #10 and the slots #11 through #15 are subjected to 16APSK demodulation, but the slots #16 to #20 are subjected to QPSK demodulation. In such a case, the output rate in the slots #6 through #10 might differ from the output rate in the slots #16 to #20, and such a change in the output rate is an embodiment included in the fourth output pattern.

Also, in the example shown in FIG. 32, neither in-packet gaps nor inter-packet gaps are formed. However, in a case where the fourth output pattern is used, an in-packet gap and an inter-packet gap might appear in each five slots.

As the sync signal is also switched to the H-level at the top of each TLV packet in the case of the fourth output pattern, the sync signal is switched to the H-level at the timings of the respective tops of the TLV packets #1 through #12, as shown in the lowermost row in FIG. 32.

If neither in-packet gaps nor inter-packet gaps exist, the valid signal is maintained at the H-level indicating a valid section (the state shown in FIG. 32). When a gap appears, the valid signal may be lowered to the L-level indicating an invalid section, or the clock signal may be suspended.

It should be noted that, although an example case where the clock signal is variable and constantly oscillates has been described above, the fourth output pattern can be formed in the case of some other control operation.

Although not shown in the drawing, control may be performed so that the valid signal is maintained at the H-level indicating a valid section while the clock signal is suspended as necessary. In this manner, the valid signal is prevented from switching to the L-level while TLV packets are being output. In this case, in a section having an in-packet gap therein, for example, the clock signal is suspended, but the valid signal is maintained at the H-level.

Further, for example, there are cases where slots of the broadcast station B are not successively arranged in one frame (120 slots), and a slots of the broadcast station C might be inserted between slots of the broadcast station B. In such a case, the clock signal is suspended in the section corresponding to the slot of the broadcast station C, and the valid signal is maintained at the H-level. Through such control, the valid signal can be controlled not to switch to the L-level while the TLV packets of the broadcast station B are being output.

In the case of the fourth output pattern, the demodulation processing unit 42 needs to include a buffer or the like that temporarily stores TLV packets. However, as the demodulation processing unit 42 outputs data after temporarily storing the data, data transmission to the processing unit 43 can be performed with a low-frequency clock signal.

As a result, serial transmission or parallel transmission with a small number of bits can be performed, for example, and the number of pins in the processing unit 43 can be reduced.

<Fifth Output Pattern of Data>

Figure 33:
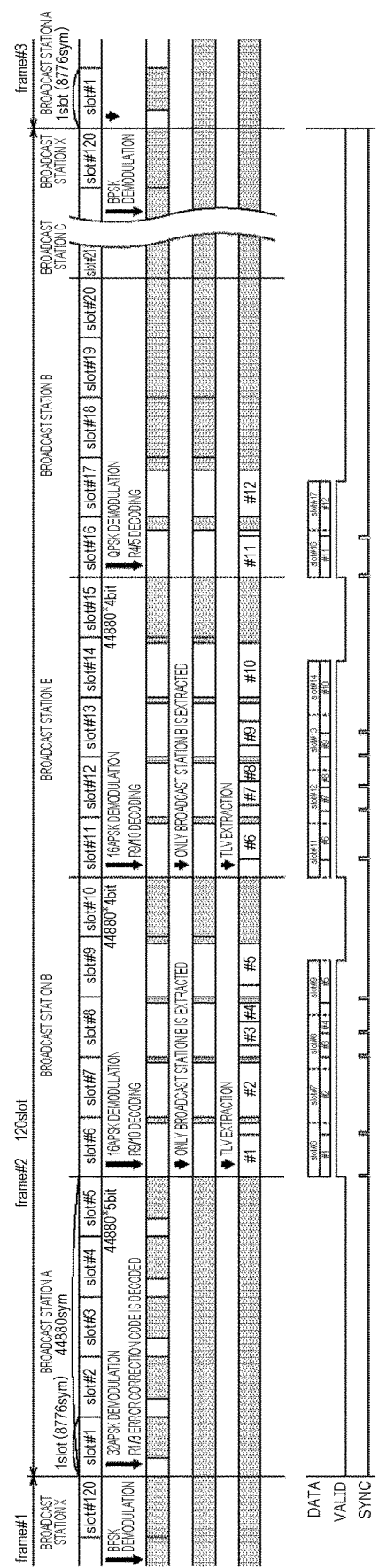
FIG. 33 is a diagram for explaining a fifth output pattern.

Referring now to FIG. 33, a pattern in which smoothing is performed on the slots from which TLV packets have been extracted, and the TLV packets are output with a clock signal having a fixed frequency is described (this pattern will be referred to as the fifth output pattern).

The frequency of the clock signal in a case where the fifth output pattern is adopted is lower than the frequency of the clock signal in a case where the first output pattern is adopted. The fifth output pattern can be used to lower the frequency of the clock signal, for example.

In the example case shown in FIG. 33, the circumstances are also the same as those described above with reference to FIG. 29, and the TLV packets #1 through #12 are extracted.

In the example shown in FIG. 33, smoothing is performed at a constant rate in the section from the top of the slot #6, from which the TLV packet #1 has been extracted, to the end of the slot #9, from which the TLV packet #5 has been extracted. The TLV packets #1 through #5 extracted from the slots #6 through #9 are then output.

Likewise, smoothing is performed at a constant rate in the section from the top of the slot #11, from which the TLV packet #5 has been extracted, to the end of the slot #14, from which the TLV packet #10 has been extracted. The TLV packets #5 through #10 extracted from the slots #11 through #14 are then output.

Likewise, smoothing is performed at a constant rate in the section from the top of the slot #16, from which the TLV packet #11 has been extracted, to the end of the slot #17, from which the TLV packet #12 has been extracted. The TLV packets #11 and #12 extracted from the slots #16 and #17 are then output.

As the sync signal is also switched to the H-level at the top of each TLV packet in such a case, the sync signal is switched to the H-level at the timings of the respective tops of the TLV packets #1 through #12, as shown in the lowermost row in FIG. 33.

In the fifth output pattern, smoothing is performed in a single slot, and the frequency of the clock signal is fixed. Outputting of data is controlled in this manner.

In such a case, the demodulation processing unit 42 needs to include a buffer or the like that temporarily stores TLV packets. However, as the demodulation processing unit 42 outputs data after temporarily storing the data, data transmission to the processing unit 43 can be performed with a low-frequency clock signal as described above.

As a result, serial transmission or parallel transmission with a small number of bits can be performed, for example, and the number of pins in the processing unit 43 can be reduced.

<Outputting NTP at Regular Intervals>

The first through fifth output patterns have been described above. Referring now to FIG. 34, the following aspect is described; the intervals at which the NTP as time information is output are maintained in any of the first through fifth output patterns.

Figure 34:
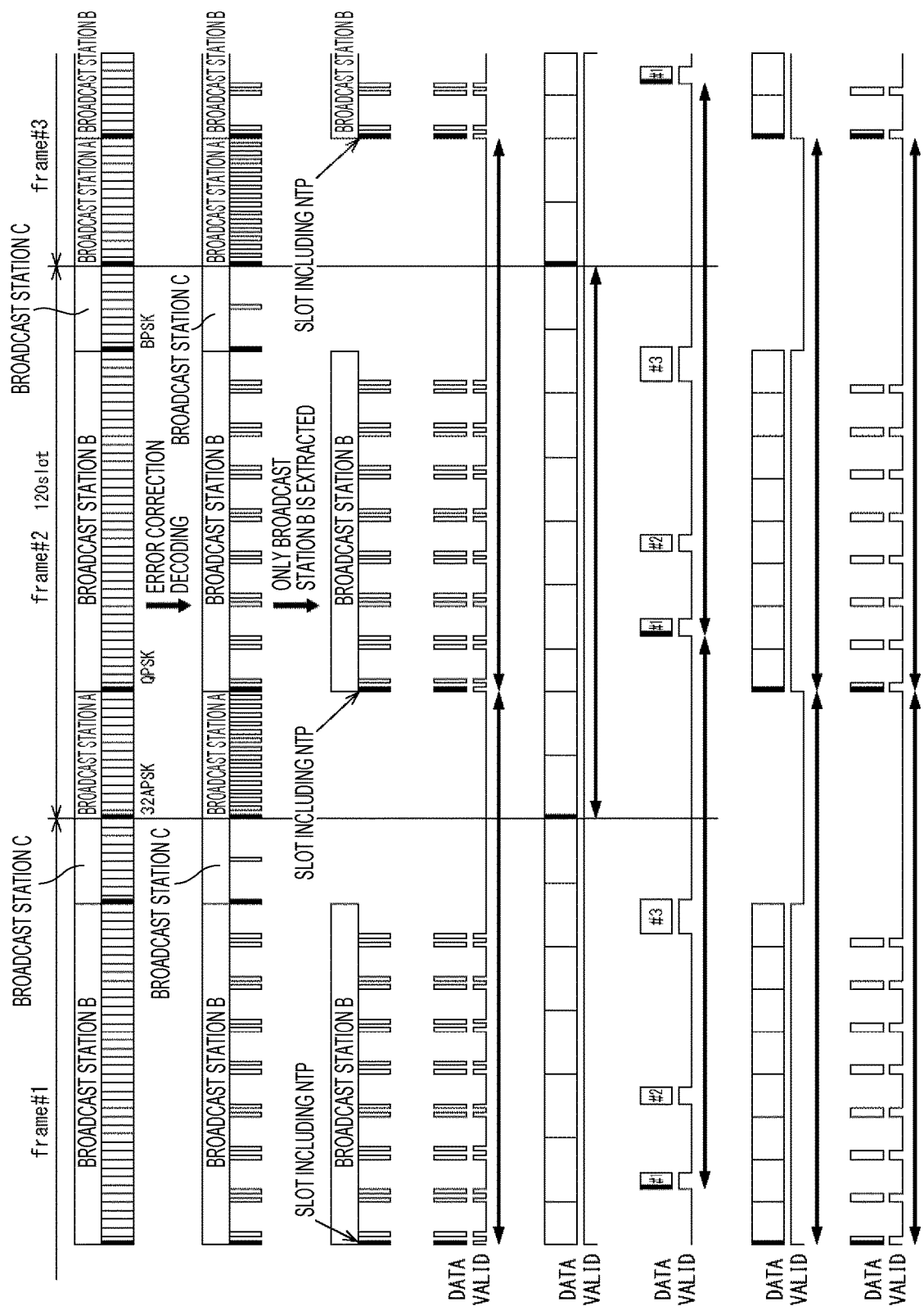
FIG. 34 is a diagram for explaining that the intervals between NTPs are maintained.

The first row in FIG. 34 shows TLV streams to be received by the receiver 11. In FIG. 34, one frame contains TLV streams from the broadcast station A, the broadcast station B, and the broadcast station C. An example case where the TLV streams of the broadcast station B are extracted from these streams is described herein.

The second row in FIG. 34 shows the TLV streams after error correction decoding. In the drawing, the vertical lines represent the data in the decoded slots, and the candidate data to be transmitted to the processing unit 43. Particularly, the heavy lines (black rectangles) in the drawing represent the slots including an NTP.

As described above with reference to FIG. 3, an NTP is placed at a predetermined point in each TLV stream. In this example, an NTP is included in the first slot in each TLV stream. Also, an NTP is placed for each TLV stream ID. Therefore, for example, in the example shown in FIG. 34, an NTP is placed in the first slot in each TLV stream from the broadcast station A, in the first slot in each TLV stream from the broadcast station B, and in the first slot in each TLV stream from the broadcast station C.

It should be noted that, for example, in a case where TLV streams of the broadcast station B demodulated by different demodulation methods (16APSK demodulation and QPSK demodulation in the drawings) are included in one frame as in the examples shown in FIGS. 29 through 33, for example, an NTP is placed in the slot #6 or the slot #16.

It should be noted that, in the description below, an NTP is placed in the first slot in each TLV stream. However, each slot in which an NTP is placed may be at a predetermined location in a TLV stream, and the position of an NTP is not necessarily in the first slot in a TLV stream.

Referring back to FIG. 34, explanation is continued. Of the TLV streams subjected to the error correction decoding, TLV streams from the broadcast station B are extracted. TLV streams from the broadcast station B are extracted from the respective frames. As a result, TLV streams of the broadcast station B are extracted from a frame #1, a frame #2, and a frame #3, as shown in the third row in FIG. 34. Also, the first slot in each of the extracted TLV stream includes an NTP.

The fourth through eighth rows in FIG. 34 show the respective waveforms observed when data is output in the first through fifth output patterns. The respective output patterns have already been described with reference to FIGS. 29 through 33, and therefore, only the NTP-related aspects are described with reference to FIG. 34.

As shown in the fourth through eighth rows in FIG. 34, the frame #1, the frame #2 and the frame #3 each include an NTP at one point. The NTP in the frame #1 is an NTP #1, the NTP in the frame #2 is an NTP #2, and the NTP in the frame #3 is an NTP #3.

In the first output pattern shown in the fourth row in FIG. 34, the difference between the time at which the NTP #1 is output and the time at which the NTP #2 is output (the interval between the NTP #1 and the NTP #2) is the same as the interval between the NTP #2 and the NTP #3. Furthermore, the interval is equivalent to one frame.

An NTP is placed in the first slot in each TLV stream, and therefore, is located at the same point in each frame. Accordingly, in a case where outputting is performed at the timing of decoding as in the first output pattern, an NTP is also output at regular intervals. Thus, in the first output pattern, an NTP can be supplied from the demodulation processing unit 42 to the processing unit 43 at predetermined intervals, and a clock recovery can be achieved in the processing unit 43.

In the second output pattern shown in the fifth row in FIG. 34, the interval between the NTP #1 and the NTP #2 is also the same as the interval between the NTP #2 and the NTP #3. Furthermore, the interval is equivalent to one frame.

In the second output pattern, TLV packets are output throughout a 1-frame section, and an NTP is output at the timing of outputting the first slot in each one frame. Accordingly, an NTP is also output at regular intervals in the second output pattern. Thus, an NTP can be supplied from the demodulation processing unit 42 to the processing unit 43 at the regular intervals, and a clock recovery can be achieved in the processing unit 43.

In the third output pattern shown in the sixth row in FIG. 34, the interval between the NTP #1 and the NTP #2 is also the same as the interval between the NTP #2 and the NTP #3. Furthermore, the interval is equivalent to one frame.

The third output pattern is a pattern in which data is output so that the valid signal is not lowered in the TLV packets. Accordingly, an NTP is also output at regular intervals in the third output pattern. Thus, an NTP can be supplied from the demodulation processing unit 42 to the processing unit 43 at the regular intervals, and a clock recovery can be achieved in the processing unit 43.

It should be noted that, in the third output pattern, the demodulation processing unit 42 temporarily stores TLV packets, and the output timings are controlled so that no in-packet gaps are formed. Thus, the intervals at which an NTP is output can be finely adjusted, and control can be performed so that the intervals become precisely constant intervals. This also applies in the second output pattern.

In the fourth output pattern shown in the seventh row in FIG. 34, the interval between the NTP #1 and the NTP #2 is also the same as the interval between the NTP #2 and the NTP #3. Furthermore, the interval is equivalent to one frame.

The fourth output pattern is an output pattern in which smoothing is performed in slots, and the output rate is variable. When the NTP placed in the first slot in a TLV stream is decoded, the NTP is output from the demodulation processing unit 42 to the processing unit 43. Accordingly, in the fourth output pattern, the intervals at which an NTP is output are also intervals each equivalent to one frame, and are constant intervals. In the fourth output pattern, an NTP can also be supplied from the demodulation processing unit 42 to the processing unit 43 at regular intervals, and thus, a clock recovery can be achieved in the processing unit 43.

In the fifth output pattern shown in the eighth row in FIG. 34, the interval between the NTP #1 and the NTP #2 is also the same as the interval between the NTP #2 and the NTP #3. Furthermore, the interval is equivalent to one frame.

The fifth output pattern is an output pattern in which smoothing is performed in slots, and the output rate is fixed. When the NTP placed in the first slot in a TLV stream is decoded, the NTP is output from the demodulation processing unit 42 to the processing unit 43. Accordingly, in the fifth output pattern, the intervals at which an NTP is output are also intervals each equivalent to one frame, and are constant intervals. In the fifth output pattern, an NTP can also be supplied from the demodulation processing unit 42 to the processing unit 43 at regular intervals, and thus, a clock recovery can be achieved in the processing unit 43.

As described above, in any of the first through fifth output patterns, an NTP can be supplied from the demodulation processing unit 42 to the processing unit 43 at regular intervals, and thus, a clock recovery can be achieved in the processing unit 43.

<Application to Cable Retransmission>

Although example cases where TLV packets are handled have been described in the above embodiments, the present technology can also be applied in cases where packets such as Generic Stream Encapsulation (GSE) packets, GSE-Lite (DVB) packets, and IP packets are handled.

An example case where the above described embodiment is applied to digital cable television broadcasting is now described, and the present technology is further explained.

Figure 35:
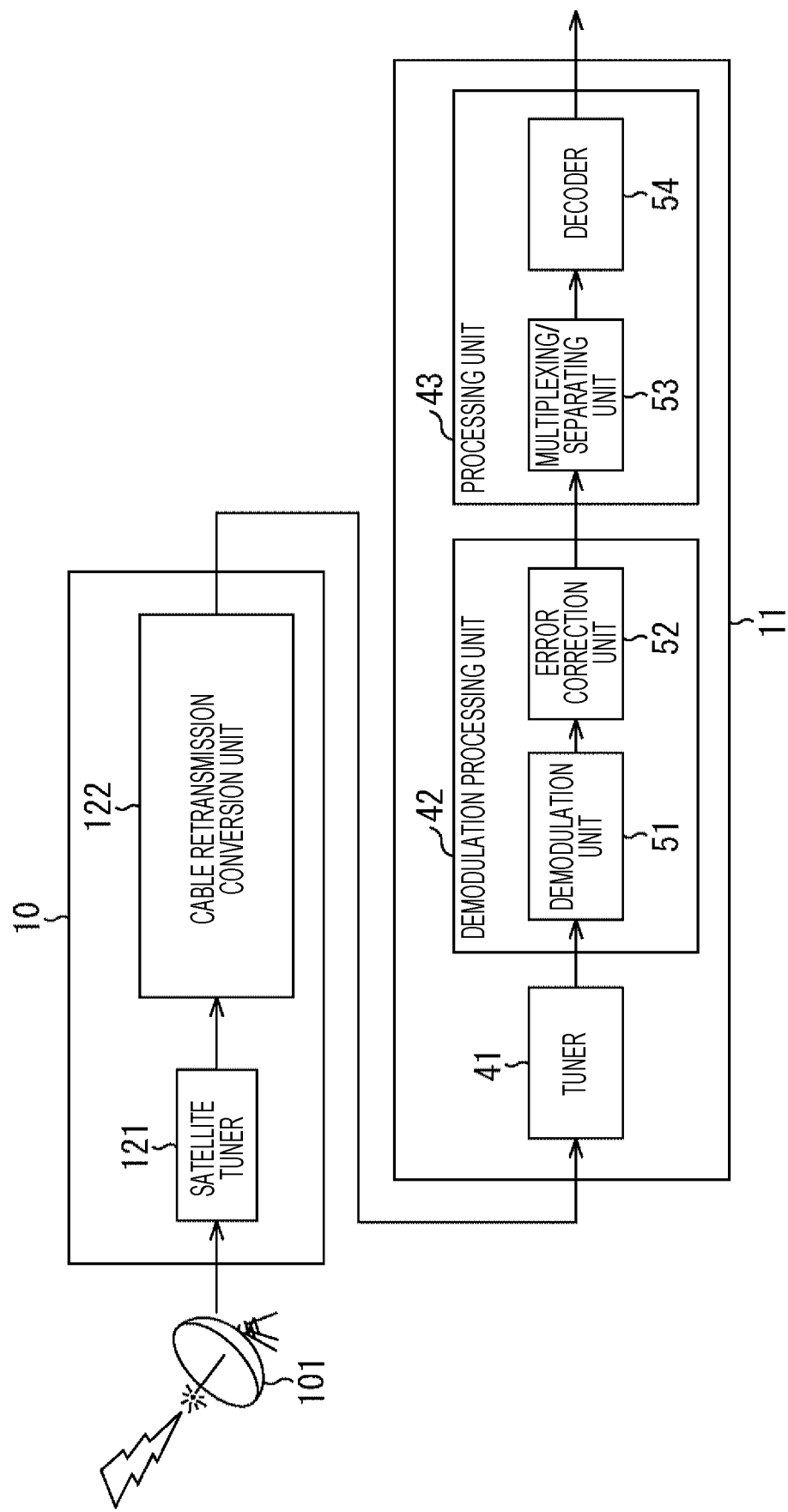
FIG. 35 is a diagram for explaining the configuration of a digital cable television broadcasting system.

FIG. 35 is a diagram showing the configuration of a system related to digital cable television broadcasting. The system includes an antenna 101 that receives satellite broadcasts, a transmitter 10, and a receiver 11.

Satellite broadcasts received by the antenna 101 are supplied to the transmitter 10. The transmitter 10 includes a satellite tuner 121 and a cable retransmission conversion unit 122. The transmitter 10 is a device on the side of a broadcast station that conducts digital cable television broadcasting. The transmitter 10 converts the broadcast waves of a satellite broadcast received by the antenna 101 into broadcast waves of a digital cable television broadcast, and transmits the converted broadcast waves to the side of the receiver 11 via a predetermined cable.

The receiver 11 has a configuration similar to that of the receiver 11 shown in FIG. 2 (therefore, the components of the receiver 11 are denoted by reference numerals similar to those in FIG. 2, and explanation thereof is not made herein). However, the tuner 41 of the receiver 11 shown in FIG. 35 receives and processes digital broadcast waves transmitted via a cable.

A satellite broadcast is broadcast as TLV digital broadcast waves as described above, and is received by the antenna 101. The transmitter 10 converts TLV digital broadcast waves into broadcast waves of a digital cable television broadcast, such as partial TLV packets, and then transmits the converted broadcast waves (this method will be referred to as the first conversion method). Alternatively, the transmitter 10 converts TLV digital broadcast waves into GSE packets, and then transmits the GSE packets (this method will be referred to as the second conversion method).

Figure 36:
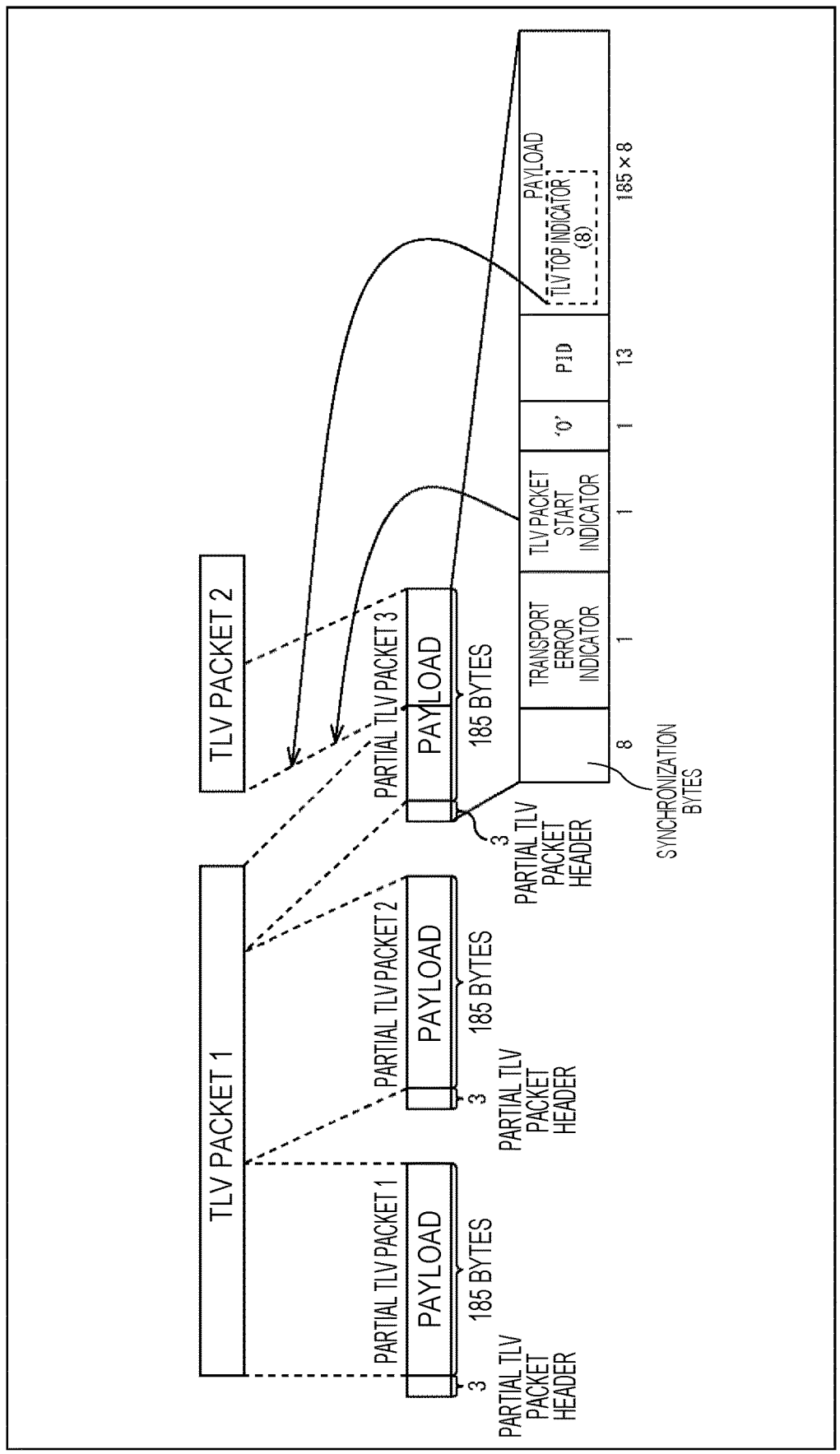
FIG. 36 is a diagram for explaining conversion from TLV packets into partial TLV packets.

The first conversion method is adopted in a case where cable retransmission compliant with the ISDB-C standards is performed. By the first conversion method, the transmitter 10 performs a process of converting a received TLV packet into partial TLV packets, as shown in FIG. 36. Broadcast waves to be supplied to the transmitter 10 are a group of variable-length TLV packets, and the variable-length TLV packets are converted into fixed-length partial TLV packets.

A partial TLV packet is a packet having a fixed length of 188 bytes. Of the 188 bytes, three bytes are the header, and the remaining 185 bytes are the payload. In FIG. 36, a TLV packet 1 and a TLV packet 2 are shown as TLV packets, and partial TLV packets 1 through 3 are shown as partial TLV packets.

In the example shown in FIG. 36, the TLV packet 1 is divided into the partial TLV packet 1, the partial TLV packet 2, and the partial TLV packet 3. Further, part of the TLV packet 2 is separated and incorporated into the partial TLV packet 3.

The partial TLV packet 3 is a packet that includes data of the TLV packet 1 and data of the TLV packet 2. In this manner, the payload of a partial TLV packet may include more than one divided TLV packets.

As shown in FIG. 36, a partial TLV packet includes synchronization bytes, a transport error indicator, a TLV packet start indicator, a PID, and a payload. The payload might include a TLV top indicator in some cases. The synchronization bytes are "0x47", for example.

The transport error indicator is a flag that indicates the existence/non-existence of a bit error in the partial TLV packet. When the transport error indicator is "1", for example, there exists at least a 1-bit uncorrectable error in the partial TLV packet.

When the TLV packet start indicator is "1", the payload of the partial TLV packet includes the top of a TLV packet. For example, the partial TLV packet 2 includes only the TLV packet 1, and does not include the top of the TLV packet 1. Therefore, the TLV packet start indicator of the partial TLV packet 2 is set at "0". Meanwhile, the partial TLV packet 3 includes the TLV packet 1 and the TLV packet 2, and also includes the top of the TLV packet 2. Therefore, the TLV packet start indicator of the partial TLV packet 3 is set at "1", for example.

The PID is an area to be used for identifying the data in the payload as TLV data.

The TLV top indicator is the first one byte in the payload, and is used when the TLV packet start indicator is "1". The value of the TLV top indicator indicates at which byte in the payload the top of a TLV packet is located. With this configuration, the receiving side can detect the location of the top of the TLV packet included in the payload of the partial TLV packet. When the TLV packet start indicator is "0", the TLV top indicator is not inserted into the payload.

The transmitter 10 converts a TLV packet into partial TLV packets, performs cable modulation on the partial TLV packets, and transmits the partial TLV packets to the side of the receiver 11 via a cable.

The receiver 11 receives the partial TLV packets. The receiver 11 converts the received partial TLV packets into a TLV packet. For example, the original TLV packet is restored from the partial TLV packets by the demodulation processing unit 42. In the case shown in FIG. 36, for example, the demodulation processing unit 42 receives the partial TLV packets 1 through 3, and restores the TLV packet 1 and (part of) the TLV packet 2.

The TLV packet start indicator of the partial TLV packet 3 is set at "1", for example, and a TLV top indicator is inserted into the payload. Receiving the partial TLV packet 3, the side of the receiver 11 notices that the TLV packet start indicator of the partial TLV packet 3 is "1", and recognizes that the top of the TLV packet 2 is located at the byte indicated by the TLV top indicator inserted in the payload. The bytes after the TLV top byte are then regarded as part of the TLV packet 2, and the TLV packet 2 is restored.

In this manner, the demodulation processing unit 42 obtains a TLV packet from partial TLV packets. As a result, the demodulation processing unit 42 outputs a TLV packet to the processing unit 43. The output of a TLV packet from the demodulation processing unit 42 to the processing unit 43 is the same as that in the above described embodiment, and the above described embodiment can be applied to the processing and the like related to the output.

It should be noted that, in a case where cable retransmission compliant with the ISDB-C standards is performed, a Reed-Solomon (RS) code is used in error correction. Therefore, when the above described embodiment is applied, the processing related to the error correction code needs to be replaced with a Reed-Solomon code.

In the error information transmission described above with reference to FIG. 28, for example, a section (BCH OK) in which an error correction code has been properly conducted is read as a section (RS OK) in which a correction code with a Reed-Solomon code has been properly conducted, and a section (BCH ERR) in which an error has occurred in an error correction code is read as a section (RS ERR) in which an error has occurred in a correction code with a Reed-Solomon code. In this manner, the above described embodiment can be applied in a case where cable retransmission compliant with the ISDB-C standards is performed.

Next, a case where broadcast waves for a cable network are converted by the second conversion method is described. The second conversion method is adopted in a case where J.382-compliant cable retransmission is performed.

Figure 37:
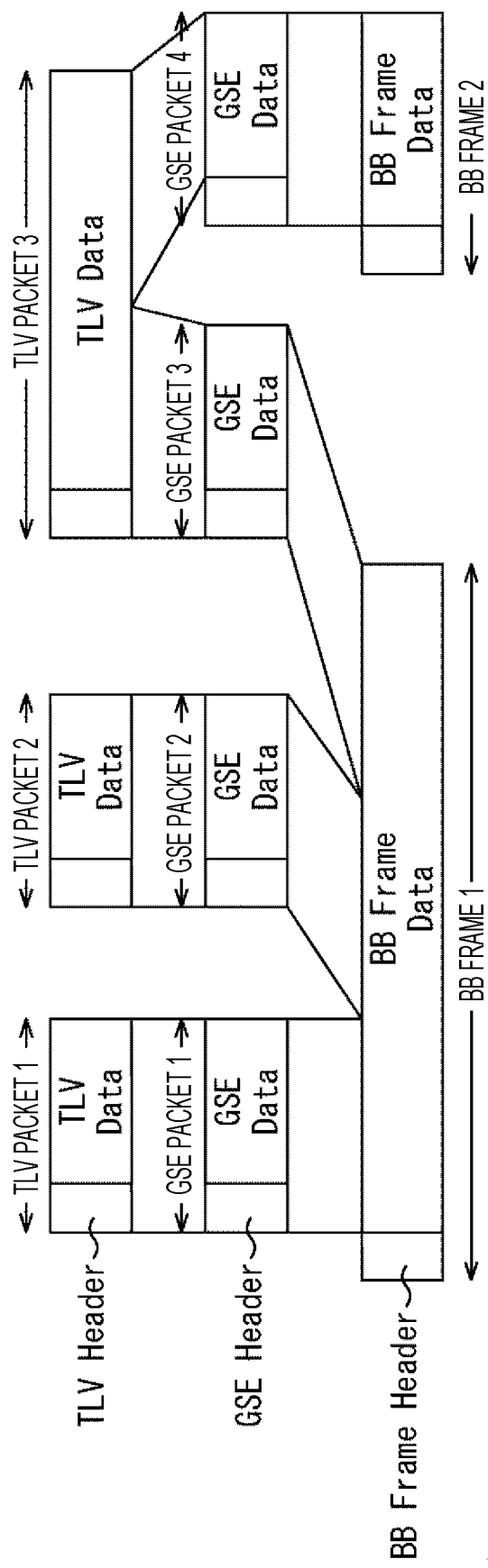
FIG. 37 is a diagram for explaining conversion from TLV packets into GSE packets.
Figure 38:
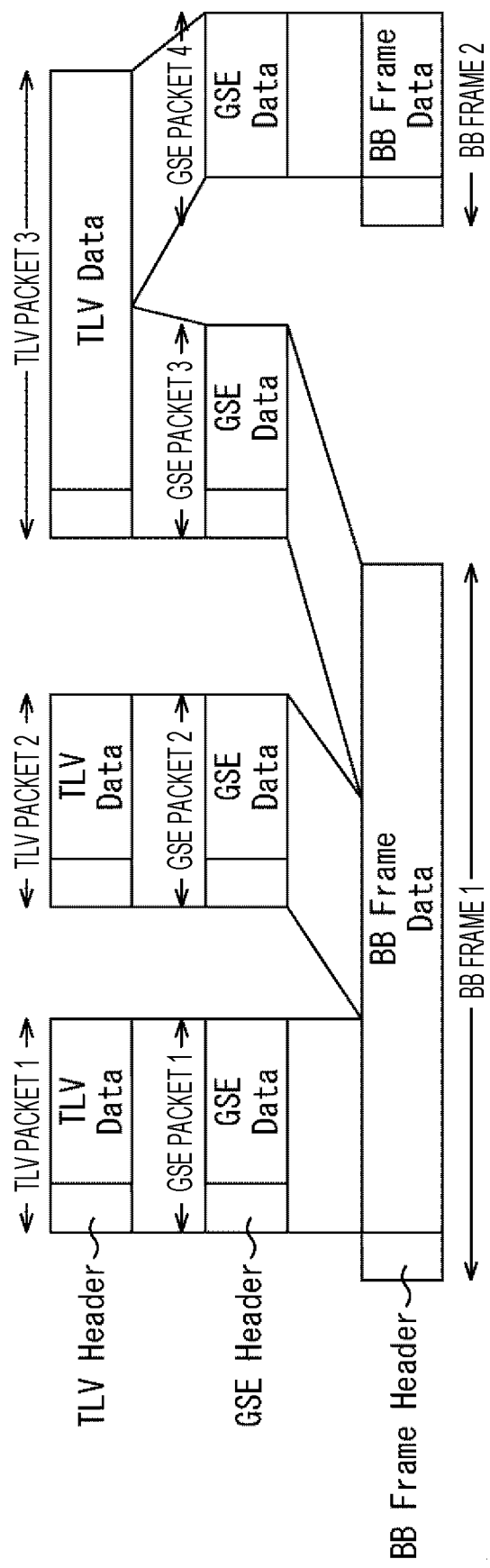
FIG. 38 is a diagram for explaining conversion from TLV packets into GSE packets.

By the second conversion method, the transmitter 10 performs a process of converting received TLV packets into GSE packets, and further converting the GSE packets into baseband (BB) frames, as shown in FIG. 37 or 38. GSE packets are packets compliant with DVB (Digital Video Broadcasting)-GSE (Generic Stream Encapsulation).

A TLV packet is formed with a packet header (TLV Header) and data (TLV Data), as shown in FIG. 37 and as specifically shown in FIG. 4. The transmitter 10 converts a TLV packet into one or more GSE packets. In the examples shown in FIGS. 37 and 38, a TLV packet 1 is converted into a GSE packet 1, a TLV packet 2 is converted into a GSE packet 2, and a TLV packet 3 is converted into a GSE packet 3 and a GSE packet 4.

In the example shown in FIG. 37, the GSE packet 4 is converted into a GSE packet 4 formed with a GSE header and GSE data. In the example shown in FIG. 38, the GSE packet 4 is converted into a GSE packet 4 formed with GSE data. When a TLV packet is converted into a GSE packet, the TLV packet may be converted into a GSE packet without a GSE header, like the GSE packet 4.

The transmitter 10 further creates a BB frame (Base Band Frame) by placing one or more GSE packets in the data field (BB Frame Data Field) and adding a BB (Base Band) header thereto. The transmitter 10 then transmits the BB frame to the side of the receiver 11 via a predetermined cable. In the examples shown in FIGS. 37 and 38, a BB frame 1 includes the GSE packets 1 through 3, and a BB frame 2 includes the GSE packet 4.

Figure 39:
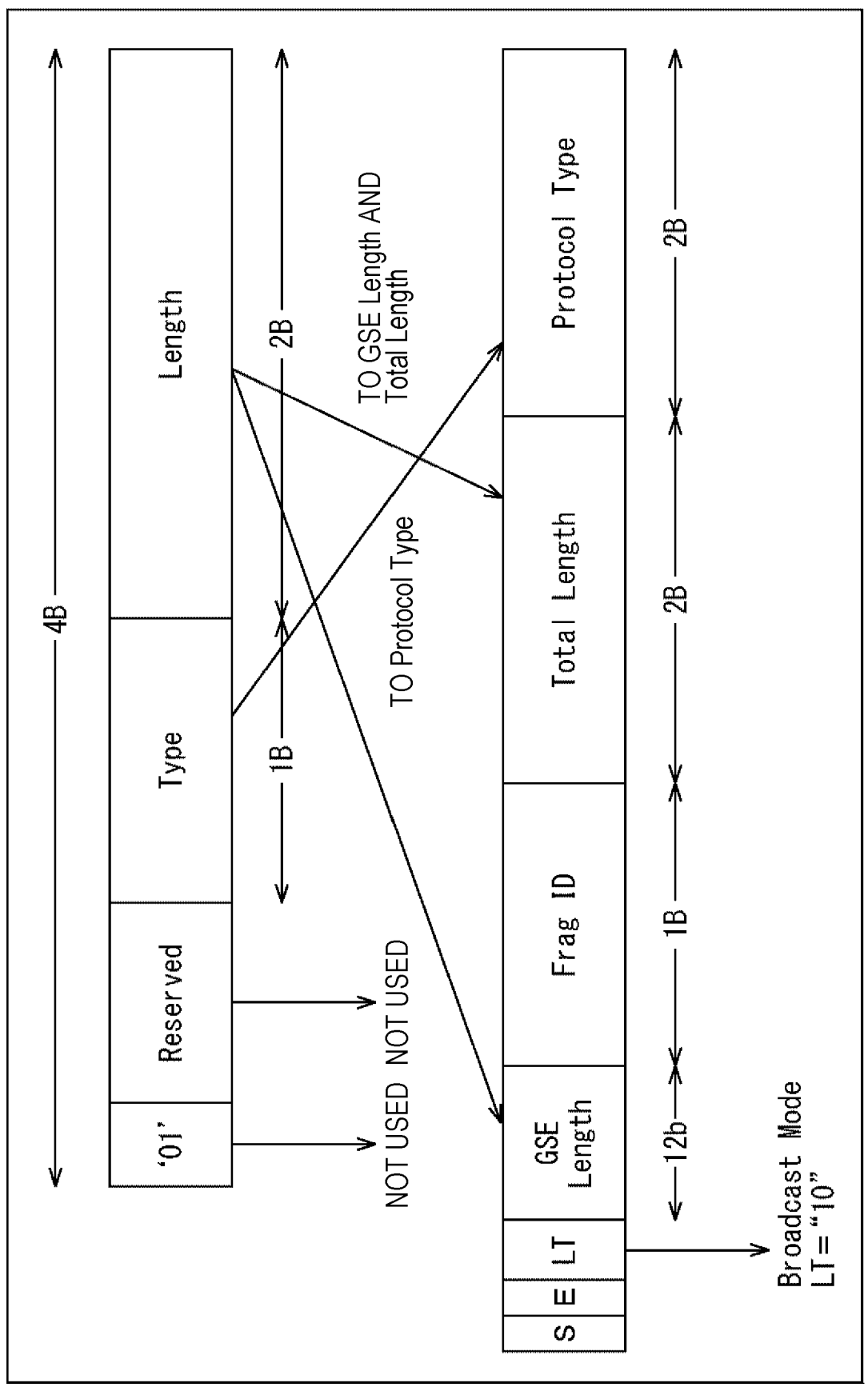
FIG. 39 is a diagram for explaining conversion from a TLV packet header into a GSE packet header.

Referring now to FIGS. 39 and 40, the processing related to conversion from a TLV packet to a GSE packet, or particularly to header conversion, is described in greater detail. FIG. 39 shows the relationship between the TLV header in a TLV packet prior to packet conversion and the GSE header in the GSE packet after the packet conversion. In FIG. 39, the upper half of the diagram shows the TLV header, and the lower half of the diagram shows the GSE header.

The first two bits "01" in the TLV header and the 6-bit reserved area (Reserved) that follows are not necessary in the GSE header after the packet conversion, and therefore, are not used. Meanwhile, a start indicator (S), an end indicator (E), and a label type (LT) need to be placed in the GSE header, and therefore, a predetermined number of bits are placed therein.

Here, bits suitable for the GSE packet are allocated to the start indicator (S) and the end indicator (E), but the bits "10" indicating a broadcast are allocated to the label type (LT), for example.

Also, the packet type (Type) in the TLV header corresponds to the protocol type (Protocol Type) in the GSE header. Although the packet type (Type) in the TLV header involves one byte (B), the protocol type (Protocol Type) in the GSE header involves two bytes (B). Therefore, it is necessary to perform conversion to adjust the sizes. Here, the type conversion table shown in FIG. 40 can be used, for example.

According to this conversion table, when an IPv4 packet is transmitted, for example, "0x01" allocated as the packet type (Type) in the TLV header is converted into "0x0800", to correspond to the protocol type (Protocol Type) in the GSE header.

Likewise, in a case where an IPv6 packet is transmitted, the packet type "0x02" is converted into a protocol type "0x86DD". Also, in a case where a compressed IP packet is transmitted, the packet type "0x03" is converted into a protocol type "0x22F2". Further, in a case where a transmission control signal packet is transmitted, the packet type "0xFF" is converted into a protocol type "0x0087". It should be noted that, in the case of a null packet, "0xFF" is allocated as the packet type, but does not need to be retransmitted, because the packet is a null packet. In this case, any specific conversion is not performed. It should be noted that, in a case where a packet type (Type) is added, a value of a protocol type (Protocol Type) for conversion is newly defined.

Referring back to FIG. 39, the data length (Length) in the TLV header corresponds to the GSE length (GSE Length) and the total length (Total Length) in the GSE header. That is, the data length indicates the size of the TLB packet thereafter in terms of bytes. However, in a case where the PDU of the GSE packet is not segmented but is encapsulated into one GSE packet, the value corresponding to the data length is allocated as the GSE length (GSE Length) in the GSE header.

In the above manner, the TLV header in which "01", the reversed area (Reserved), the packet type (Type), and the data length (Length) are placed is converted into the GSE header in which the start indicator (S), the end indicator (E), the label type (LT), the GSE length (GSE Length), a frag ID (Frag ID), the total length (Total Length), and the GSE length (GSE Length) are placed. The GSE header is then added to the payload, so that a GSE packet is created. In this manner, a TLV packet is converted into a GSE packet.

A BB frame including one or more such GSE packets is received on the side of the receiver 11. The demodulation processing unit 42 (FIG. 35) of the receiver 11 extracts (the data in) the GSE packet(s) from the BB frame, and outputs the extracted GSE packet(s) to the processing unit 43.

In a case where a GSE packet is output from the demodulation processing unit 42 to the processing unit 43, the processing related to the output can be performed basically through the same process as that in a case where a TLV packet is output from the demodulation processing unit 42 to the processing unit 43. Thus, the above described embodiment can be applied.

Alternatively, the demodulation processing unit 42 may not output a GSE packet, but may further convert a GSE packet into a TLV packet and then output the TLV packet to the processing unit 43. The demodulation processing unit 42 extracts (the data in) a GSE packet from a BB frame, converts the extracted GSE packet into a TLV packet, and then outputs the TLV packet to the processing unit 43.

When a GSE packet is converted into a TLV packet, the opposite of the process described above with reference to FIGS. 39 and 40 is performed, so that the GSE packet header can be converted into a TLV packet header. Therefore, in a case where a TLV packet header is output from the demodulation processing unit 42 to the processing unit 43, a process of converting a GSE packet header into a TLV packet header is also performed.

As described above with reference to FIG. 8, any one set of data among the transmission data B through H in a TLV packet, except for the packet header, can be output to the processing unit 43. In such a case, the process of converting a GSE packet header into a TLV packet header may be skipped.

In this manner, the demodulation processing unit 42 obtains a TLV packet from a GSE packet. As a result, the demodulation processing unit 42 outputs a TLV packet to the processing unit 43. The output of a TLV packet from the demodulation processing unit 42 to the processing unit 43 is the same as that in the above described embodiment, and the above described embodiment can be applied to the processing and the like related to the output.

In the above manner, the present technology can also be applied to digital cable television broadcasting.

<Application to ALP>

Figure 41:
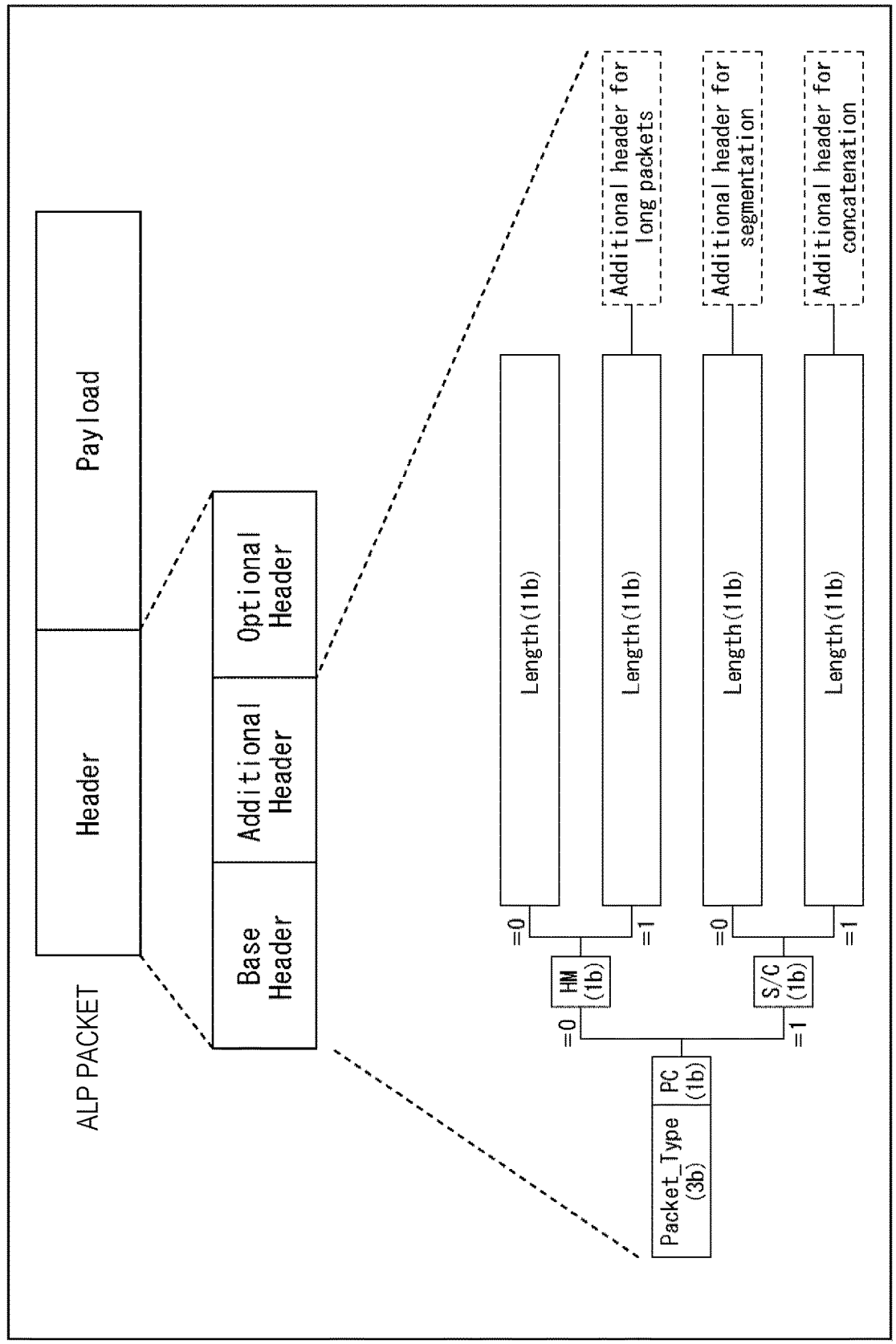
FIG. 41 is a diagram for explaining the structure of an ALP packet.

The above described present technology can also be applied to Advanced Television Systems Committee (ATSC) methods. In the example case described below, the present technology is applied to an ATSC method. FIG. 41 is a diagram showing the structure of an ALP packet to be transmitted and received by the ATSC method.

As shown in FIG. 41, an ALP packet is formed with an ALP header and a payload in which data is placed. In addition to a base header (Base Header), an extension header (Additional Header) and an optional header (Optional Header) can also be placed in the ALP header.

At the top of the ALP header (base header), 3-bit type information (Packet Type) is set. As shown in FIG. 42, information about the type of data to be placed in the payload in the ALP packet is set in the type information.

Specifically, in a case where an IP packet of IPv4 (IP/UDP packet) is placed in the payload, "000" is set in the type information. Also, in a case where a compressed IP packet (IP/UDP packet) is placed in the payload, "010" is set in the type information.

Further, in a case where a link layer signaling (LLS) packet is placed in the payload, "100" is set in the type information. This LLS packet is a packet for transmitting an LLS signal. The LLS signal includes information indicating the structures of streams and services in a broadcasting network. With this LLS packet, an L2 signal that is a Layer-2 signal can also be transmitted, for example.

Also, in a case where an extension packet (Packet Type Extension) is placed in the payload, "110" is set in the type information. Further, in a case where a TS packet compliant with MPEG2-TS is placed in the payload, "111" is set in the type information.

It should be noted that, in FIG. 42, type information "001", "011", and "101" is undefined (Reserved) areas for future extensions.

Referring back to FIG. 41, in the ALP header in the ALP packet, 1-bit packet setting information (PC: Packet Configuration) is placed after the type information. In a case where "0" is set as the packet setting information, a single packet mode (Single packet mode) starts in accordance with the 1-bit header mode (HM: Header Mode) placed after the packet setting information, and 11-bit length information (Length) and an extension header (Additional header) are placed in the ALP header.

It should be noted that, in the single packet mode, an ALP packet without an extension header is called a "normal packet". On the other hand, an ALP packet with an extension header is called a "long packet".

In a case where "1" is set as the packet setting information (PC), on the other hand, a segmentation mode (Segmentation mode) or a concatenation mode (Concatenation mode) starts in accordance with the 1-bit S/C (Segmentation/Concatenation) placed after the packet setting information, and 11-bit length information (Length) and an extension header (Additional header) are placed in the ALP header.

In addition, in the ALP packet, a payload is placed after the ALP header having the above described structure. In this payload, for example, an IP packet of IPv4 (IP/UDP packet), an LLS packet, or the like can be placed in accordance with the type information in the ALP header (base header).

In a case where an ALP packet having such a structure is processed in the receiver 11 (FIG. 2 or FIG. 35), the ALP packet is output from the demodulation processing unit 42 to the processing unit 43. In a case where an ALP packet is demodulated by the demodulation processing unit 42 and is then output to the processing unit 43, the processing related to the output can be performed basically through the same process as that in a case where a TLV packet is output from the demodulation processing unit 42 to the processing unit 43. Thus, the above described embodiment can be applied.

However, an ALP packet does not include error information indicating that an error has occurred, when there is an error. Referring now again to FIG. 27, explanation is continued. FIG. 27 is a diagram showing the structure of a TS packet (MPEG2-TS packet). In the packet header in the packet shown in FIG. 27, the area that comes after the area in which synchronization information is written includes 1-bit information called a transport error indicator.

This transport error indicator is a flag that indicates the existence/non-existence of a bit error in the TS packet. When the transport error indicator is "1", for example, there exists at least a 1-bit uncorrectable error in the TS packet.

On the other hand, the ALP packet shown in FIG. 41 does not include information equivalent to the transport error indicator. Therefore, in a case where the ALP packet is output from the demodulation processing unit 42 to the processing unit 43, any information equivalent to the transport error indicator cannot be transmitted and received between the demodulation processing unit 42 and the processing unit 43. In other words, even if there exists at least a 1-bit uncorrectable error in the ALP packet, information indicating the existence of an error is not included in the ALP packet.

To counter this, an ALP packet is output from the demodulation processing unit 42 to the processing unit 43, and error information is also output. A method for enabling this is now described.

First, a method by which an error indicator (EI) is included in an ALP packet is described as a first method for outputting error information. Referring again to FIG. 42, explanation is continued. As shown in FIG. 42, excluding the undefined (Reserved) areas, five packet types are defined as the type information: an IP packet of IPv4 (IPv4 packet), a compressed IP packet (Compressed IP packet), an LLS packet (Link layer signaling packet), an extension packet (Packet Type Extension), and a TS packet compliant with MPEG2-TS (MPEG-2 Transport Stream). Also, the type information is 3-bit information.

The 3-bit type information is reduced to 2-bit information, and the remaining one bit is used as the error indicator. In a case where the type information is 2-bit information, four packet types can be defined. However, in the type information described above with reference to FIG. 42, five packet types are defined. Of the five packet types, a packet type considered to have a lower frequency of use is excluded from the five packet types, and four packet types are left.

For example, type information is defined as shown in FIGS. 43A and 43B. According to the type information shown in FIG. 43A, in a case where an IP packet of IPv4 (IPv4 packet) is placed in the payload, "00" is set in the type information. Also, in a case where a compressed IP packet (Compressed IP packet) is placed in the payload, "01" is set in the type information.

Also, in a case where an extension packet (Packet Type Extension) is placed in the payload, "10" is set in the type information. Further, in a case where a TS packet compliant with MPEG2-TS (MPEG2 Transport Stream) is placed in the payload, "11" is set in the type information.

Alternatively, type information may be defined as shown in FIG. 43B. According to the type information shown in FIG. 43B, in a case where an IP packet of IPv4 (IPv4 packet) is placed in the payload, "00" is set in the type information. Also, in a case where a compressed IP packet (Compressed IP packet) is placed in the payload, "01" is set in the type information.

Also, in a case where an LLS packet (Link layer signaling packet) is placed in the payload, "10" is set in the type information. Further, in a case where an extension packet (Packet Type Extension) is placed in the payload, "11" is set in the type information.

Type information may be defined in accordance with either FIG. 43A or FIG. 43B.

An IP packet of IPv4 (IPv4 packet) and a compressed IP packet (Compressed IP packet) each have a high frequency of use, and are considered important, and therefore, these two packet types are not excluded but are left. In addition, an extension packet (Packet Type Extension) is considered as important as an IP packet of IPv4 and a compressed IP packet, and therefore, this packet type is not excluded but is left. The type information shown in FIGS. 43A and 43B is type information that is set on the basis of the above concepts.

The type information can be designed as information for identifying the four packet types: an IP packet of IPv4, a compressed IP packet, an extension packet, and an LLS packet.

The type information shown in FIGS. 43A and 43B is an example, and some other type information may be defined. At the present time, an IP packet of IPv4, a compressed IP packet, and an extension packet are left, having high degrees of importance. However, if there is a change in the degrees of importance in the future, type information based on other definitions may be defined.

Also, type information other than the type information shown in FIGS. 43A and 43B may be defined so that packets in new formats can be handled. Also, in the above described embodiment, the type information is information for identifying the four packet types: an IP packet of IPv4, a compressed IP packet, an extension packet, and an LLS packet. However, the type information may be information for identifying three of the four packet types, and one may be kept as a reserved area.

Figure 44:
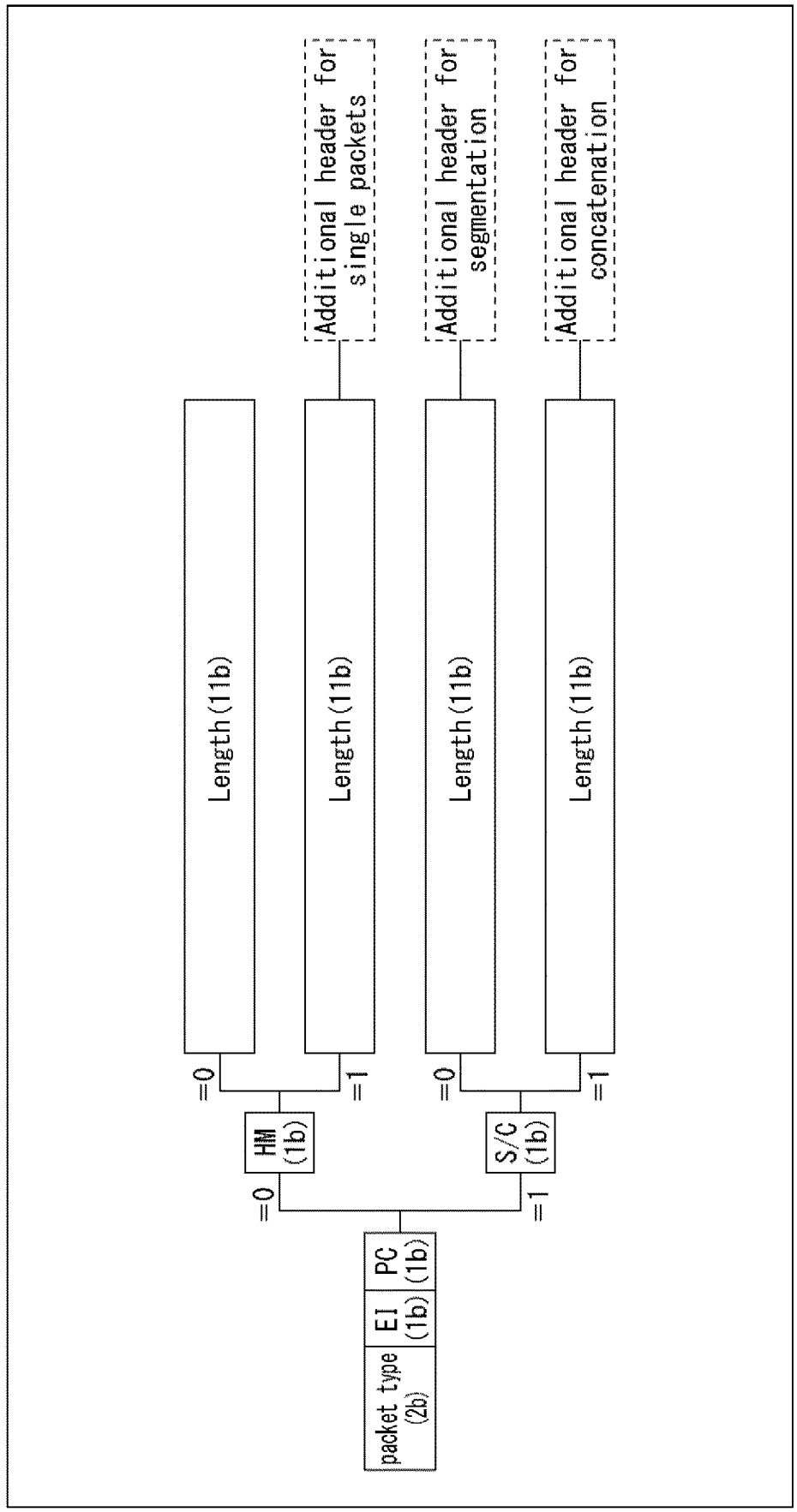
FIG. 44 is a diagram for explaining the structure of an ALP packet to which the present technology is applied.

In a case where 2-bit type information is defined as above, an ALP packet has the structure shown in FIG. 44.

Like the ALP packet shown in FIG. 42, the ALP packet shown in FIG. 44 is also formed with an ALP header and a payload in which data is placed. At the top of the ALP header (base header) in the ALP packet shown in FIG. 44, 2-bit type information (Packet Type) is set. In accordance with the definitions shown in FIGS. 43A and 43B, information about the type of data to be placed in the payload in the ALP packet is set in the type information.

After the type information, a 1-bit error indicator (EL) is placed. Like the 1-bit transport error indicator in the packet header in the TS packet shown in FIG. 27, for example, the 1-bit error indicator can be used as error information indicating that there is an error in the ALP packet or that there are no errors in the ALP packet.

As the error indicator is included in the ALP header as described above, error information can be transmitted from the demodulation processing unit 42 to the processing unit 43. Thus, in a case where ALP packets are handled, error information can also be transmitted.

Next, a method by which the existence/non-existence of an error is indicated with a special signal is described as a second method for outputting error information.

Figure 45:
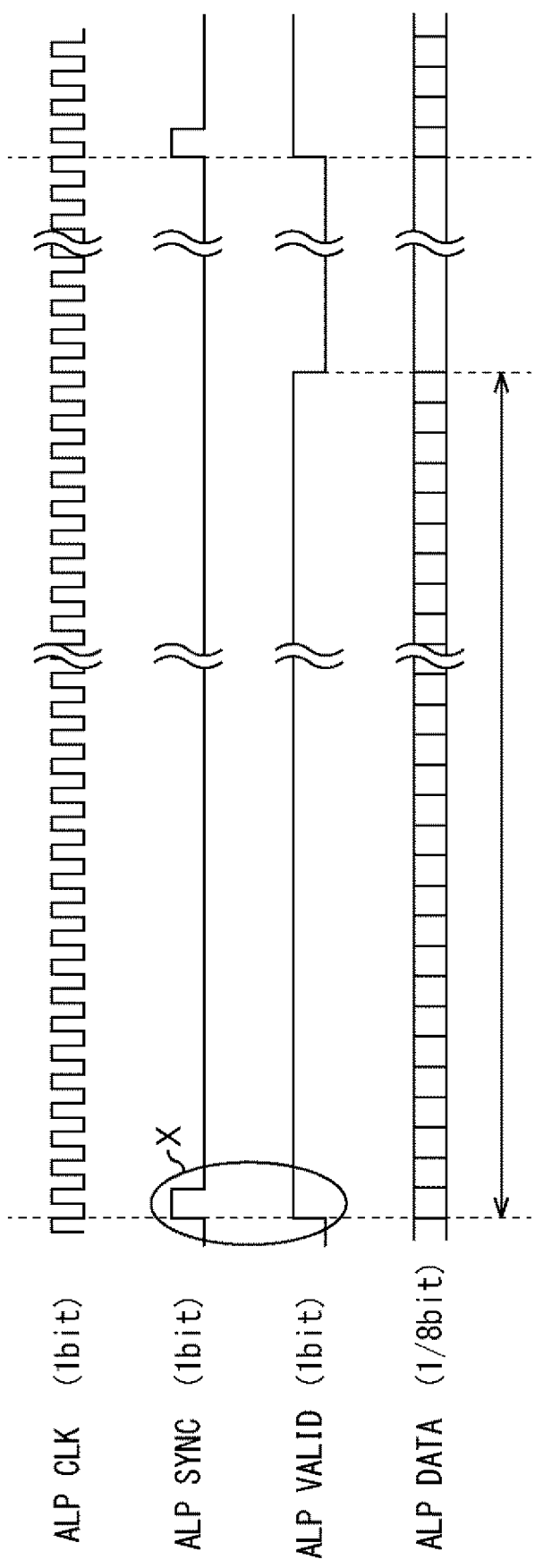
FIG. 45 is a diagram showing the basic signals at a time when there are no errors.

Referring to FIG. 45, the respective signals at a time when there are no errors are first described. FIG. 45 shows the basic output waveforms of a clock signal, a sync signal, a valid signal, and a data signal. It should be noted that the basic output waveforms are shown herein, because the waveforms of these signals can be changed as appropriate to satisfy the conditions required by the processing unit 43 or reduce power consumption or the like, as described above.

The clock signal (ALP CLK) is a signal indicating the output timing of the data forming the ALP. The clock signal is a pulse-like signal that repeatedly switches between the L-level and the H-level.

The sync signal (ALP SYNC) indicates the timing of the top of each packet included in the ALP. Only at the timing of the top of each packet, for example, the sync signal temporarily switches from the low (L) level to the high (H) level.

The valid signal (ALP VALID) indicates the sections (valid sections) in which a packet exists in the ALP. For example, the valid signal is at the H-level in the valid sections, and is at the L-level in the sections (invalid sections) other than the valid sections.

The data signal (ALP DATA) is an ALP signal, and includes all or part of an ALP packet. A packet has a data length (packet length) of three to 65539 bytes, for example.

As shown in the portion enclosed with a frame X in FIG. 45, the sync signal and the valid signal simultaneously rise. In ALP packet transmission without errors, the sync signal and the valid signal simultaneously rise as described above.

Figure 46:
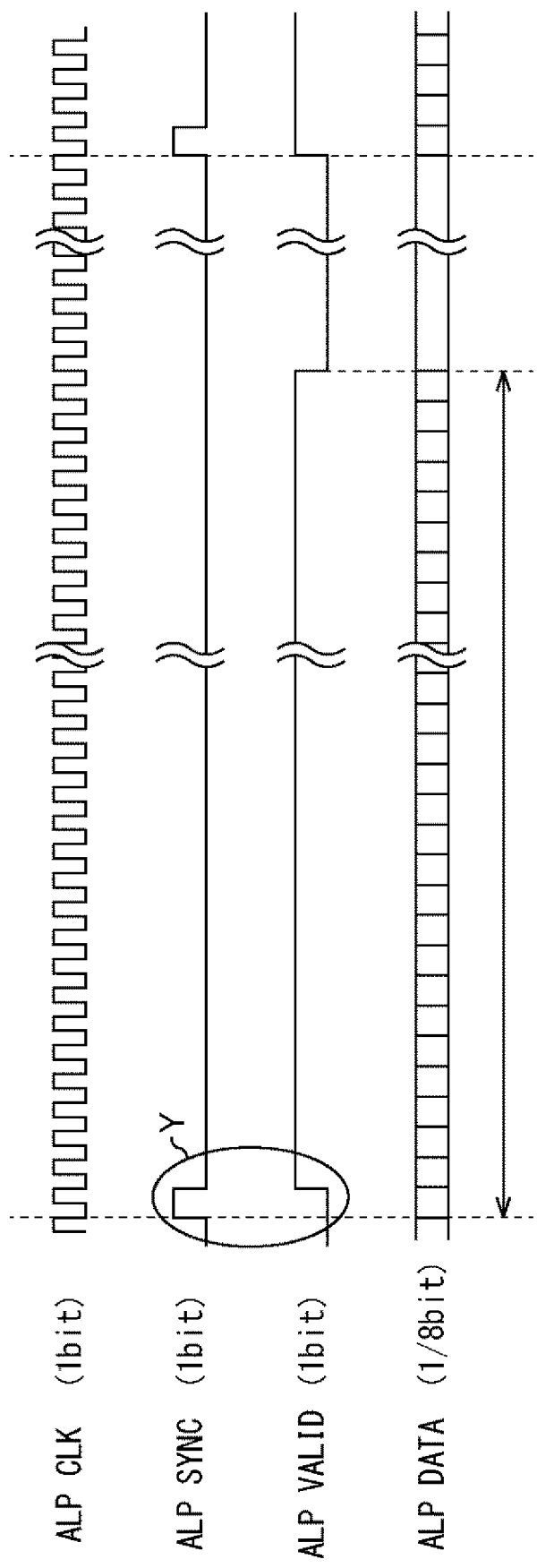
FIG. 46 is a diagram showing the basic signals at a time when there is an error.

FIG. 46 shows the respective signals at a time when there is an error. When there is an error, the basic waveforms are similar to those at a time when there are no errors, except that the sync signal and the valid signal do not simultaneously rise in the portion enclosed with a frame Y.

That is, as shown in the portion enclosed with the frame Y in FIG. 46, when there is an error, the sync signal rises as a special signal, but the valid signal does not rise. In ALP packet transmission with an error, control is performed so that the sync signal and the valid signal do not simultaneously rise as described above.

For example, in a case where the valid signal rises at the same time as the sync signal as described above, the processing unit 43 (FIG. 2 or 35) can determine that there are no errors. In a case where the valid signal does not rise when the sync signal rises, the processing unit 43 can determine that there is an error.

In this manner, error information may be transmitted with the use of a special signal.

In a case where error information is transmitted with the use of a special signal, the error information can also be transmitted from the demodulation processing unit 42 to the processing unit 43. Thus, in a case where ALP packets are handled, error information can also be transmitted.

Further, in a case where an ALP packet is demodulated by the demodulation processing unit 42 and is then output to the processing unit 43, the processing related to the output can be performed basically through the same process as that in a case where a TLV packet is output from the demodulation processing unit 42 to the processing unit 43. Thus, the above described embodiment can be applied.

<Description of a Computer to which the Present Technology is Applied>

Meanwhile, the above described series of processes may be performed by hardware or may be performed by software. In a case where the series of processes are performed by software, the program that forms the software may be installed in a computer incorporated into special-purpose hardware, or may be installed from a recording medium into a general-purpose personal computer or the like, for example, that can execute various kinds of functions by installing various kinds of programs.

Figure 47:
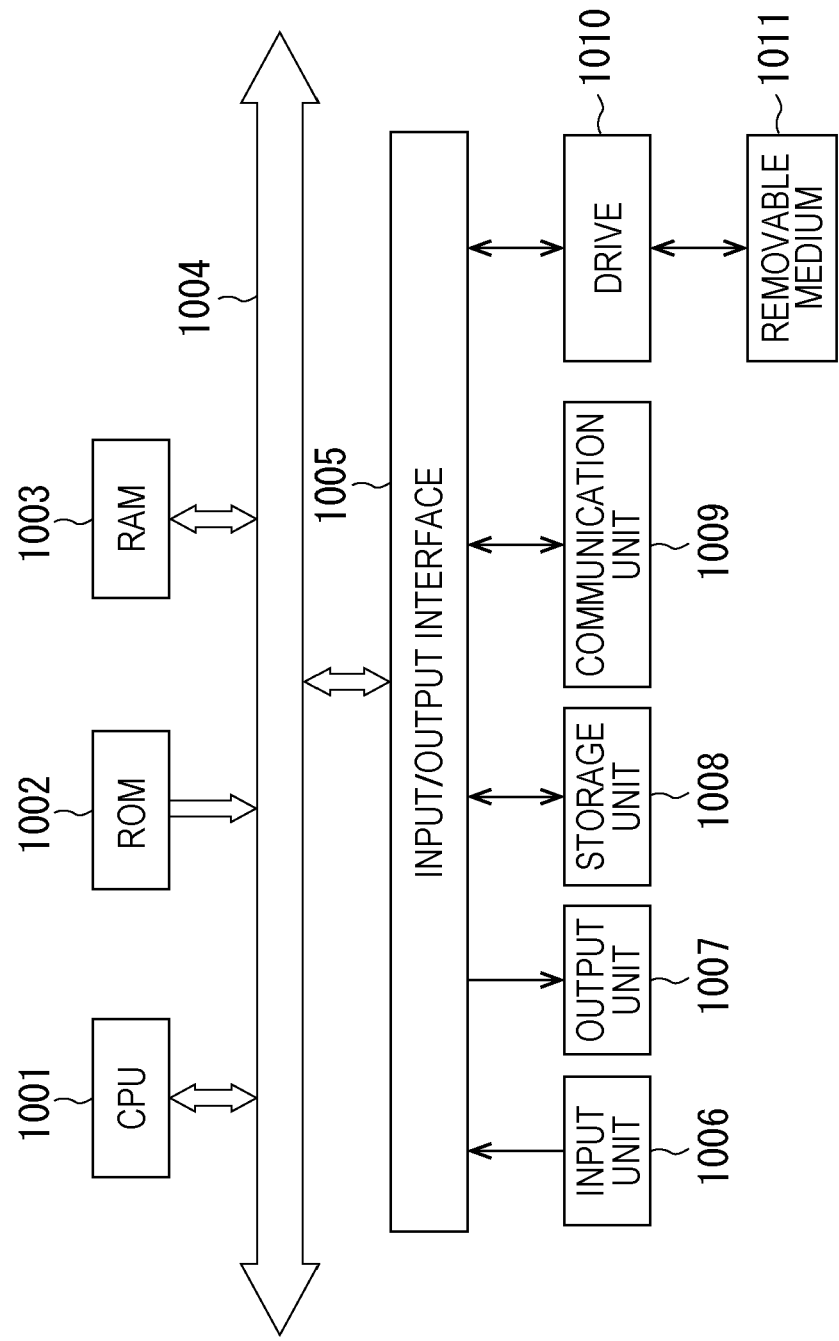
FIG. 47 is a diagram for explaining a recording medium.

FIG. 47 is a diagram showing an example configuration of a general-purpose personal computer. The personal computer includes a central processing unit (CPU) 1001. An input/output interface 1005 is connected to the CPU 1001 via a bus 1004. A read-only memory (ROM) 1002 and a random access memory (RAM) 1003 are connected to the bus 1004.

An input unit 1006, an output unit 1007, a storage unit 1008, and a communication unit 1009 are connected to the input/output interface 1005: the input unit 1006 is formed with an input device such as a keyboard or a mouse through which a user inputs an operation command; the output unit 1007 outputs an image of a process operating screen or a processing result to a display device; the storage unit 1008 is formed with a hard disk drive or the like that stores programs and various kinds of data; and the communication unit 1009 is formed with a local area network (LAN) adapter or the like, and performs a communication process via a network that is typically the Internet. A drive 1010 is also connected to the input/output interface 1005. The drive 1010 performs data reading and writing on a removable medium 1011, such as a magnetic disk (such as a flexible disk), an optical disk (such a Compact Disc-Read-Only Memory (CD-ROM) or a Digital Versatile Disc (DVD)), a magnetooptical disk (such as Mini Disc (MD)), or a semiconductor memory.

A program stored in the ROM 1002 or in the removable medium 1011 such as a magnetic disk, an optical disk, a magnetooptical disk, or a semiconductor memory is read and installed into the storage unit 1008. In accordance with the program loaded from the storage unit 1008 into the RAM 1003, the CPU 1001 performs various kinds of processes. The RAM 1003 also stores data and the like necessary for the CPU 1001 to perform various processes as appropriate.

In the computer having the above described configuration, the CPU 1001 loads a program stored in the storage unit 1008 into the RAM 1003 via the input/output interface 1005 and the bus 1004, for example, and executes the program, so that the above described series of processes are performed.

The program to be executed by the computer (the CPU 1001) may be recorded on the removable medium 1011 as a package medium to be provided, for example. Alternatively, the program can be provided via a wired or wireless transmission medium, such as a local area network, the Internet, or digital satellite broadcasting.

In the computer, the program can be installed into the storage unit 1008 via the input/output interface 1005 when the removable medium 1011 is mounted on the drive 1010. Also, the program may be received by the communication unit 1009 via a wired or wireless transmission medium, and be installed into the storage unit 1008. Alternatively, the program may be installed beforehand into the ROM 1002 or the storage unit 1008.

In this specification, the processes to be performed by the computer in accordance with the program are not necessarily performed in chronological order compliant with the sequences shown in the flowcharts. That is, the processes to be performed by the computer in accordance with the program include processes to be performed in parallel or independently of one another (such as parallel processes or object-based processes).

In addition, the program may be executed by one computer (processor), or may be executed in a distributive manner by more than one computer. Further, the program may be transferred to a remote computer, and be executed therein.

Furthermore, in this specification, a system means an assembly of components (devices, modules (parts), and the like), and not all the components need to be provided in the same housing. In view of this, devices that are housed in different housings and are connected to one another via a network form a system, and one device having modules housed in one housing is also a system.

It should be noted that embodiments of the present technology are not limited to the above described embodiments, and various modifications may be made to them without departing from the scope of the present technology.

For example, the present technology can be embodied in a cloud computing configuration in which one function is shared among devices via a network, and processing is performed by the devices cooperating with one another.

Also, the respective steps described with reference to the above described flowcharts can be carried out by one device or can be shared among devices.

Further, in a case where more than one process is included in one step, the processes included in the step can be performed by one device or can be shared among devices.

It should be noted that the present technology may also be embodied in the configurations described below.

(1)

A signal processing device including:

a demodulation processing unit that performs a demodulation process;

a processing unit that performs a demux process; and a data signal line, a clock signal line, a sync signal line, and a valid signal line that are provided between the demodulation processing unit and the processing unit, in which a variable-length packet is transmitted between the demodulation processing unit and the processing unit through the data signal line, the clock signal line, the sync signal line, and the valid signal line.

(2)

The signal processing device of (1), in which the variable-length packet is an Internet Protocol (IP) packet.

(3)

The signal processing device of (1), in which the variable-length packet is a Type Length Value (TLV) packet.

(4)

The signal processing device of any of (1) to (3), in which the variable-length packet to be transmitted from the demodulation processing unit to the processing unit via the data signal line is at least part of a TLV packet.

(5)

The signal processing device of (1), in which the variable-length packet is one of a TLV packet, a GSE packet, a GSE-Lite packet, an ALP packet, and an IP packet.

(6)

The signal processing device of any of (1) to (5), in which the data signal line is formed with one to eight data signal lines, and serial transmission or parallel transmission is performed in accordance with the number of provided data signal lines.

(7)

The signal processing device of any of (1) to (6), in which transmission of the variable-length packet is performed with an optional bit width of one to eight bits.

(8)

The signal processing device of any of (1) to (7), in which the clock signal line transmits a clock signal, the sync signal line transmits a sync signal indicating a position of a top of a packet, and the valid signal line transmits a valid signal indicating a data valid section.

(9)

The signal processing device of (8), in which the processing unit latches data from the demodulation processing unit at one of a rising edge and a falling edge of the clock signal.

(10)

The signal processing device of (8) or (9), in which the valid signal is a signal constantly indicating that data is valid, and the clock signal is set at a frequency corresponding to the bit width of the data signal line.

(11)

The signal processing device of (8) or (9), in which the valid signal is a signal constantly indicating that data is valid, and oscillation of the clock signal is suspended during a byte gap.

(12)

The signal processing device of (8) or (9), in which the clock signal constantly oscillates at a predetermined frequency, and the valid signal is lowered during a byte gap.

(13)

The signal processing device of any of (8) to (12), in which, during one of an in-packet gap and an inter-packet gap, oscillation of the clock signal is suspended.

(14)

The signal processing device of any of (1) to (13), in which the variable-length packet is a TLV packet, and error information indicating whether there is an error in a packet is included in a packet header area of the TLV packet.

(15)

The signal processing device of any of (1) to (13), in which the variable-length packet is a TLV packet, and error information indicating whether there is an error in a packet is included in an area in which information about the type of a packet included in the TLV packet is written.

(16)

The signal processing device of (14) or (15), further including an error signal line that transmits the error information.

(17)

The signal processing device of any of (14) to (16), in which the error information is transmitted for each error correction code, or is transmitted for each variable-length packet.

(18)

The signal processing device of any of (1) to (17), in which the demodulation processing unit converts a partial TLV packet compliant to ISDB-C standards into a TLV packet, and transmits the TLV packet to the processing unit.

(19)

The signal processing device of any of (1) to (17), in which the demodulation processing unit transmits a J.382-compliant GSE packet to the processing unit.

(20)

The signal processing device of any of (1) to (17), in which the demodulation processing unit converts a J.382-compliant GSE packet into a TLV packet, and transmits the TLV packet to the processing unit.

(21)

The signal processing device of any of (1) to (17), in which the demodulation processing unit transmits an ATSC-compliant ALP packet to the processing unit.

(22)

The signal processing device of (21), in which a header of the ALP packet includes at least 2-bit type information as information indicating a type of data placed in a payload, and 1-bit error information indicating whether there is an error in a packet.

(23)

The signal processing device of (22), in which the type information is information for identifying four packet types among the following five packet types: an IP packet of IPv4, a compressed IP packet, an LLS packet, an extension packet, and a TS packet compliant with MPEG2-TS.

(24)

The signal processing device of (21), in which, in a case where there is an error in a packet, a sync signal to be transmitted by the sync signal line and a valid signal to be transmitted by the valid signal line do not simultaneously rise.

(25)

A signal processing method implemented in a signal processing device that includes:

a demodulation processing unit that performs a demodulation process;

a processing unit that performs a demux process; and a data signal line, a clock signal line, a sync signal line, and a valid signal line that are provided between the demodulation processing unit and the processing unit, the signal processing method including a step of transmitting a variable-length packet between the demodulation processing unit and the processing unit, using the data signal line, the clock signal line, the sync signal line, and the valid signal line.

(26)

A computer-readable program for causing a computer to perform a process, the computer including:

a demodulation processing unit that performs a demodulation process;

a processing unit that performs a demux process; and a data signal line, a clock signal line, a sync signal line, and a valid signal line that are provided between the demodulation processing unit and the processing unit, the process including a step of transmitting a variable-length packet between the demodulation processing unit and the processing unit, using the data signal line, the clock signal line, the sync signal line, and the valid signal line.

REFERENCE SIGNS LIST

10 Transmitter
11 Receiver
12 Network
31 Antenna

32 Display
41 Tuner
42 Demodulation processing unit
43 Processing unit
51 Demodulation unit
52 Error correction unit
53 Multiplexing/separating unit
54 Decoder

The invention claimed is:

1. A signal processing device, comprising:
a demodulation processing circuit configured to execute a demodulation process;
a processing circuit configured to execute a demux process based on an output from the demodulation processing circuit, wherein the demodulation processing circuit is further configured to:
convert a partial type length value (TLV) packet to a TLV packet; and
transmit the TLV packet to the processing circuit; and
a data signal line, a clock signal line, a sync signal line, and a valid signal line between the demodulation processing circuit and the processing circuit, wherein the TLV packet is a variable-length packet, and
the variable-length packet is transmitted between the demodulation processing circuit and the processing circuit through the data signal line, the clock signal line, the sync signal line, and the valid signal line.

2. The signal processing device according to claim 1, wherein the variable-length packet transmitted via the data signal line is at least part of the TLV packet.

3. The signal processing device according to claim 1, wherein
the data signal line comprises one to eight data signal lines, and
one of serial transmission or parallel transmission is executed in accordance with a number of data signal lines.

4. The signal processing device according to claim 1, wherein the variable-length packet is transmitted with an optional bit width of one to eight bits.

5. The signal processing device according to claim 1, wherein
the clock signal line is configured to transmit a clock signal,
the sync signal line is configured to transmit a sync signal that indicates a position of a top of a packet, and
the valid signal line is configured to transmit a valid signal that indicates a data valid section.

6. The signal processing device according to claim 5, wherein the processing circuit is configured to latch data from the demodulation processing circuit at one of a rising edge and a falling edge of the clock signal.

7. The signal processing device according to claim 5, wherein
the valid signal indicates that that data is valid, and
the clock signal is set at a frequency corresponding to a bit width of the data signal line.

8. The signal processing device according to claim 5, wherein
the valid signal indicates that data is valid, and
oscillation of the clock signal is suspended during a byte gap.

9. The signal processing device according to claim 5, wherein
the clock signal oscillates at a determined frequency, and
the valid signal is lowered during a byte gap.

10. The signal processing device according to claim 5, wherein an oscillation of the clock signal is suspended during one of an in-packet gap or an inter-packet gap.

11. The signal processing device according to claim 1, wherein
a packet header area of the TLV packet comprises error information indicating whether an error is present in the TLV packet.

12. The signal processing device according to claim 11, further comprising an error signal line configured to transmit the error information.

13. The signal processing device according to claim 11, wherein the error information is one of transmitted for each error correction code, or is transmitted for each variable-length packet.

14. The signal processing device according to claim 1, wherein
the TLV packet comprises error information indicating whether an error is present in the TLV packet, and
the error information is in an area in which information about a type of the TLV packet is written.

15. The signal processing device according to claim 1, wherein the partial TLV packet is compliant to Integrated Services Digital Broadcasting-Cable (ISDB-C) standards.

16. The signal processing device according to claim 1, wherein the demodulation processing circuit configured to transmit a J.382-compliant Generic Stream Encapsulation (GSE) packet to the processing circuit.

17. The signal processing device according to claim 1, wherein the demodulation processing circuit is configured to:
convert a J.382-compliant Generic Stream Encapsulation (GSE) packet into the TLV packet; and
transmit the TLV packet to the processing circuit.

18. The signal processing device according to claim 1, wherein the demodulation processing circuit is configured to transmit an Advanced Television Systems Committee (ATSC)-compliant ALP packet to the processing circuit.

19. The signal processing device according to claim 18, wherein a header of the ALP packet includes at least 2-bit type information which indicates a type of data placed in a payload, and a 1-bit error information which indicates whether an error is present in the ALP packet.

20. The signal processing device according to claim 19, wherein the at least 2-bit type information is information for identification of four packet types among following five packet types: an IP packet of IPv4, a compressed IP packet, a link local signaling (LLS) packet, an extension packet, and a transport stream (TS) packet compliant with Moving Picture Experts Group transport stream (MPEG2-TS).

21. The signal processing device according to claim 18, wherein, in a case where an error is present in a packet, a sync signal transmitted by the sync signal line and a valid signal transmitted by the valid signal line are not concurrently raised.

22. A signal processing method, comprising:
in a signal processing device:
executing, by a demodulation processing circuit, a demodulation process;
converting, by the demodulation processing circuit, a partial Type Length Value (TLV) packet to a TLV packet;
transmitting, by the demodulation processing circuit, the TLV packet to a processing circuit; and
executing, by the processing circuit, a demux process based on an output from the demodulation processing circuit, wherein the signal processing device comprises a data signal line, a clock signal line, a sync signal line, and a valid signal line between the demodulation processing circuit and the processing circuit, the TLV packet is a variable-length packet, and the variable-length packet is transmitted between the demodulation processing circuit and the processing circuit through the data signal line, the clock signal line, the sync signal line, and the valid signal line.

23. A non-transitory computer-readable medium having stored thereon, computer-executable instructions, which when executed by a computer, cause the computer to execute operations, the operations comprising:

executing, by a demodulation processing circuit, a demodulation process;

converting, by the demodulation processing circuit, a partial Type Length Value (TLV) packet to a TLV packet;

transmitting, by the demodulation processing circuit, the TLV packet to a processing circuit; and executing, by the processing circuit, a demux process based on an output from the demodulation processing circuit, wherein a data signal line, a clock signal line, a sync signal line, and a valid signal line are between the demodulation processing circuit and the processing circuit, the TLV packet is a variable-length packet, and the variable-length packet is transmitted between the demodulation processing circuit and the processing circuit, using the data signal line, the clock signal line, the sync signal line, and the valid signal line.

24. A signal processing device, comprising:

a demodulation processing circuit configured to execute a demodulation process;

a processing circuit configured to execute a demux process based on an output from the demodulation processing circuit, wherein the demodulation processing circuit is further configured to:

convert a J.382-compliant Generic Stream Encapsulation (GSE) packet into a type length value (TLV) packet; and transmit the TLV packet to the processing circuit; and a data signal line, a clock signal line, a sync signal line, and a valid signal line between the demodulation processing circuit and the processing circuit, wherein the TLV packet is a variable-length packet, and the variable-length packet is transmitted between the demodulation processing circuit and the processing circuit through the data signal line, the clock signal line, the sync signal line, and the valid signal line.

* * * * *